United States Patent
Bertheussen

(10) Patent No.: US 12,547,678 B1
(45) Date of Patent: Feb. 10, 2026

(54) PLATFORM FOR SELECTION OF MEDIA CONTENT VERSIONS

(71) Applicant: Block, Inc., Oakland, CA (US)

(72) Inventor: Gaute Bertheussen, Oslo (NO)

(73) Assignee: Block, Inc., Oakland, CA (US)

( * ) Notice: Subject to any disclaimer, the term of this patent is extended or adjusted under 35 U.S.C. 154(b) by 113 days.

(21) Appl. No.: 18/319,308

(22) Filed: May 17, 2023

(51) Int. Cl.
  *H04N 21/23* (2011.01)
  *G06F 16/48* (2019.01)
  *G06F 21/10* (2013.01)
  *H04N 21/239* (2011.01)

(52) U.S. Cl.
  CPC .......... *G06F 21/1011* (2023.08); *G06F 16/48* (2019.01); *H04N 21/2393* (2013.01); *G06F 21/1015* (2023.08)

(58) Field of Classification Search
  None
  See application file for complete search history.

(56) References Cited

U.S. PATENT DOCUMENTS

| | | | | |
|---|---|---|---|---|
| 6,470,378 B1* | 10/2002 | Tracton | ................. | H04L 67/568 709/235 |
| 6,981,045 B1* | 12/2005 | Brooks | ................. | H04L 65/104 709/246 |
| 2002/0067909 A1* | 6/2002 | Iivonen | ............... | H04N 21/4782 348/E7.063 |
| 2004/0064355 A1* | 4/2004 | Dorenbosch | ....... | G06Q 10/1095 705/7.19 |
| 2007/0157260 A1* | 7/2007 | Walker | ............. | H04N 21/47214 725/86 |

* cited by examiner

*Primary Examiner* — Cai Y Chen
(74) *Attorney, Agent, or Firm* — IP Spring

(57) ABSTRACT

A multimedia platform receives, from a user device, a first request to access a media content stream that is concurrently accessible to a plurality of subscriber devices. The multimedia platform determines a current content item in the media content stream. The multimedia platform causes a first version of the current content item to be provided to the user device based on a request attribute (e.g., an audio output hardware, an application instance, a user account status, or a user subscription level). The multimedia platform receives a second request to access the current content item, the second request including an updated request attribute. The multimedia platform causes a second version of the current content item to be provided to the user device based on the updated request attribute.

20 Claims, 17 Drawing Sheets

PLATFORM FOR SELECTION OF MEDIA CONTENT VERSIONS

TECHNICAL FIELD

Streaming media systems enable on-demand playback of various types of content, such as music and videos. Users of streaming media systems can have user accounts with providers of streaming media services. Premium accounts can enable accountholders to access premium versions of content, whereas individuals who do not have premium accounts may be provided with access to lower quality versions of the content.

BRIEF DESCRIPTION OF THE DRAWINGS

One or more embodiments of the present disclosure are illustrated by way of example and not limitation in the figures of the accompanying drawings, in which like references indicate similar elements.

DETAILED DESCRIPTION

Figure 1:
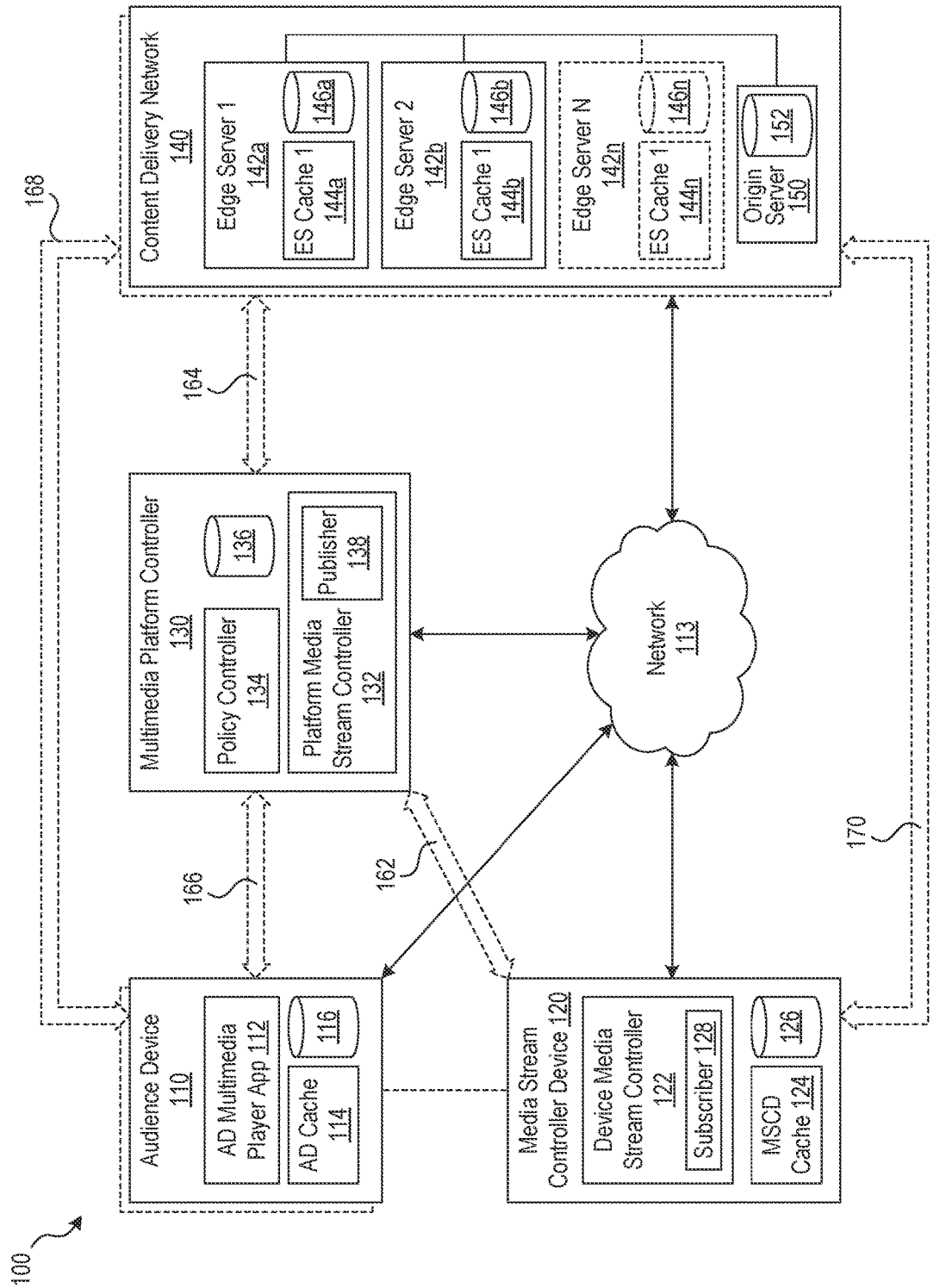
FIG. 1 shows an example of an environment in which a platform for selection of media content versions operates, according to an implementation of the present subject matter.

Disclosed herein are methods and systems for selection of media content versions and for subscriber-side management of media content versions in a content stream. Conventional systems implement content streaming such that a session controller device can share media with an audience of listener devices (also sometimes referred to as consumer devices and/or user devices) in substantially real time. For example, users can create media streams, curate items in the media streams (add items, set and/or change the order of items, and so forth) and share the streams with audiences. However, conventionally, such systems fail to account for the fact that different subscription levels may be associated with different versions (e.g., higher subscription tiers can enable access to comparatively higher-quality versions of content items). Accordingly, the conventional systems typically provide low-quality media content to all devices in the audience, even to those particular audience members that may have premium-level subscriptions.

Receiving comparatively lower-quality media content during a content streaming session can be frustrating. Some users may decide to purchase or upgrade subscriptions during a streaming session in order to access higher-quality versions of content items included in the stream. When users do so, user experience can be interrupted to process user log-in requests and serve higher-quality versions of items. Furthermore, conventional systems are not able to switch to a higher-quality version of a particular content item, while the item is being served, without interrupting playback.

In accordance with the techniques introduced here, the problem of providing an uninterrupted streaming media consumer experience during streaming of media content is solved by providing seamless streaming of a given content item to the consumer, accomplished by enabling the consumer device to identify and access different streaming versions of the content item while the content item is being streamed. For example, a DJ user (or, more generally, a control user) can create a media stream that includes a particular song. When a media stream is created, a session signal (e.g., a media stream identifiers, hyperlinks, and so forth) can be created and made accessible (e.g., via a broadcast, publication, and so forth) to multiple audience members at the same time (or substantially the same time, e.g., to account for network and playback differences between various networks and devices). The described techniques facilitate providing individual audience members of the media stream with versions of the song (or, more generally, other streamed media content) included in the media stream based on a context associated with a particular account and/or device of an audience member. For instance, a first audience member may subscribe to the media stream anonymously (e.g., without logging into a media delivery platform) and may be served a default, non-high-fidelity version of the content item, such as a song. A second audience member may wish to listen to the stream in high-fidelity quality and may be served a high-fidelity version of the same song. In some situations, context information can include information regarding the state or operation of an audience member's device. For instance, during playback, a third audience member may lose connectivity to a particular system within a content delivery network (CDN) infrastructure, such as a CDN edge server that serves the song. In response, the platform may automatically source a version of the song of at least suitable quality from another system (e.g., a different CDN or a different edge server) and temporally "stitch together" the two versions in a manner that makes the switch between versions imperceptible to the audience member.

In operation of the platform disclosed herein, in at least some embodiments, a multimedia platform receives, from a user device, a request to access a media content stream. Items in the stream can be curated by a control user and made concurrently accessible to a plurality of subscriber devices by generating and broadcasting a link or another identifier that directs users to access the stream. As used herein, the terms "media content stream," "media stream," "stream" and similar terms refer to a set of ordered content items, such as audio items, video items, multimedia items, and/or mixed-type items. A link to a particular stream can be distributed (e.g., in a social media post) to prospective audience members who operate user devices.

After receiving the request to access the stream from a particular user device, the multimedia platform determines (e.g., by keeping track of the items included in the media content stream) an item from the media content stream that is currently being played. The multimedia platform causes a particular first version of the current content item to be provided to the user device based on context information, which can be captured in a digital item associated with the request (e.g., a request attribute, request metadata, and so forth). The data item can include information regarding an audio output hardware, an instance of a streaming media application on the user device, user account status, user subscription level, information regarding another user device (e.g., a device to hand over control of the session to), account characteristic, or a combination thereof.

In operation according to some embodiments, when another prospective member requests playback, the multimedia platform can receive a second request to access the current content item, the second request including another request attribute. The multimedia platform causes a second version of the current content item to be provided to the user device based on the received request attribute.

In at least some embodiments, a subscriber device event can be detected. For instance, the detected event can be associated with streaming of a first version of a content item and can include, for example, a previously anonymous user logging into an application associated with the multimedia platform, a user selecting a particular, higher-quality version of a content item in a stream, a user device losing connectivity with a particular CDN or edge server, and so forth. Responsive to the detection of the event, the subscriber device can query a multimedia platform for an indication of a second version of the content item, where the second version is different from the first version. The subscriber device can receive the indication of the second version from the multimedia platform, access the second version of the content item based on the indication, and continue to stream the content item using the second version.

The systems and methods described herein offer additional technical improvements. In content streaming sessions, the back-end infrastructure, which can include multimedia platforms and content delivery networks, can receive a high contemporaneous number of requests to serve a particular content item when multiple users attempt to download content for streaming. Such situations can increase network congestion. To optimize computer technology related to serving a contemporaneously requested content item while accounting for user subscription levels, application instance characteristics, and device characteristics, both the geographical locations of the contemporaneous requests and the request attributes (e.g., an audio output hardware, application instance, and/or a logged-in user account) can be considered. For example, a particular version of a content item can be determined to be suitable for playback on a plurality of requestor devices that are also within a geographical service area of a particular CDN. The CDN can be caused to cache the item and serve the item to the plurality of the requestor devices. Causing a CDN to cache a content item and maximizing a number of requestor devices where the resource can be served optimizes performance of systems by minimizing the number of file system read and write operations needed to serve an item.

Furthermore, to optimize computer technology related to serving a content item requested by multiple devices, network congestion can be reduced by reducing a number of network operations. To that end, the requests to serve content to various requestor devices can be packaged, by the multimedia platform, into a single electronic message to a particular CDN that hosts the version of content suitable for consumption by multiple devices.

As used herein, the terms "content" and "content item" refer to an audio, video, multimedia, or combination digital item (e.g., in a format such as MP3, MP4, FLAC, MQA, MKV, MOV, WMV, AVI). Example content items can include songs, podcasts, webcasts, videos, movies, audiobooks, and so forth. The terms "media content stream," "media stream," "session" and similar terms refer to sets (e.g., one or more) of content items made available to audience devices for immediate playback in a pre-recorded, on-demand or live mode.

As used herein, the terms "controller," "engine," and "application" refer to hardware (e.g., processor, memory, network interface, and so forth) and software (e.g., computer-readable processor-executable instructions) that cause a computer system to perform a particular operation or set of operations.

In this description, references to "an embodiment," "one embodiment" or the like, mean that the particular feature, function, structure or characteristic being described is included in at least one embodiment of the technique introduced here. Occurrences of such phrases in this specification do not necessarily all refer to the same embodiment. On the other hand, the embodiments referred to also are not necessarily mutually exclusive.

The preceding summary is provided for the purposes of summarizing some exemplary embodiments to provide an understanding of aspects of the subject matter described herein. Accordingly, the above-described features are merely examples and should not be construed as limiting in any way. Other features, aspects, and advantages of the subject matter described herein will become apparent from the following description of figures and claims.

Turning now to the Figures, FIG. 1 shows an example of an environment 100 in which a platform for selection of media content versions operates, according to an implementation of the present subject matter. The environment 100 includes one or more audience devices 110 operated by audience members who can participate in (e.g., attend) media streaming sessions. As shown, a particular audience device 110 can include an audience device multimedia application 112 (e.g., a media player) structured to allow the user to access media streams, content items, and so forth. In some embodiments, certain users (e.g., users in particular subscription tiers) are enabled to create and manage media streams, such as live sessions. Such users are referred to as control users. A control user can operate a media stream controller device 120. As shown, a media stream controller device 120 can include a device media stream controller application 122 (e.g., an enhanced variant of a media player, a separate application, and so forth) structured to allow the control user to create and manage media streams. According to various embodiments, the audience devices 110 and media stream controller devices 120 can be implemented as, for example, a smart phone, laptop, desktop, tablet, wearable device, smart speaker, artificial reality/virtual reality (AR/VR) headset, or similar device.

Further, as shown, the environment 100 includes a multimedia platform controller 130. The multimedia platform controller 130 can be implemented in a centralized or distributed fashion as one or more shared or dedicated computing resources (e.g., as one or more servers having a shared or dedicated processor, memory, network interface hardware, and so forth). The multimedia platform controller 130 is structured to coordinate the operations of the platform depicted in the environment 100. In some embodiments and/or use cases, the multimedia platform controller 130 can authenticate the audience devices 110 and/or media stream controller devices 120 (e.g., using information managed by the policy controller 134, such as user names, user device configurations, user subscription tiers, user preferences, and so forth). In some embodiments and/or use cases, the multimedia platform controller 130 can receive device requests for content item access. The multimedia platform controller 130 can parse one or more request attributes from a particular request. The request attributes can encode information sufficient for the multimedia platform controller 130 to determine the version of the current item that should be served to the audience device 110 and/or the media stream controller device 120. For instance, request attributes can include information sufficient to determine device characteristics (output device information and so forth), a user's subscription information (user name, subscription tier, and so forth), routing information (e.g., IP address), geographical location information, and so forth. Based on this information, the platform media stream controller 132 can determine an appropriate CDN 140, edge server (142a-n), and an appropriate version of the requested content item to serve to the requesting device.

To that end, the environment 100 includes one or more of a CDN 140. The CDN 140 can be implemented in a distributed fashion as one or more shared or dedicated computing resources (e.g., as one or more servers having a shared or dedicated processor, memory, network interface hardware, and so forth). For example, a CDN 140 can include a plurality of edge servers (142a-n) disposed in different geographical locations. The edge servers (142a-n) can be structured to store (e.g., permanently or in cached form), retrieve and serve particular requested content items. The edge servers (142a-n) can be communicatively coupled to an origin server 150, which can also store (e.g., permanently or in cached form) the content items. In some embodiments, a particular request for a content item from an audience device 110 and/or a media stream controller device 120 can be routed to a particular edge server (142a-n) based, for example, on the device's geographical location being within a service region of a particular edge server (142a-n). If the edge server (142a-n) is not able to find the requested item (e.g., a copy of the item has timed out in the edge server cache (144a-n)), then the edge server (142a-n) can request another copy of the item from the origin server 150, cache the other copy of the item in the edge server cache (144a-n), and then serve the other copy of the item to the requesting device.

The above-described components of FIG. 1 (e.g., one or more audience devices 110, a media stream controller device 120, a multimedia platform controller 130, and one or more of a CDN 140) can work in conjunction to enable users to create, manage and access media content streaming sessions, such as live sessions. For example, a control user at a media stream controller device 120 can use the device media stream controller application 122 to create a media stream, assign a name to the media stream, add items to the media stream, publish the media stream identifier, and so forth. When a media stream is created, a session signal can be created and made accessible to multiple audience members at the same time (or substantially the same time, e.g., to account for network and playback differences between various networks and devices). Users of audience devices 110 can then subscribe to session signals (e.g., media stream identifiers, hyperlinks, and so forth) and stream the relevant content items from one or more of the CDN 140. The multimedia platform controller 130 can evaluate streaming requests from audience devices 110 and the media stream controller device 120 and select appropriate (e.g., highest-quality for available playback devices, optimized for available networks, etc.) versions of a content item in the stream to serve to particular audience devices. Accordingly, while a number of different users can, for example, listen to a streaming song in a live media stream substantially synchronously, user devices will receive particular, optimized versions of the song. As used herein, the term "substantially synchronously" means concurrently, with a substantial (e.g., 95% or greater) temporal overlap of the content item, such as to account for transferring content over the network(s).

As described below, the song/item versions can be geographically optimized, quality-optimized, device-optimized, subscription-optimized, and so forth. As the audience members stream the content items, the control user at the media stream controller device 120 can change the definition of the media stream in real-time. For example, the control user can add items, remove items, reorder items, skip items, replay items, and so forth. In some embodiments, when the platform moves on to playing the next item in the stream, the platform again determines the best version of the item to serve to individual audience devices 110 and the controller device 120. Accordingly, depending on factors such as version availability, CDN 140 configuration, user device characteristics, user subscription levels, availability of pre-cached (e.g., at a particular edge server (142*a-n*) of a CDN 140) versions of an item and so forth, individual user devices can receive different versions of the first item in a stream and the same version of the next item in the stream.

In some embodiments, versions of content items can be substituted during playback and dynamically "stitched together" such that listener experience is not interrupted. For instance, when an audience device 110 loses connectivity with a particular edge server (142*a-n*) during playback, a different edge server (142*a-n*) or a different CDN 140 can be identified as being available to serve a second version of the current content item. The second version can be served to the audience device 110, cached at the audience device 110, and "stitched together" with the previous version so that the user experience is not interrupted. As another example, when an audience device 110 detects that a previously anonymous user has logged in or upgraded an account during playback of a content item, a higher-quality version of the content item can be served to the audience device 110 for the remainder of the item's playback time.

As shown, the computing systems included in the environment 100 can exchange electronic signals, messages, commands, instructions, data items, data sets, and so forth via communication channels (162-170). The communication channels (162-170) can include hardware and/or software components to enable such communications. The components can include, for example, web servers, network connectivity hardware, code libraries, and/or code executables. In some embodiments, some or all of these components can collectively define, configure, and operate communication sockets, application programming interfaces (APIs), software developer kits (SDKs) and so forth. These components can, in whole or in part, be included in or communicatively coupled to the respective end point systems. For example, a particular end point system, such as a multimedia platform controller 130, can include one or more web servers, API function libraries, and so forth. Communication via communication channels (162-170) can be unilateral, bilateral, and/or multilateral.

In an embodiment, the communication channels (162-170) enable a set of message flows among various systems in the environment 100. For example, a device media stream controller application 122 can, upon detecting a control user input that includes the relevant data items (stream name, content items, and so forth) generate and transmit a media stream definition message to the platform media stream controller 132 via communication channel 162. Initially, the platform media stream controller 132 can communicate, via the channel 164, with entities in the CDN 140 to determine which entity in the CDN 140 is available to serve the appropriate version of content items in the stream to the media stream controller device 120 based on request attributes received from the media stream controller device 120 and transmit this information via the communication channel 162. Using this information, the media stream controller device 120 can then generate a call via the communication channel 170 to the indicated CDN 140 to retrieve the item for playback. The platform media stream controller 132 can also share (e.g., publish) a media stream identifier to enable audience members to access the media stream. An audience device 110 can generate a request to access the media stream, based on the identifier, via the communication channel 166. The platform media stream controller 132 can determine the CDN and appropriate version of the current content item in the stream to fulfill the request and transmit this information via the communication channel 166. Using this information, the audience device 110 can then generate a call via the communication channel 168 to the indicated CDN 140 to retrieve the item for playback.

In some embodiments, more than one communication channel can exist for a particular pair of end point systems. For example, an audience device of multiple audience devices 110 can have its own communication channel 166 to the multimedia platform controller 130. For example, a CDN 140 of multiple CDNs 140 can have its own communication channel to the multimedia platform controller 130. As another example, a media stream controller device 120 can have a first communication channel to the multimedia platform controller 130 that can operate similarly to the communication channel 166 between the multimedia platform controller 130 and audience devices 110.

In addition, the media stream controller device 120 can have a subscriber engine 128 structured to connect to a publisher engine 138 of the multimedia platform controller 130, establishing a second communication channel. The publisher engine 138 can operate to share, via the subscriber engine 128, restricted and/or control-level information regarding the media stream, such as audience statistics, audience counts, audience sentiment indicators, and so forth. In some embodiments, sharable items can be organized into topics, and the control user can configure the subscriber engine 128 to subscribe to some or all topics. The subscriber engine 128 can enable audience members to subscribe to a particular control user channel that can list one or more sessions curated by the control user. After the audience member is subscribed, the audience member can be notified when the control user puts out a new live session. In some embodiments, the subscribed user device can receive other notifications such as messages, events (e.g., virtual and/or in-person) involving the control user, other sessions that the control user is attending and the audience user can also join, and so forth.

As shown, computing systems in which a platform for selection of media content versions operates can include one or more units of cache memory. Cache memory is a form of computer memory placed in close proximity to a processor of a particular computing system for comparatively faster data access times (e.g., for frequently used data). In some embodiments, cache memory can be used to implement buffers—for example, to match or optimize communication speed between a sender computing system and a receiver computing system on which a local buffer is implemented. In some embodiments, at least some cache memory units are distinct from at least some buffer memory units. In some embodiments, the units of cache memory associated with a particular computing system can be embodied as memory circuitry that is part of (e.g., implemented on the same chip as) a processor for the computing system. In some embodiments, multiple layers are contemplated that include groups of cache memory units, e.g., L2 and L3 cache layers, further removed from a processor. In some embodiments, multiple processors of a particular computing system, and/or multiple cores of a processor for a particular computing system can share access to a cache memory unit.

To that end, an audience device 110 can include an audience device cache 114; a media stream controller device 120 can include a media stream controller device cache 124; and/or an edge server (142a-n) in a content delivery network 140 can include edge server cache (144a-n). These entities can be used to temporarily (e.g., for a predetermined amount of time) store portions of content items included in a particular media stream in order to facilitate playback. Accordingly, technology in the field of media streaming over a network is improved by utilizing request attributes (e.g., an audio output hardware, application instance, or a logged-in user account) to identify and serve an appropriate (e.g., optimized, compliant) version of the requested content item. For example, if a user's audio output hardware device is not capable of supporting high-fidelity output (as defined, for example, by bit depth or sample rate) or if a logged-in user's subscription level corresponds to a particular level of output fidelity, a correct version of the requested content item can be served to the requesting user device to support device performance and/or appropriately restrict client software operations.

Figure 2A:
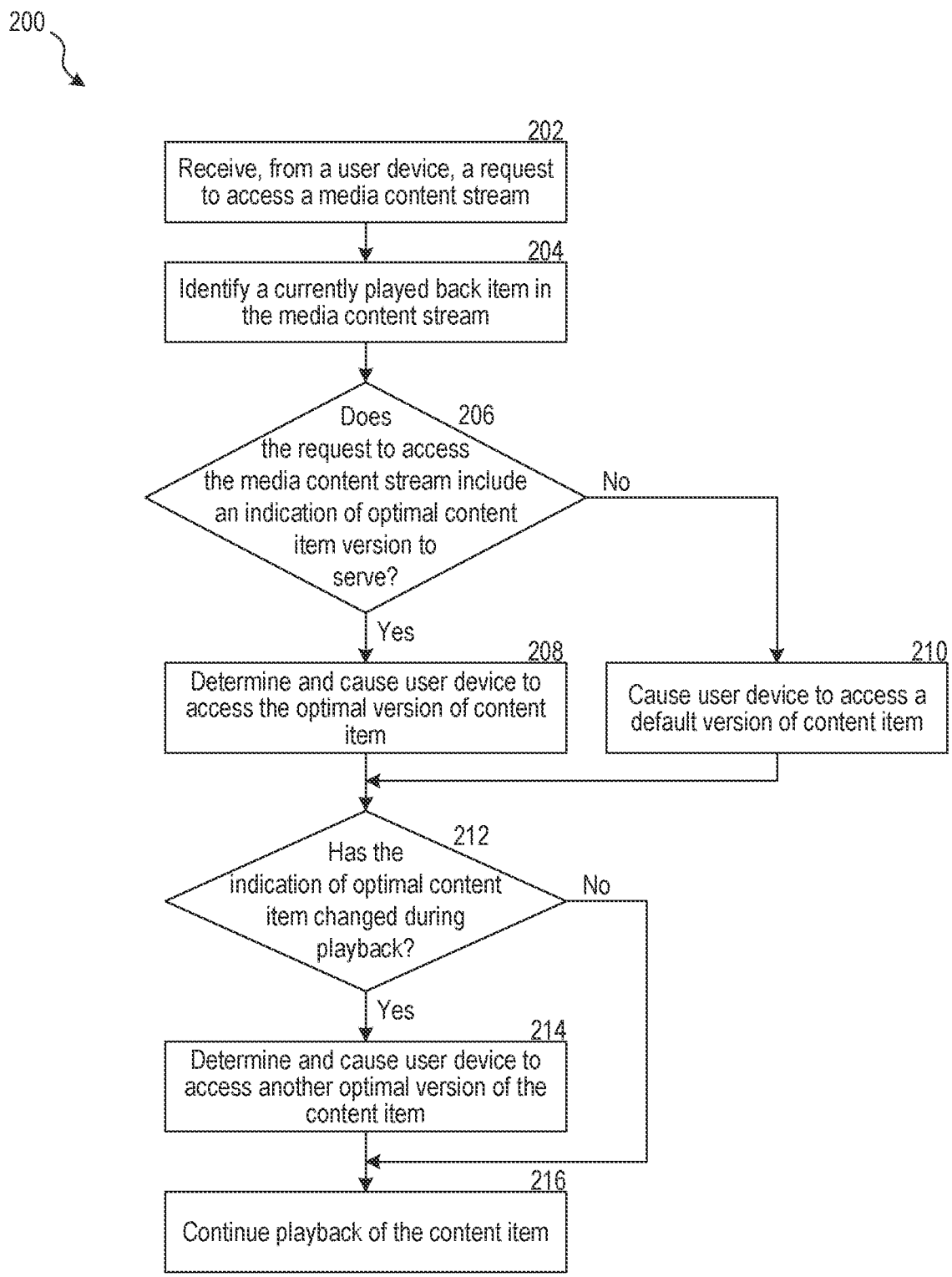
FIG. 2A is a flow diagram illustrating example operations to dynamically serve a media content item using a platform for selection of media content versions, according to an implementation of the present subject matter.
Figure 2B:
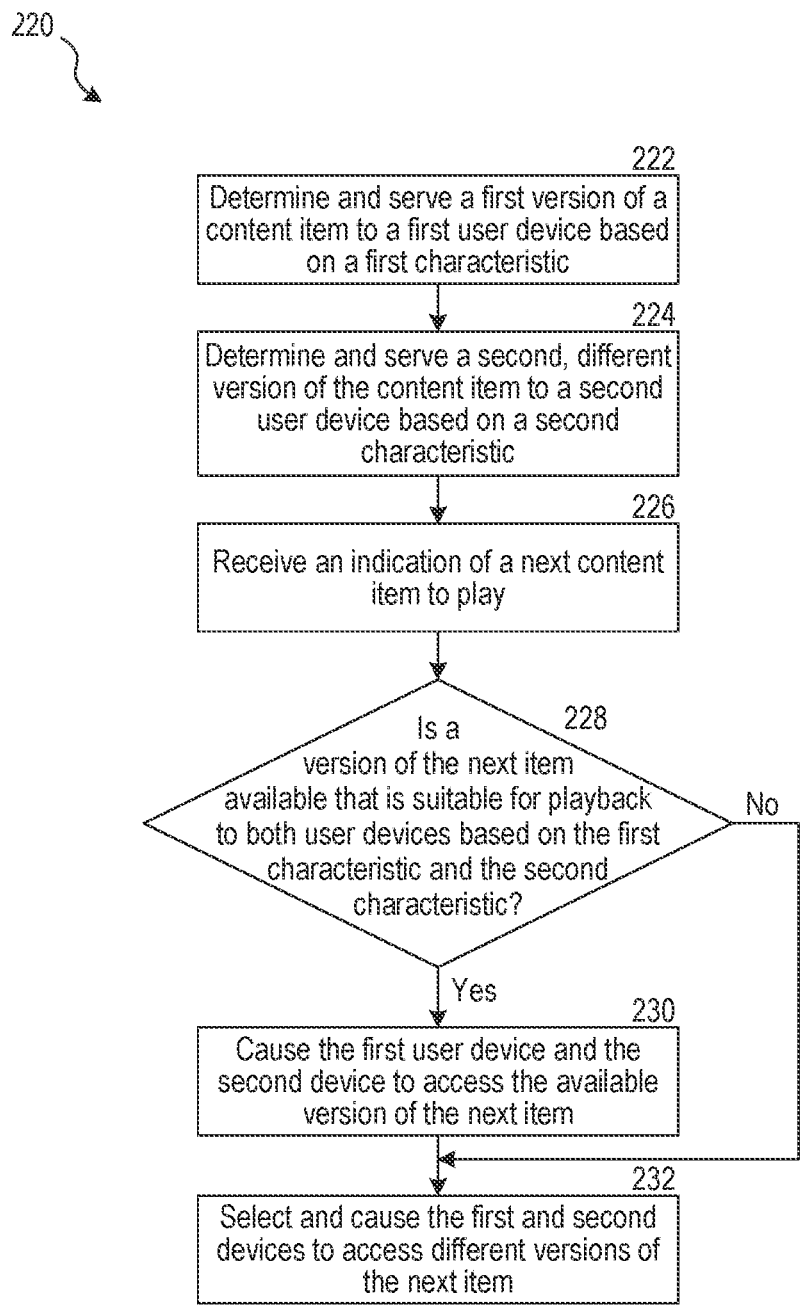
FIG. 2B is a flow diagram illustrating example operations to dynamically select and serve versions of media content items using a platform for selection of media content versions, according to an implementation of the present subject matter.
Figure 3A:
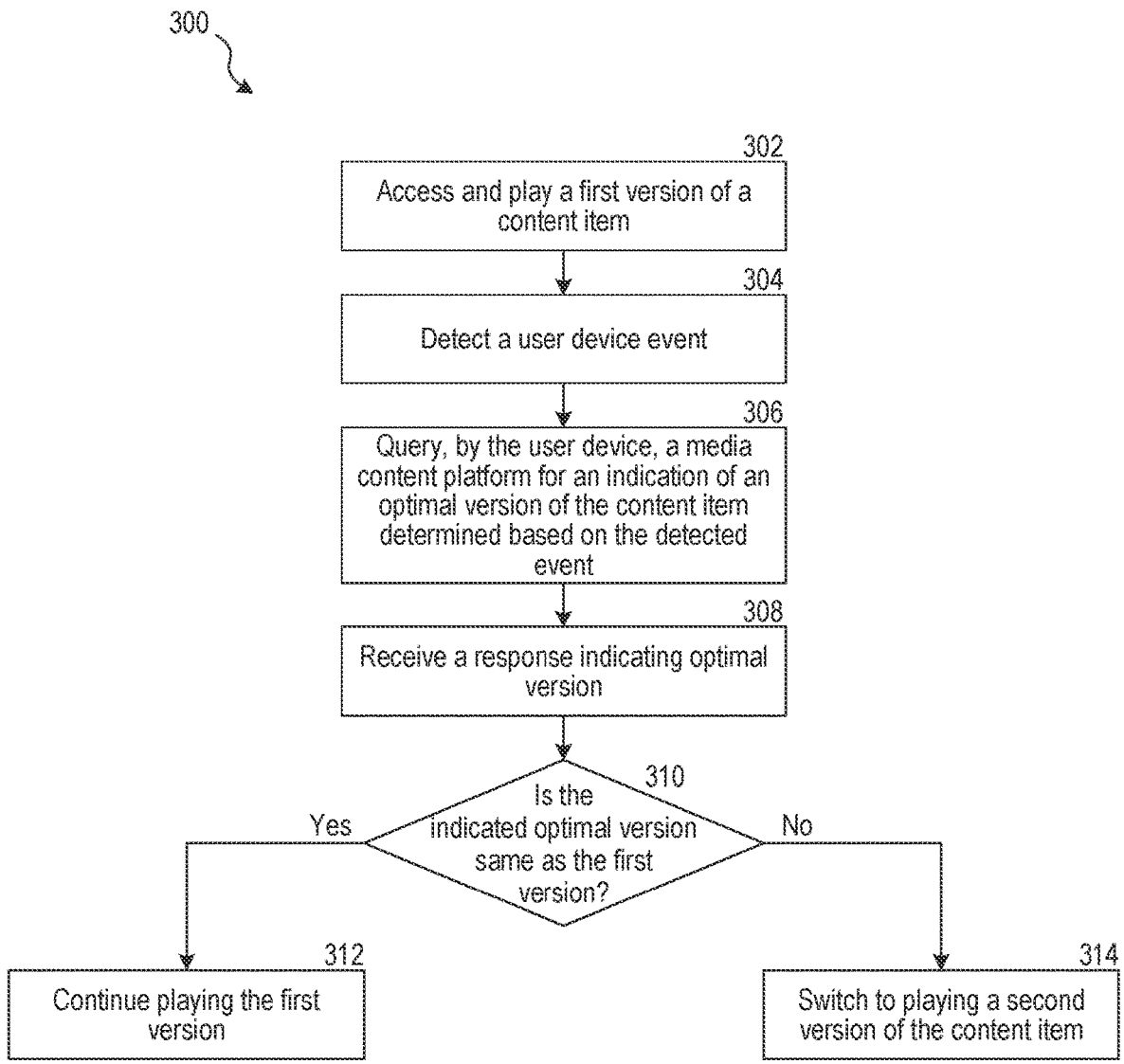
FIG. 3A is a flow diagram illustrating example operations to dynamically switch between versions of a particular media content item using a platform for selection of media content versions, according to an implementation of the present subject matter.

FIGS. 2A-3A are flow diagrams illustrating aspects of operation of a platform for selection of media content versions, according to various implementations of the present subject matter. To that end, FIG. 2A shows example operations 200 to dynamically serve a media content item. FIG. 2B shows example operations 220 to dynamically select and serve versions of media content items. FIG. 3A shows example operations 300 to dynamically switch between versions of a particular media content item. FIG. 3B shows operations 320 to dynamically stitch different versions of a particular media content item (e.g., after switching). According to various embodiments and/or situations, one or more of the audience device 110, media stream controller device 120, multimedia platform controller 130, and/or CDN 140 can enable these operations. The operations described herein can be modified, with various operations being reordered, combined, omitted, and/or modified, to practice various aspects or embodiments of the techniques disclosed herein.

Referring to FIG. 2A, a multimedia platform controller 130 of FIG. 1 can operate in conjunction with a client device (e.g., audience device 110, media stream controller device 120) to dynamically serve a suitable version of a particular content item in a media content stream. Accordingly, operations 200 can be performed substantially synchronously for more than one client device—for example, in situations where two or more users access the media content stream. In some instances, different client devices can receive different versions of the content item. Alternatively or additionally, at least some client devices can receive the same version of the content item from different CDNs (e.g., based on the geographical locations of the clients), and/or at least some client devices can receive the same version of the content item from the same CDN (e.g., the same version cached at a particular edge server 142(a-n)).

In operation of the platform, at 202, a request to access a particular media stream is received, from a client device, by the multimedia platform controller 130. A stream identifier for the media stream may have been previously published in a location accessible to the client device. The accessible location can include a social media application, a streaming application, a re-streaming or stream consolidation service, a blog, a website, an electronic message board and so forth, as shown, for example, in FIG. 7.

At 204, a current item in the media stream is determined by the multimedia platform controller 130. For example, the multimedia platform controller 130 can keep track of a live media stream. For instance, the media stream can include a set of multiple content items, and the multimedia platform controller 130 can keep a copy of the media stream in memory, thereby keeping track of the current content item being streamed in the set. Additionally, in some cases, the multimedia platform controller 130 can monitor a particular temporal location within the current item during playback of the content item by the controller device 120. In other words, the multimedia platform controller 130 determines where in the set of multiple content items the controller device 120 is currently playing back, so that the multimedia platform controller 130 can provide a substantially synchronous playback experience for audience members regardless of when the audience members join the live stream.

Once a current item in the stream is determined, then at 206, a determination can be made, by the multimedia platform controller 130, of whether the request to access the stream includes information sufficient to determine which version of the current item to serve to the client device that requested the item. For example, a request received from the client device can include a device characteristic (output device information and so forth), a user's subscription information (user name, subscription tier, and so forth), routing information (e.g., IP address), geographical location information, and so forth. In some embodiments, the request can include one or more of these items in plain text or encoded form. In some embodiments, the request can include one or more proxy items sufficient to determine one or more of these items (e.g., a user name can be sufficient to determine subscription information, including the subscription tier).

If a suitable (e.g., higher-quality) version of the content item is available to be served by the multimedia platform controller 130 then, at 208, the multimedia platform controller 130 determines the version identifier along with its location information (e.g., the CDN 140, a particular edge server 144a-n, and so forth) and transmits this information to the requesting client device, which can initiate playback of the item using the information. Otherwise, at 210, the multimedia platform controller 130 determines a default version identifier along with its location information (e.g., the CDN 140, a particular edge server 142a-n, and so forth) and transmits this information to the requesting client device, which can initiate playback of the item using the information. In some embodiments, the default version can be determined, for example, based on the geographical location of the client device by identifying the nearest edge server 142a-n that has a version of the content item. In some embodiments, the default version can be determined by identifying an edge server 144a-n that has a cached version of the item available. In some embodiments, the default version can be determined by identifying an edge server 142a-n that has a cached version of the item available and is already expected to serve the cached version to another client device.

During playback of the item, a determination can be made by the multimedia platform controller 130, at 212, of whether the client device now can be served a different version of the content item. For example, the client may have lost connectivity with a particular CDN 140 or edge server 142a-n and needs the version to be served from a different server. In some cases, a previously anonymous user may have logged in, and the user's subscription tier enables the user device to receive a higher-quality version. In some examples, a user may have selected a particular version in a pay-for-quality context. A pay-for-quality context relates to an additional fee being provided for a particular content item (or items) such that the user account is granted access to higher quality version(s) for a threshold amount of time and/or playback counts, then reverts to the previous status of version quality after the threshold expires. If the client device can be served a different version, then, at 214, the different version can be determined by the multimedia platform controller 130 based on information received from the client device and served to the client device. At 216, the playback of the current item can continue at the client device using the different version. The client device can stitch together the two or more versions as described, for example, in reference to FIG. 3B.

Referring to FIG. 2B, a multimedia platform controller 130 of FIG. 1 can operate in conjunction with at least two client devices (e.g., audience device 110, media stream controller device 120) to determine and serve versions of content items in a media stream. Advantageously, the techniques described herein disaggregate a media stream into its individual content items and further disaggregate content items into content item versions, which optimizes the process of delivering content and enables synchronous sourcing of requestor-appropriate content versions in a stream. For example, different versions of an item can be sourced from different CDNs 140, different edge servers 142*a-n* within a CDN 140, or the same edge server 142*a-n* within a CDN 140. Because some content items may have a limited number of versions in existence and/or because some requestor devices may be in the same subscription tier and geographical location, two particular devices can receive different versions of one content item and the same version of the next item (or vice versa) based on the optimization(s).

In operation of the platform, at 222, a first version of a content item is served, by the multimedia platform controller 130, to a first device and, at 224, a different second version of the content item is served, by the multimedia platform controller 130, to a second device, where both devices can be subscribed to a session signal. At 226, an indication of a next content item to play is received by the multimedia platform controller 130. For example, the control user may have skipped the remainder of the previous content item or the content item may have ended. If, at 228, it is determined by the multimedia platform controller 130 that a particular third version of the next content item is available that satisfies criteria for both devices (e.g., based on geographical location, subscription tiers of devices, etc.), then, at 230, a same version of the next item is served, by the multimedia platform controller 130, to both devices. Otherwise, at 232, different (e.g., fourth and fifth) versions of the next item are served, by the multimedia platform controller 130, to the devices.

Referring to FIG. 3A, operations to dynamically switch between versions of a particular media content item are shown. The operations can be client-side operations. For example, a client device may have lost connectivity with a particular CDN 140 or edge server 142*a-n* and may receive a remainder of the item from a different server. Alternatively or additionally, a previously anonymous user may have logged in during playback, and the user's subscription tier may enable him or her to receive a higher-quality version. In some cases, a user may have selected a particular version in a pay-for-quality context.

In operation of the platform, at 302, the client device accesses, caches, and plays back a first version. Upon detecting, at 304, an event that can cause a switch to a different version, the client device can query, at 306, a multimedia platform controller 130 for an indication of a current item in the stream and receive, at 308, a response that includes a version indicator, a CDN indicator, and so forth. In some instances, the client device may have seamlessly failed over from one edge server 142*a-n* to another edge server 142*a-n* within a particular CDN 140. In such cases, the client device continues, at 312, playback of the cached version. Otherwise, the client retrieves, at 314, and caches the indicated new version and switches to playing the new version.

Figure 3B:
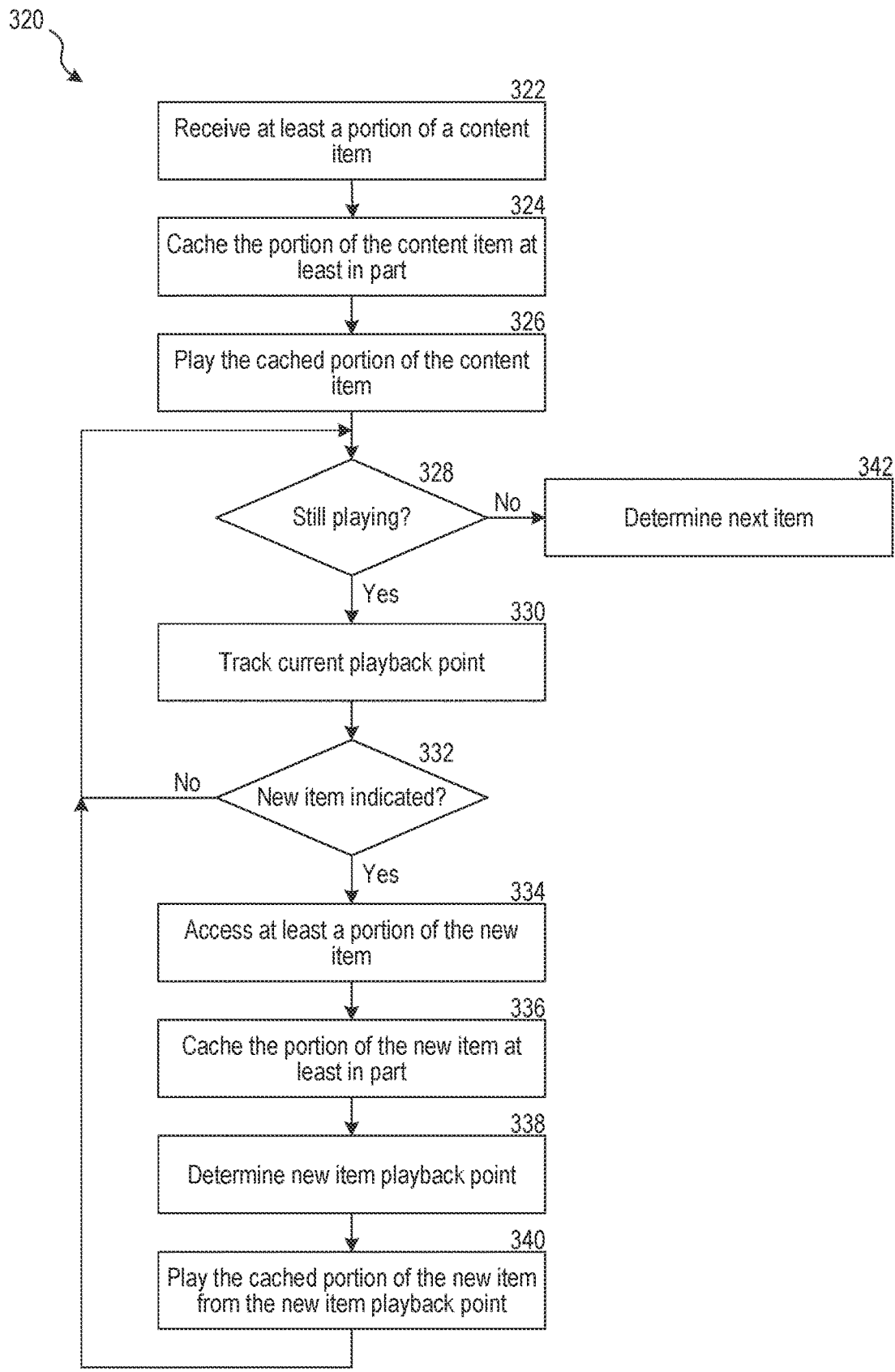
FIG. 3B is a flow diagram illustrating example operations to dynamically stitch together different versions of a particular media content item using a platform for selection of media content versions, according to an implementation of the present subject matter.

Referring to FIG. 3B, a client device (e.g., audience device 110, media stream controller device 120) can stitch together two or more versions of a particular content item in a media stream—after, for example, dynamically switching between versions as described in relation to FIG. 3A. For instance, a client device can lose connectivity with a particular edge server 142*a-n* within a particular CDN 140 and can generate a request to switch to another version of the current item served by a different edge server 142*a-n*. In another example, an audience member can log in during playback, which can cause the platform to serve a higher-quality version for the remainder of playback duration for a particular item being streamed.

In operation of the platform, at 322, a first version of the content item is received at the client device. At 324, the first version is cached at the client device to enable playback, at 326. During playback (328), the client device can track, at 330, the current playback location of the content item using the cached first version. When an event is detected, at 332, that can cause a switch to another version of the content item, a second version can be received, at 334, and cached, at 336. A particular point within the cached second version can be determined using a time stamp within the cached second version that corresponds to the last known playback location in the cached first version. In some embodiments, an offset value can be added to a time stamp associated with the last known playback location to account for the duration of the interruption. In some embodiments, if the offset value is less than a predetermined number (e.g., 500 milliseconds, 1 second), the offset value is not added. In such embodiments, the duration of the interruption is assumed to be negligible such that the synchronicity of the playback of the item at the client device relative to playback of the item at other devices is not compromised.

Using the timestamp within the cached second version as the starting location, at 338, the client device initiates playback of the second cached version at 340. Accordingly, the first cached version and the second cached version are stitched together, creating an uninterrupted or minimally interrupted user experience.

Figure 4:
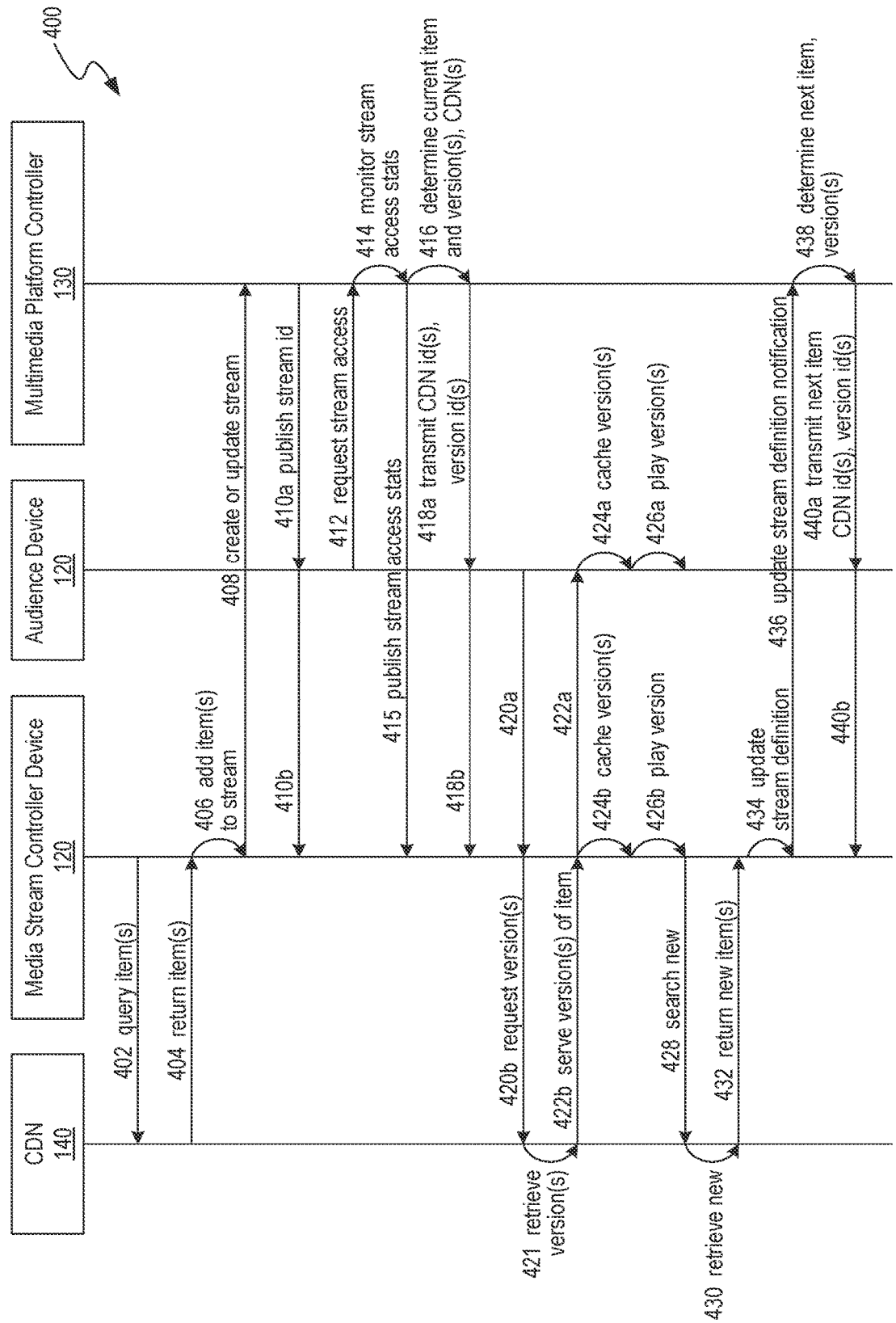
FIG. 4 shows an example of a sequence of messages between various entities in connection with creating a media stream and serving items therefrom using a platform for selection of media content versions, according to an implementation of the present subject matter.
Figure 5:
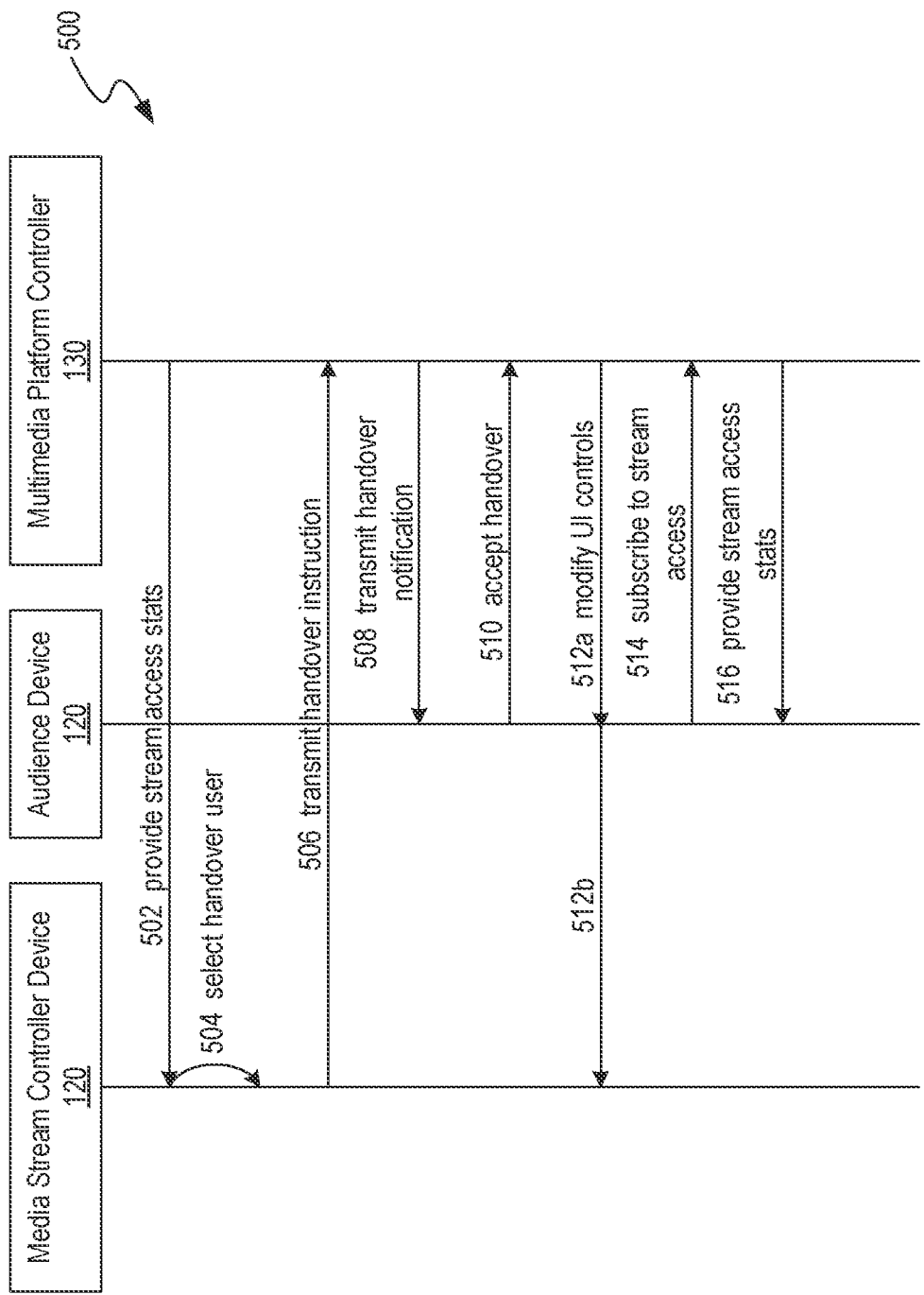
FIG. 5 shows an example of a sequence of messages between various entities in connection with media stream control handover using a platform for selection of media content versions, according to an implementation of the present subject matter.

FIGS. 4 and 5 show example sequences of electronic messages among example computing systems in the environment 100 of FIG. 1, according to implementations of the present subject matter. FIG. 4 shows an example of a sequence 400 of messages between various entities (audience device 110, media stream controller device 120, multimedia platform controller 130, and/or CDN 140) in connection with creating a media stream and serving content items therefrom. FIG. 5 shows an example of a sequence 500 of messages between various entities (audience device 110, media stream controller device 120, multimedia platform controller 130, CDN 140) in connection with media stream control handover using a platform for selection of media content versions.

One of skill will appreciate that various entities described herein can communicate via suitable communication channels (162-170) using technical features thereof (e.g., by generating and transmitting, via the communication channels (162-170) electronic API messages according to formats structured to enhance system interoperability). According to various embodiments and/or situations, one or more of the audience device 110, media stream controller device 120, multimedia platform controller 130, and/or CDN 140 can be used, and the systems are referenced in singular form for brevity. The message sequences described herein can be modified, with various operations being reordered, combined, omitted, and/or modified, to practice various aspects or embodiments of the techniques disclosed herein.

Turning now to FIG. 4, a particular user (e.g., control user, administrator, DJ) of the environment 100 can have access and/or subscription privileges that enable the user to create and/or manage media streams. As part of creating or managing a media stream, the control user can cause the media stream controller device 120 to query 402 a CDN 140 for content items the control user wants to be included in the media stream, e.g., create a playlist. The CDN 140 can generate a result set and return 404, in the result set, item identifiers, item titles, item creator information, and other relevant metadata to the media stream controller device 120, where the items can be added 406 to the media stream as described, for example, in reference to FIG. 6. The subset of item identifiers received from the CDN 140 that are added 406 to the media stream at the media stream controller device 120 can be included in a media stream created 408, at the direction of the control user via the media stream controller device 120, by the multimedia platform controller 130. The multimedia platform controller 130 can publish (410a, 410b) the stream identifier for the newly created media stream in a location accessible to at least one prospective audience device 110 and media stream controller device 120. The accessible location can include a social media application, a streaming application, a re-streaming or stream consolidation service, a blog, a website, an electronic message board and so forth, as shown, for example, in FIG. 7.

Using the published stream identifier, the audience device 110 can request 412 stream access from the multimedia platform controller 130, which can monitor 414 stream access statistics, determine 416 the current item in the stream (e.g., by keeping track of currently played items in the stream at the multimedia platform controller 130 and/or the media stream controller device 120), and grant access to the audience device 110 and/or media stream controller device 120 by generating and transmitting (418a, 418b) electronic messages to the devices.

An example electronic message transmitted to a particular device to enable access to items in the requested media stream can include a CDN identifier. In some embodiments, the CDN identifier is an identifier of the origin server 150, which can handle distribution of content item requests to specific edge servers closest to or optimized for communication with a particular device that requested content. In some embodiments, the CDN identifier is an identifier of the edge server (e.g., an edge server (144a-n) determined by the multimedia platform controller 130 to be closest to or optimized for communication with a particular device that requested content.

An example electronic message to a particular device can include an identifier of a version of the current item in the stream determined, by the multimedia platform controller 130, to be best suited for playback at the requesting device according to, for example, a geographical restriction associated with the requestor account, a subscription tier of the requestor, a device characteristic or another item associated with the action to request 412 stream access. To that end, the electronic message requesting 412 stream access can include an electronic attribute (e.g., request attribute) that encodes information sufficient to determine the version of the current item that should be served to the audience device 110 and/or the media stream controller device 120.

Using the CDN identifier and the version identifier indicated by the multimedia platform controller 130, the audience device 110 and/or the media stream controller device 120 can request (420a, 420b) the item from the indicated CDN 140, which serves (422a, 422b) the item to the respective requesting device. The requesting device can buffer and/or cache (424a, 424b) the received item at least in part and play back (426a, 426b) the received item from the buffer and/or cache.

In some embodiments, the multimedia platform controller 130 is structured to exchange electronic messages with the media stream controller device 120 or otherwise monitor playback of items in the stream to determine when playback of a next item in the stream should be initiated. Accordingly, electronic messages that include the playback-related instructions described above (CDN identifier, item version identifier) can be generated and transmitted by the multimedia platform controller 130 to the audience device 110 and/or media stream controller device 120 when playback of a next item in the stream should be initiated. Alternatively or additionally, the audience device 110 and/or the CDN 140 can receive a copy of item identifiers for items included in a particular stream and request/serve the items as appropriate. The multimedia platform controller 130 can determine 438 the next item and generate and transmit (440a, 440b) updated instructions for the devices to retrieve the next item from the CDN 140 in response to the control user causing a change (428-436) in the stream definition. The change in the stream definition can be caused by skipping an item, reordering items, and so forth and/or when an audience member logs in, upgrades a subscription level, and/or selects a higher-quality current version of an item for playback as described in reference to FIG. 8.

Turning now to FIG. 5, a particular control user that operates the media stream controller device 120 may want to hand over control of a media stream (e.g., a live media stream) to another user. Advantageously, the techniques described herein enable virtual handover without requiring physical handover of computing equipment, such as the media stream controller device 120. In some cases, rather than handing over physical equipment, the multimedia platform controller 130 can enable the audience device 110 of an audience member that assumes control of the media stream to function as a new media stream controller device 120. To that end, the policy controller 134 can activate and/or deactivate interface components and/or executables for various users as appropriate.

Figure 9:
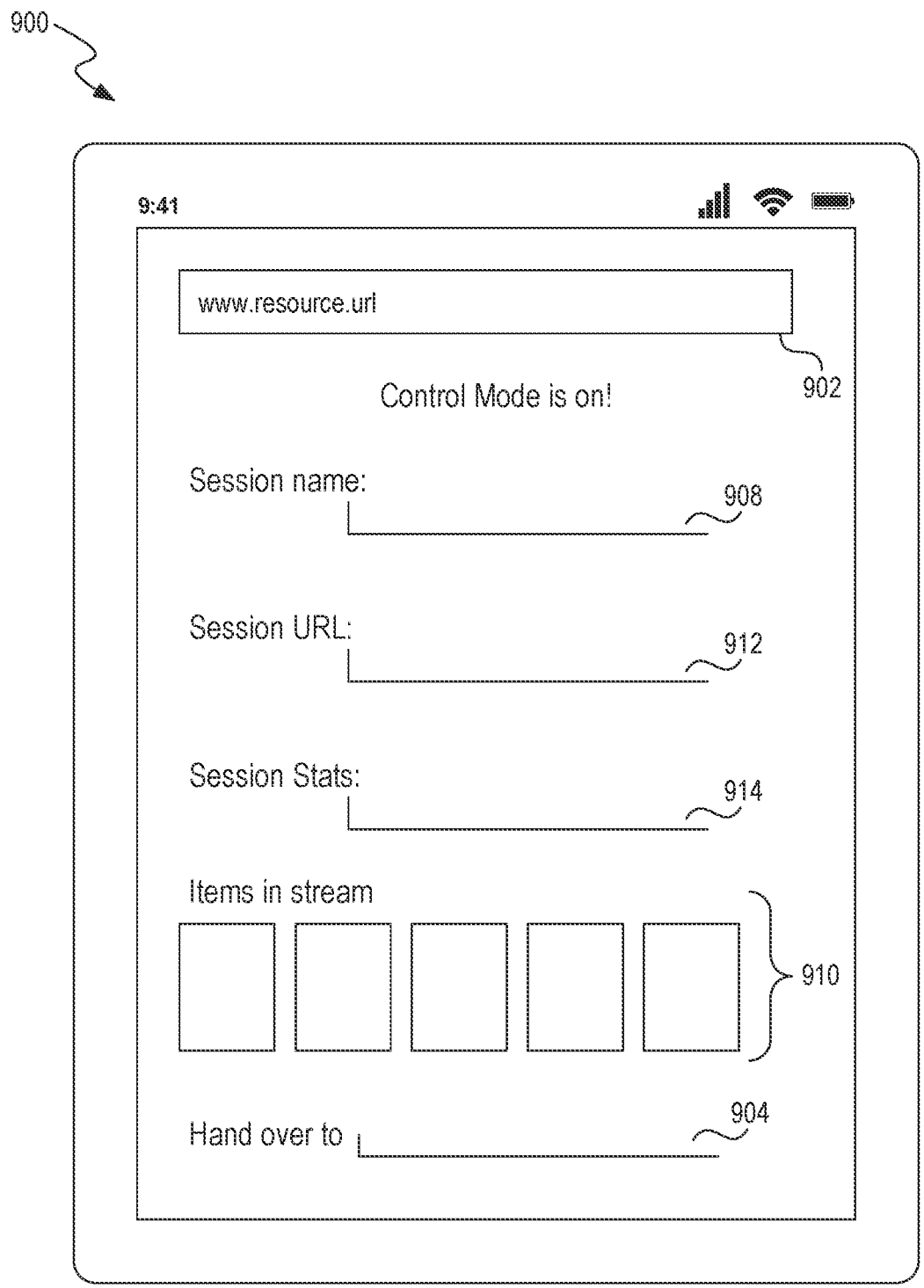
FIG. 9 shows an example of a GUI that can be used to hand over control of a media stream using a platform for selection of media content versions, according to an implementation of the present subject matter.

An example user interface for media stream handover is described in relation to FIG. 9. In operation of the platform, the media stream controller device 120 can enable the control user to select 504 the handover user, for example, from a user data set provided 502 by the multimedia platform controller 130 as part of the stream access statistics (e.g., from a universe of current audience members for the media stream that is being handed over). Once a handover user is selected, the media stream controller device 120 can generate and transmit 506 a handover instruction to the multimedia platform controller 130, which can generate and transmit 508 a handover notification (e.g., a text message, a pop-up message, an email message) to an audience device 110 associated with the handover user. The audience device 110 can be determined, for instance, by parsing device connectivity information (e.g., IP address) from a request attribute included in the request 412 stream access message of FIG. 4. The handover user can cause the audience device 110 to accept 510 the handover, in which case the multimedia platform controller 130 can cause the audience device multimedia application 112 and the device media stream controller application 122 to modify (512a, 512b) the user interface elements to reflect the handover (e.g., to disallow the former control user to manage the media stream and to allow the handover user to manage the media stream as shown, for example, in FIGS. 6 and 9). In some embodiments, a subscriber component of the audience device 110 of the user that assumes control of the media stream can be activated such that the user can subscribe 514 to stream access statistics provided 516 (e.g., via the publisher engine 138) by the multimedia platform controller 130. In some embodiments, a control user identifier for the media stream is updated to reflect the handover user information.

Turning now to FIGS. 6-9, these Figures show example graphical user interfaces (e.g., GUIs) that can enable various functional, user-interactive aspects of a platform for selection of media content versions. According to various embodiments, example user interfaces can be implemented on suitable user- and/or administrator-operated devices, such as the audience device 110 and/or media stream controller device 120 of FIG. 1. Example user interfaces can include various user-interactive hardware or software components, such as one or more of an input device (e.g., button, joystick, keyboard, mouse, touch screen, camera, microphone, scanner, other biometric or sensory input devices), an output device (e.g., display, speaker, LED indicator), and/or a programmable user-interactive control (e.g., icon, graphic, button, toggle, slider, text field, navigable link, tile, card, glider).

The user interfaces can include one or more executables, programmable graphics, and so forth deployed on the audience device 110 (e.g., as part of the audience device multimedia application 112) and/or on the media stream controller device 120 (e.g., as part of the device media stream controller application 122). In some embodiments, a particular version of a user interface can be selected (e.g., by the multimedia platform controller 130) to be displayed at an audience device 110 based on determining that the requestor is not a logged-in user or that the requestor is a logged-in user without media stream control credentials. The presented particular version can enable audience-level functionality, such as application browsing, selection of a media stream to access, playback of items in a media content stream, device side stitching of content item versions, interaction with other users via posts, messaging, and the like, sentiment and/or feedback sharing regarding items in media stream, performing financial transactions that involve particular selected items, media streams, and/or users, and so forth. An administrator (e.g., control user, DJ) version of a user interface can be selected (e.g., by the multimedia platform controller 130) to be displayed at a media stream controller device 120 based on determining that the requestor is a logged-in user that has stream control credentials with respect to a particular stream, has subscription-based administrator level credentials, etc. In such cases, the presented particular version can enable additional, control-level functionality, such as selection of a media stream to generate, access, modify, and/or handover and control (add, remove, reorder, version select) of items in a media content stream.

Figure 6:
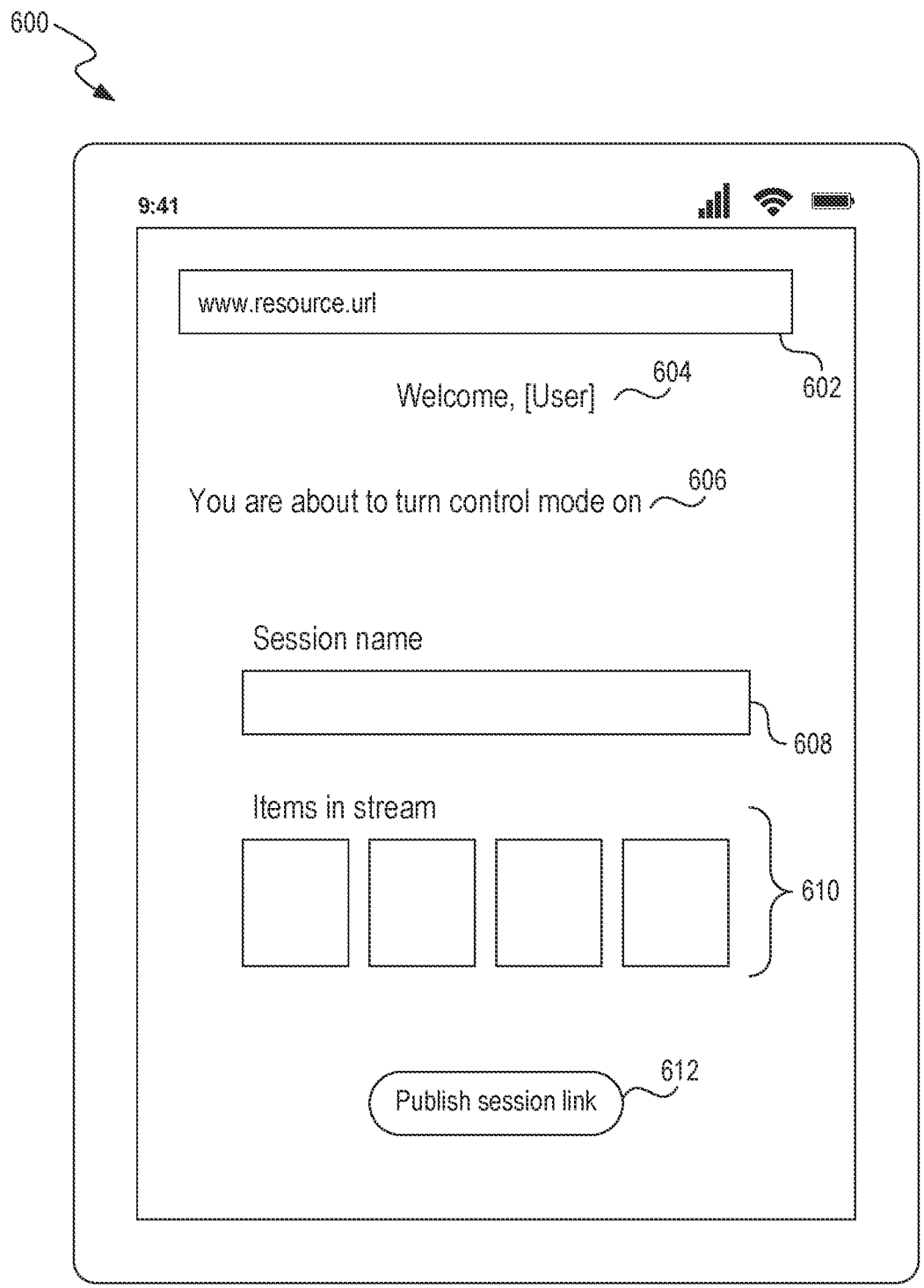
FIG. 6 shows an example of a graphical user interface (GUI) that can be used to generate a media stream and manage items therein using a platform for selection of media content versions, according to an implementation of the present subject matter.

FIG. 6 shows an example of a GUI 600 that can be used (e.g., by a DJ) to generate a media stream and manage items therein using the environment 100 for selection of media content versions, according to an implementation of the present subject matter. The GUI 600 can be displayed via the device media stream controller application 122 and can include various navigation controls structured to orient the logged-in user. The navigation controls can include, for example, a page identifier 602, which can include a unique locator address for items in the GUI 600. The orientation controls can include notification 606, which can be structured to inform the logged-in user 604 that the user is about to turn on control mode, DJ mode, stream creator mode, and so forth. The notification 606 can be displayed in response to detecting a logged-in user 604 interaction with a GUI control structured to accept a user instruction to enter the control mode, enter DJ mode, create a new content media stream (session), and so forth. The GUI 600 can enable the logged-in user 604 to specify (e.g., speak, type, select, cause the application to auto-generate) a session name 608.

The GUI 600 can enable the logged-in user 604 to select content items 610 to be added to a particular content media stream. To create a content media stream, the user can, for example, select content items from among suggested content items, locally stored content items, a content item search result set, and so forth. From the user's perspective, the content media stream can be created in any known or convenient manner as done today on any existing streaming media service. For example, the user can input a name for a new content media stream and then browse various artists, albums and or items provided by the platform (e.g., via one or more CDN 140), sampling those that are of interest, and selecting an item to be added by selecting a provided GUI control (e.g., by clicking or tapping an "Add to media stream" control). The specific sequence of actions by which a content media stream is created can vary from one embodiment to another and is not germane to the technique introduced here. When the user is satisfied with the selection and order of content items 610 in the content media stream, the user can click or tap a GUI control to save the content items 610. Additionally or alternatively, the device media stream controller application 122 can be structured to automatically save the identifiers and ordering information of content items 610 as the user interacts with the content items 610.

The GUI 600 can enable the logged-in user 604 to publish the session link by clicking or tapping on a publish session link control 612. According to various embodiments, upon detecting a user interaction with the publish session link control 612, the device media stream controller application 122 can generate and transmit an electronic message to the multimedia platform controller 130, causing the platform media stream controller 132 to automatically generate a unique identifier (e.g., a URI, a URL, or another suitable identifier) of a media stream (a content media stream identifier). In some embodiments, the GUI 600 can enable a user to enter customization information to customize the unique identifier. The unique identifier can identify the content media stream as a unique resource individually addressable via the Internet.

Figure 7:
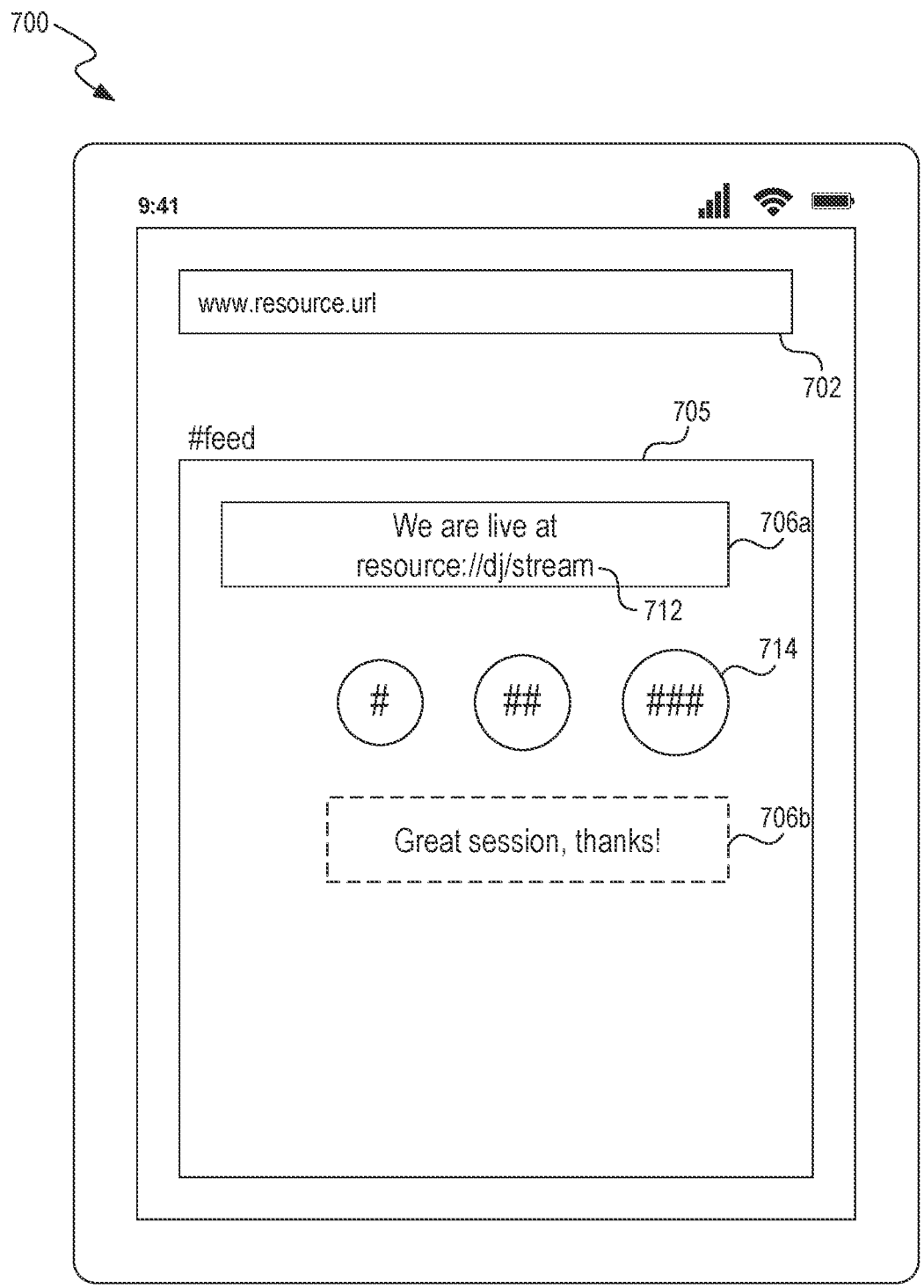
FIG. 7 shows an example of a GUI that can be used to enable audience access to a media stream using a platform for selection of media content versions, according to an implementation of the present subject matter.

FIG. 7 shows an example of a GUI 700 that can be used to enable audience access to a media stream using the environment 100 for selection of media content versions, according to an implementation of the present subject matter. The GUI 700 can be displayed via the audience device multimedia application 112 or another application accessible via an audience device 110 (e.g., a social media application, a streaming application, a re-streaming or stream consolidation service, a blog, a website, an electronic message board and so forth). The GUI 700 can include various navigation controls structured to orient the user. The navigation controls can include, for example, a page identifier 702, which can include a unique locator address for items in the GUI 700. Generally, the GUI 700 can include any suitable elements that can enable sharing (e.g., publication, posting) of a content media stream identifier 712. For example, GUI 700 can include an electronic feed 705. The electronic feed 705 can be structured to enable users to generate posts (706a, 706b). A particular post, which can be accessible to more than one user device at the same time (or substantially the same time, e.g., to account for network and playback differences between various networks and devices) can include an embedded content media stream identifier 712. When a user interacts with (e.g., clicks, taps, subscribes to or otherwise activates) the content media stream identifier 712, which can include a hyperlink, the user can be presented with another GUI that enables the user to interact with aspects of the media stream. An example is described in relation to FIG. 8 below. In some embodiments, the GUI 700 includes elements that enable users to interact with items 714, which can be stored in association with a particular post (706a, 706b) and/or content media stream identifier 712. As shown, the items 714 can facilitate audience sentiment tracking in relation to a particular post (706a, 706b) and/or content media stream identifier 712. For example, items 714 can include supplemental information, such as reaction counts (e.g., number of "like" actions, number of "love" actions), post sharing counts, financial transaction (e.g., "tip the DJ") amounts and/or counts (e.g., "150 audience members have tipped the DJ for a total amount of $1,000"), and so forth. The supplemental information can be updated in substantially real-time. In some embodiments, a number of playback instances for particular versions played at the audience devices can be tracked and aggregated (e.g., by generating counts, averages, and/or determining total item playback time across devices to account for partial item playback). Such aggregations can improve royalty tracking for media stream creators and/or for artists associated with items in a particular media stream.

Figure 8:
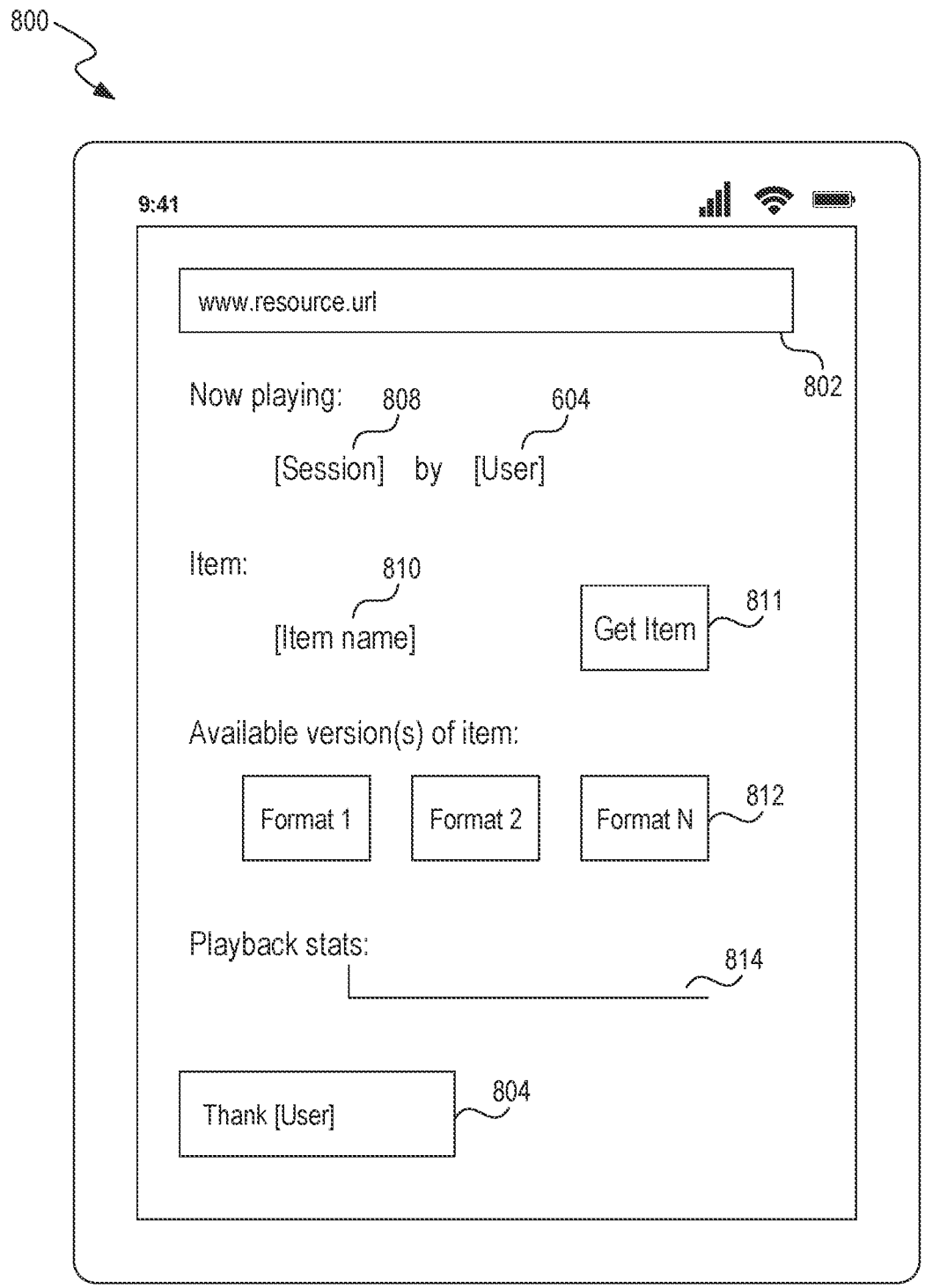
FIG. 8 shows an example of a GUI that can be used to interact with aspects of a media stream using a platform for selection of media content versions, according to an implementation of the present subject matter.

FIG. 8 shows an example of a GUI 800 that can be used to interact with aspects of a media stream using the environment 100 for selection of media content versions, according to an implementation of the present subject matter. The GUI 800 can be displayed via the audience device multimedia application 112 or as a plug-in to another application accessible via an audience device 110 (e.g., a social media application, a streaming application, a re-streaming or stream consolidation service, a blog, a website, an electronic message board and so forth). The GUI 800 can include various navigation controls structured to orient the user. The navigation controls can include, for example, a page identifier 802, which can include a unique locator address for items in the GUI 800. Generally, the GUI 800 can include any suitable elements that can enable interaction with a content media stream 808. For example, the GUI 800 can include a content media stream identifier 808, which can include a unique identifier and/or a title. The GUI 800 can include a control user (e.g., creator DJ, current DJ) identifier 604 and/or a user-interactive control 804 that can programmatically reference the identifier 604. In some embodiments, interacting with the control 804 can enable an audience member to share a reaction or sentiment regarding a content media stream 808 or a current item 810 in the content media stream. In some embodiments, interacting with the control 804 can enable an audience member to perform a financial transaction involving a particular current item 810 without interrupting item playback. The financial transaction can include, for example, purchasing the item, borrowing the item, tipping an item creator, and so forth. In some embodiments, interacting with the control 804 can enable an audience member to perform a financial transaction involving a particular content media stream 808 and/or control user 604 without interrupting item playback. The financial transaction can include, for example, sending funds to (tipping) the control user 604, and so forth.

In some embodiments, the multimedia platform controller 130 can generate and cause the audience device multimedia application 112 to display a set 812 of upgraded (e.g., comparatively higher-quality, higher-fidelity, and so forth) versions of a particular item 810 in a content media stream 808. For example, the set 812 of available upgraded versions can be custom-generated based on determining that a particular audience member is not a logged-in user or that the audience member is a logged-in user in a particular subscription tier. In some embodiments, the proposed upgraded versions in the set 812 can include comparatively higher bit rates relative to the currently streaming version of a content item. In some embodiments, the proposed upgraded versions in the set 812 can include different audio formats, such as lossless audio (e.g., FLAC). More generally in relation to at least some embodiments, the upgraded versions are known as high-definition audio and can be characterized by comparatively higher sample rates (e.g., 44.1 kHz, 96 KHz, 192 kHz), comparatively higher bit depths (e.g., 16-bit, 24-bit), and/or a combination thereof (e.g., 44.1 kHz/24-bit, 48 kHz/24-bit, 88.2 KHz/24-bit, 96 KHz/24-bit).

In an example, upon detecting a user interaction with a particular item in the set 812, an anonymous audience member can be presented with a log-in user interface and/or a new user subscription user interface without interrupting playback of the content item 810. In another example, upon detecting a user interaction with a particular item in the set 812, a logged-in user can be presented with a subscription upgrade user interface without interrupting playback of the content item 810. Once a user logs in, registers, or upgrades during playback of a previously provided version of the content item 810, a different, upgraded version can be provided to the audience device 110 and stitched together with the initially provided version without interrupting playback, as described, for example, in reference to FIG. 2B.

FIG. 9 shows an example of a GUI 900 that can be used to hand over control of a media stream using the environment 100 for selection of media content versions, according to an implementation of the present subject matter. The GUI 900 can be displayed via the device media stream controller application 122 and can include various navigation controls structured to orient the logged-in user. The navigation controls can include, for example, a page identifier 902, which can include a unique locator address for items in the GUI 900. The orientation controls can include notification, which can be structured to inform the logged-in user that control mode, DJ mode, stream creator mode, or another operating mode is active. The notification can be displayed in response to detecting a logged-in user interaction with a GUI control structured to accept a user instruction to access a particular content media stream (session).

The GUI 900 can enable the logged-in user to control (add, remove, reorder, version select) items 910 in a media content stream as described above. In some embodiments, item 910 control operations can be performed without interrupting playback of a particular current item in the set. Such control operations can include, for example, removal of a queued-up item not yet played, addition of a queued-up item not yet played and different from the current item, reordering of queued-up items not yet played, and so forth. In some embodiments, item 910 control operations can be performed by seamlessly transitioning from a particular current item in the set to a different item. Such control operations can include, for example, skipping a particular item to initiate playback of a different queued-up item. For instance, if a control user decides to skip a particular item in the items 910, the device media stream controller application 122 can generate and transmit an electronic message to the multimedia platform controller 130. The electronic message can include a content item identifier of the next item to play. The multimedia platform controller 130 can identify a set of current audience members and control user, select suitable versions of the next item for the audience members and/or the control user, and transmit identifiers of the suitable versions and their corresponding CDNs 140 to the respective audience devices 110 and media stream controller device 120. While playing the previous item, the devices can access the suitable versions of the next content item(s), locally cache the versions at least in part, and switch to playing the cached versions without interrupting playback without creating significant gaps in the playback.

The GUI 900 can enable the logged-in user to hand over control of the stream 908 to a different audience member. In some embodiments, the control user can subscribe, via the subscriber engine 128, to electronic messages from the multimedia platform controller 130 that include audience member statistics 914. The audience member statistics can include, for example, user names, user reactions, user financial transactions related to the media stream 908, user geographical locations, user time zones, and so forth. The control user can select an audience member 904 from the member statistics 914 data set to hand over the media stream 908. In some implementations, the control user can browse and/or search the user population, which may include those who are not currently members of the audience, to select a handover user for the media stream 908.

Figure 10:
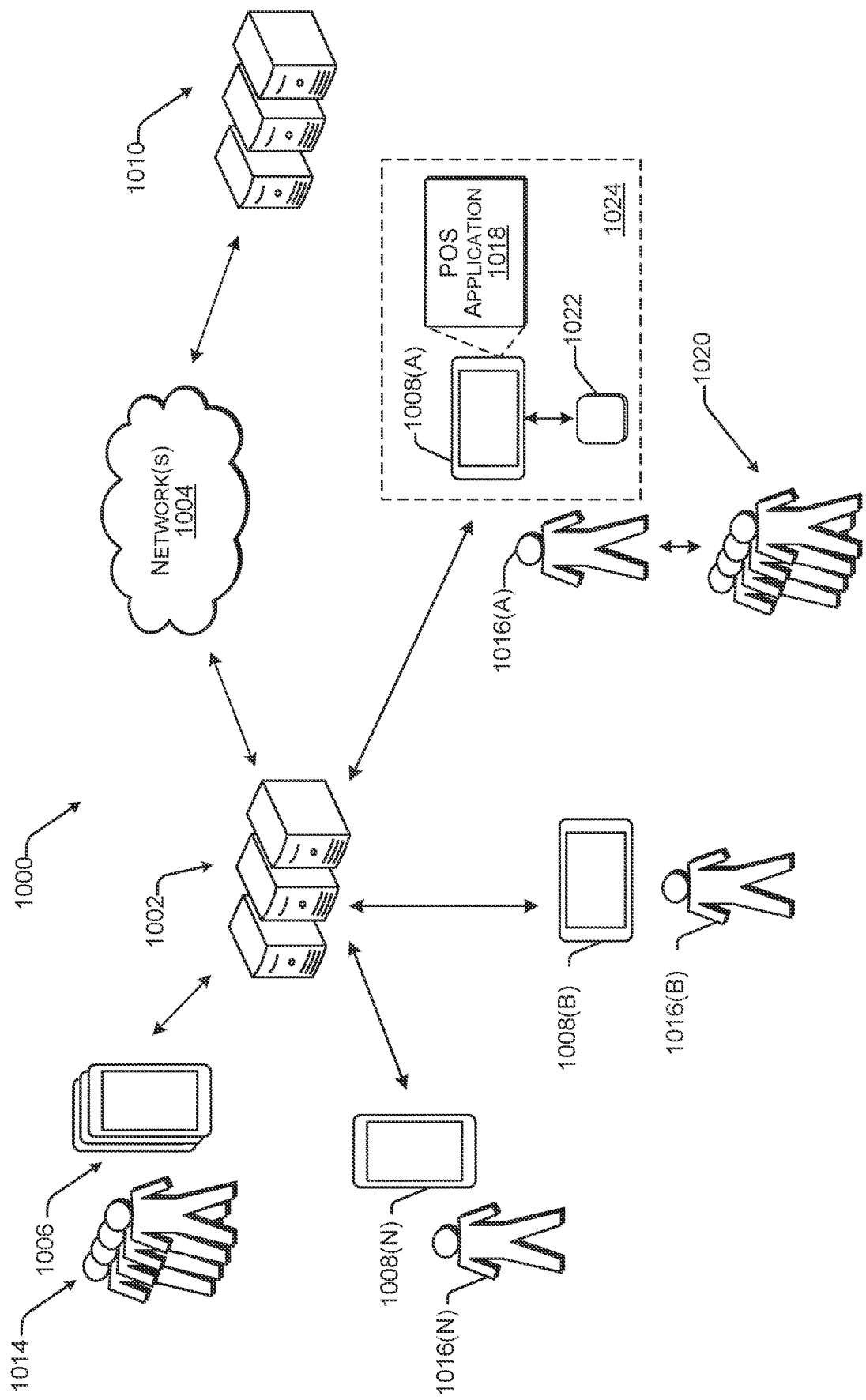
FIG. 10 shows an example environment in which a platform for selection of media content versions can be used, according to an implementation of the present subject matter.

FIG. 10 illustrates an example of an information technology environment 1000. The environment 1000 includes server(s) 1002 that can communicate over a network 1004 with user devices 1006 (which, in some examples, can be merchant devices 1008 (individually, 1008(A)-1008(N))) and/or server(s) 1010 associated with third-party service provider(s). The server(s) 1002 can be associated with a service provider that can provide one or more services for the benefit of users 1014, as described below. Actions attributed to the service provider can be performed by the server(s) 1002. In some embodiments, the server(s) 1002 can host the multimedia platform controller(s) 130 of FIG. 1, and the user devices 1006 can include one or more of an audience device 110 and a media stream controller device 120.

The environment 1000 can include a plurality of user devices 1006, as described above. A particular one of the plurality of user devices 1006 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 1014. The users 1014 can be referred to as customers, buyers, merchants, sellers, borrowers, employees, employers, payors, payees, couriers, artists, musicians, listeners, supervisors, hosts, audience members, subscribers, and so on. The users 1014 can interact with the user devices 1006 via user interfaces presented via the user devices 1006. In at least one example, a user interface can be presented via a web browser, or the like. In other examples, a user interface can be presented via an application, such as a mobile application or desktop application, which can be provided by the service provider or which can be an otherwise dedicated application. In some examples, individual of the user devices 1006 can have an instance or versioned instance of an application, which can be downloaded from an application store, for example, which can present the user interface(s) described herein. In at least one example, a user 1014 can interact with the user interface via touch input, spoken input, or any other type of input.

As described above, in at least one example, the users 1014 can include merchants 1016 (individually, 1016(A)-1016(N)). In an example, the merchants 1016 can operate respective merchant devices 1008, which can be user devices 1006 configured for use by merchants 1016. For the purpose of this discussion, a "merchant" can be any entity that offers items (e.g., goods or services) for purchase or other means of acquisition (e.g., rent, borrow, barter, etc.). The merchants 1016 can offer items for purchase or other means of acquisition via brick-and-mortar stores, mobile stores (e.g., pop-up shops, food trucks, etc.), online stores, event venues, combinations of the foregoing, and so forth. In some examples, at least some of the merchants 1016 can be associated with a same entity but can have different merchant locations and/or can have franchise/franchisee relationships. In additional or alternative examples, the merchants 1016 can be different merchants. That is, in at least one example, the merchant 1016(A) is a different merchant than the merchant 1016(B) and/or the merchant 1016(C).

For the purpose of this discussion, "different merchants" can refer to two or more unrelated merchants. "Different merchants" therefore can refer to two or more merchants that are different legal entities (e.g., natural persons and/or corporate persons) that do not share accounting, employees, branding, etc. "Different merchants," as used herein, have different names, employer identification numbers (EIN) s, lines of business (in some examples), inventories (or at least portions thereof), and/or the like. Thus, the use of the term "different merchants" does not refer to a merchant with various merchant locations or franchise/franchisee relationships. Such merchants—with various merchant locations or franchise/franchisee relationships-can be referred to as merchants having different merchant locations and/or different commerce channels.

Each merchant device 1008 can have an instance of a POS application 1018 stored thereon. The POS application 1018 can configure the merchant device 1008 as a POS terminal, which enables the merchant 1016(A) to interact with one or more customers 1020. As described above, the users 1014 can include customers, such as the customers 1020 shown as interacting with the merchant 1016(A). For the purpose of this discussion, a "customer" can be any entity that acquires items from merchants. While two customers 1020 are illustrated in FIG. 10, any number of customers 1020 can interact with the merchants 1016. Further, while FIG. 10 illustrates the customers 1020 interacting with the merchant 1016(A), the customers 1020 can interact with any of the merchants 1016.

In at least one example, interactions between the customers 1020 and the merchants 1016 that involve the exchange of funds (from the customers 1020) for items (from the merchants 1016) can be referred to as "transactions." In at least one example, the POS application 1018 can determine transaction data associated with the POS transactions. Transaction data can include payment information, which can be obtained from a reader device 1022 associated with the merchant device 1008(A), user authentication data, purchase amount information, point-of-purchase information (e.g., item(s) purchased, date of purchase, time of purchase, subscription type, etc.), etc. The POS application 1018 can send transaction data to the server(s) 1002 such that the server(s) 1002 can track transactions of the customers 1020, merchants 1016, and/or any of the users 1014 over time. Furthermore, the POS application 1018 can present a UI to enable the merchant 1016(A) to interact with the POS application 1018 and/or the service provider via the POS application 1018.

In at least one example, the merchant device 1008(A) can be a special-purpose computing device configured as a POS terminal (via the execution of the POS application 1018). In at least one example, the POS terminal may be connected to a reader device 1022, which is capable of accepting a variety of payment instruments, such as credit cards, debit cards, gift cards, short-range communication based payment instruments, and the like, as described below. In at least one example, the reader device 1022 can plug in to a port in the merchant device 1008(A), such as a microphone port, a headphone port, an audio-jack, a data port, or other suitable port. In additional or alternative examples, the reader device 1022 can be coupled to the merchant device 1008(A) via another wired or wireless connection, such as via a Bluetooth®, BLE, and so on. Additional details are described below with reference to FIG. 11. In some examples, the reader device 1022 can read information from alternative payment instruments including, but not limited to, wristbands and the like.

In some examples, the reader device 1022 may physically interact with payment instruments such as magnetic stripe payment cards, EMV payment cards, and/or short-range communication (e.g., near field communication (NFC), radio frequency identification (RFID), Bluetooth®, Bluetooth® low energy (BLE), etc.) payment instruments (e.g., cards or devices configured for tapping). The POS terminal may provide a rich user interface, communicate with the reader device 1022, and communicate with the server(s) 1002, which can provide, among other services, a payment processing service. The server(s) 1002 associated with the service provider can communicate with server(s) 1010, as described below. In this manner, the POS terminal and reader device 1022 may collectively process transaction(s) between the merchants 1016 and customers 1020. In some examples, POS terminals and reader devices can be configured in one-to-one pairings. In other examples, the POS terminals and reader devices can be configured in many-to-one pairings (e.g., one POS terminal coupled to multiple reader devices or multiple POS terminals coupled to one reader device). In some examples, there could be multiple POS terminal(s) connected to a number of other devices, such as "secondary" terminals, e.g., back-of-the-house systems, printers, line-buster devices, POS readers, speakers, and the like, to allow for information from the secondary terminal to be shared between the primary POS terminal(s) and secondary terminal(s), for example via short-range communication technology. This kind of arrangement may also work in an offline-online scenario to allow one device (e.g., secondary terminal) to continue taking user input, and synchronize data with another device (e.g., primary terminal) when the primary or secondary terminal switches to online mode. In other examples, such data synchronization may happen periodically or at randomly selected time intervals.

While the POS terminal and the reader device 1022 of the POS system are shown as separate devices, in additional or alternative examples, the POS terminal and the reader device 1022 can be part of a single device. In some examples, the reader device 1022 can have a display integrated therein for presenting information to the customers 1020. In additional or alternative examples, the POS terminal can have a display integrated therein for presenting information to the customers 1020. POS systems, such as the POS system 1024, may be mobile, such that POS terminals and reader devices may process transactions in disparate locations across the world. POS systems can be used for processing card-present transactions and card-not-present (CNP) transactions, as described below.

A card-present transaction is a transaction where both a customer and his or her payment instrument are physically present at the time of the transaction. Card-present transactions may be processed by swipes, dips, taps, or any other interaction between a physical payment instrument (e.g., a card), or otherwise present payment instrument, and a reader device 1022 whereby the reader device 1022 is able to obtain payment data from the payment instrument. A swipe is a card-present transaction where a customer 1020 slides a card, or other payment instrument, having a magnetic strip through a reader device 1022 that captures payment data contained in the magnetic strip. A dip is a card-present transaction where a customer 1020 inserts a payment instrument having an embedded microchip (i.e., chip) into a reader device 1022 first. The dipped payment instrument remains in the payment reader until the reader device 1022 prompts the customer 1020 to remove the card, or other payment instrument. While the payment instrument is in the reader device 1022, the microchip can create a one-time code which is sent from the POS system 1024 to the server(s) 1010 (which can be associated with third-party service providers that provide payment services, including but not limited to, an acquirer bank, an issuer, and/or a card payment network (e.g., Mastercard®, VISA®, etc.)) to be matched with an identical one-time code. A tap is a card-present transaction where a customer 1020 may tap or hover his or her payment instrument (e.g., card, electronic device such as a smart phone running a payment application, etc.) over a reader device 1022 to complete a transaction via short-range communication (e.g., NFC, RFID, Bluetooth®, BLE, etc.). Short-range communication enables the payment instrument to exchange information with the reader device 1022. A tap may also be called a contactless payment.

A CNP transaction is a transaction where a card, or other payment instrument, is not physically present at the POS such that payment data is required to be manually keyed in (e.g., by a merchant, customer, etc.), or payment data is required to be recalled from a card-on-file data store, to complete the transaction.

The POS system 1024, the server(s) 1002, and/or the server(s) 1010 may exchange payment information and transaction data to determine whether transactions are authorized. For example, the POS system 1024 may provide encrypted payment data, user authentication data, purchase amount information, point-of-purchase information, etc. (collectively, transaction data) to server(s) 1002 over the network(s) 1004. The server(s) 1002 may send the transaction data to the server(s) 1010. As described above, in at least one example, the server(s) 1010 can be associated with third-party service providers that provide payment services, including but not limited to, an acquirer bank, an issuer, and/or a card payment network (e.g., Mastercard®, VISA®, etc.)

For the purpose of this discussion, the "payment service providers" can be acquiring banks ("acquirer"), issuing banks ("issuer"), card payment networks, and the like. In an example, an acquirer is a bank or financial institution that processes payments (e.g., credit or debit card payments) and can assume risk on behalf of merchants(s). An acquirer can be a registered member of a card association (e.g., Visa®, MasterCard®), and can be part of a card payment network. The acquirer (e.g., the server(s) 1010 associated therewith) can send a fund transfer request to a server computing device of a card payment network (e.g., Mastercard®, VISAR, etc.) to determine whether the transaction is authorized or deficient. In at least one example, the service provider can serve as an acquirer and connect directly with the card payment network.

The card payment network (e.g., the server(s) 1010 associated therewith) can forward the fund transfer request to an issuing bank (e.g., "issuer"). The issuer is a bank or financial institution that offers a financial account (e.g., credit or debit card account) to a user. An issuer can issue payment cards to users and can pay acquirers for purchases made by cardholders to which the issuing bank has issued a payment card. The issuer (e.g., the server(s) 1010 associated therewith) can make a determination as to whether the customer has the capacity to absorb the relevant charge associated with the payment transaction. In at least one example, the service provider can serve as an issuer and/or can partner with an issuer. The transaction is either approved or rejected by the issuer and/or the card payment network (e.g., the server(s) 1010 associated therewith), and a payment authorization message is communicated from the issuer to the POS device via a path opposite of that described above, or via an alternate path.

As described above, the server(s) 1010, which can be associated with payment service provider(s), may determine whether the transaction is authorized based on the transaction data, as well as information relating to parties to the transaction (e.g., the customer 1020 and/or the merchant 1016(A)). The server(s) 1010 may send an authorization notification over the network(s) 1004 to the server(s) 1002, which may send the authorization notification to the POS system 1024 over the network(s) 1004 to indicate whether the transaction is authorized. The server(s) 1002 may also transmit additional information such as transaction identifiers to the POS system 1024. In one example, the server(s) 1002 may include a merchant application and/or other functional components for communicating with the POS system 1024 and/or the server(s) 1010 to authorize or decline transactions.

Based on the authentication notification that is received by the POS system 1024 from server(s) 1002, the merchant 1016(A) may indicate to the customer 1020 whether the transaction has been approved. In some examples, approval may be indicated at the POS system 1024, for example, at a display of the POS system 1024. In other examples, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

As mentioned above, the service provider can provide, among other services, payment processing services, inventory management services, catalog management services, business banking services, financing services, lending services, reservation management services, web-development services, payroll services, employee management services, appointment services, loyalty tracking services, restaurant management services, order management services, fulfillment services, onboarding services, identity verification (IDV) services, media content (e.g., music, videos, etc.) management and/or subscription services, and so on. In some examples, the users 1014 can access all of the services of the service provider. In other examples, the users 1014 can have gradated access to the services, which can be based on risk tolerance, IDV outputs, subscriptions, and so on. In at least one example, access to such services can be availed to the merchants 1016 via the POS application 1018. In additional or alternative examples, each service can be associated with its own access point (e.g., application (such as a listener application, a media content consumer application, a media stream control application), web browser, etc.).

The service provider can offer payment processing services for processing payments on behalf of the merchants 1016, as described above. For example, the service provider can provision payment processing software, payment processing hardware and/or payment processing services to merchants 1016, as described above, to enable the merchants 1016 to receive payments from the customers 1020 when conducting POS transactions with the customers 1020. For instance, the service provider can enable the merchants 1016 to receive cash payments, payment card payments, and/or electronic payments from customers 1020 for POS transactions and the service provider can process transactions on behalf of the merchants 1016.

As the service provider processes transactions on behalf of the merchants 1016, the service provider can maintain accounts or balances for the merchants 1016 in one or more ledgers. For example, the service provider can analyze transaction data received for a transaction to determine an amount of funds owed to a merchant 1016(A) for the transaction. In at least one example, such an amount can be a total purchase price less fees charged by the service provider for providing the payment processing services. Based on determining the amount of funds owed to the merchant 1016(A), the service provider can deposit funds into an account of the merchant 1016(A). The account can have a stored balance, which can be managed by the service provider. The account can be different from a conventional bank account at least because the stored balance is managed by a ledger of the service provider and the associated funds are accessible via various withdrawal channels including, but not limited to, scheduled deposit, same-day deposit, instant deposit, and a linked payment instrument.

A scheduled deposit can occur when the service provider transfers funds associated with a stored balance of the merchant 1016(A) to a bank account of the merchant 1016(A) that is held at a bank or other financial institution (e.g., associated with the server(s) 1010). Scheduled deposits can occur at a prearranged time after a POS transaction is funded, which can be a business day after the POS transaction occurred, or sooner or later. In some examples, the merchant 1016(A) can access funds prior to a scheduled deposit. For instance, the merchant 1016(A) may have access to same-day deposits (e.g., wherein the service provider deposits funds from the stored balance to a linked bank account of the merchant on a same day as POS transaction, in some examples prior to the POS transaction being funded) or instant deposits (e.g., wherein the service provider deposits funds from the stored balance to a linked bank account of the merchant on demand, such as responsive to a request). Further, in at least one example, the merchant 1016(A) can have a payment instrument that is linked to the stored balance that enables the merchant to access the funds without first transferring the funds from the account managed by the service provider to the bank account of the merchant 1016(A).

In at least one example, the service provider may provide inventory management services. That is, the service provider may provide inventory tracking and reporting. Inventory management services may enable the merchant 1016(A) to access and manage a database storing data associated with a quantity of each item that the merchant 1016(A) has available (i.e., an inventory). Furthermore, in at least one example, the service provider can provide catalog management services to enable the merchant 1016(A) to maintain a catalog, which can be a database storing data associated with items that the merchant 1016(A) has available for acquisition (i.e., catalog management services). In at least one example, the catalog may include a plurality of data items and a data item of the plurality of data items may represent an item that the merchant 1016(A) has available for acquisition. The service provider can offer recommendations related to pricing of the items, placement of items on the catalog, and multi-party fulfillment of the inventory. In some embodiments, catalog items are digital items, such as tokens, media content items, and/or the like.

In at least one example, the service provider can provide business banking services, which allow the merchant 1016(A) to track deposits (from payment processing and/or other sources of funds) into an account of the merchant 1016(A), payroll payments from the account (e.g., payments to employees of the merchant 1016(A)), payments to other merchants (e.g., business-to-business) directly from the account or from a linked debit card, withdrawals made via scheduled deposit and/or instant deposit, etc. Furthermore, the business banking services can enable the merchant 1016(A) to obtain a customized payment instrument (e.g., credit card), check how much money they are earning (e.g., via presentation of available earned balance), understand where their money is going (e.g., via deposit reports (which can include a breakdown of fees), spend reports, etc.), access/use earned money (e.g., via scheduled deposit, instant deposit, linked payment instrument, etc.), feel in control of their money (e.g., via management of deposit schedule, deposit speed, linked instruments, etc.), etc. Moreover, the business banking services can enable the merchants 1016 to visualize their cash flow to track their financial health, set aside money for upcoming obligations (e.g., savings), organize money around goals, etc.

In at least one example, the service provider can provide financing services and products, such as via business loans, consumer loans, fixed term loans, flexible term loans, and the like. In at least one example, the service provider can utilize one or more risk signals to determine whether to extend financing offers and/or terms associated with such financing offers.

In at least one example, the service provider can provide financing services for offering and/or lending a loan to a borrower that is to be used for, in some instances, financing the borrower's short-term operational needs (e.g., a capital loan). For instance, a potential borrower that is a merchant can obtain a capital loan via a capital loan product in order to finance various operational costs (e.g., rent, payroll, inventory, music studio recording time, etc.). In at least one example, the service provider can offer different types of capital loan products. For instance, in at least one example, the service provider can offer a daily repayment loan product, wherein a capital loan is repaid daily, for instance, from a portion of transactions processed by the payment processing service on behalf of the borrower. Additionally and/or alternatively, the service provider can offer a monthly repayment loan product, wherein a capital loan is repaid monthly, for instance, via a debit from a bank account linked to the payment processing service. The credit risk of the merchant may be evaluated using risk models that take into account factors, such as payment volume, credit risk of similarly situated merchants, past transaction history, seasonality, credit history, and so on.

Additionally or alternatively, the service provider can provide financing services for offering and/or lending a loan to a borrower that is to be used for, in some instances, financing the borrower's consumer purchase (e.g., a consumer loan). In at least one example, a borrower can submit a request for a loan to enable the borrower to purchase an item from a merchant, which can be one of the merchants 1016. The service provider can generate the loan based at least in part on determining that the borrower purchased or intends to purchase the item from the merchant. The loan can be associated with a balance based on an actual purchase price of the item and the borrower can repay the loan over time. In some examples, the borrower can repay the loan via installments, which can be paid via funds managed and/or maintained by the service provider (e.g., from payments owed to the merchant from payments processed on behalf of the merchant, funds transferred to the merchant, etc.). The service provider can offer specific financial products, such as payment instruments, tied specifically to the loan products. For example, in one implementation, the service provider associates capital to a merchant or customer's debit card, where the use of the debit card is defined by the terms of the loan. In some examples, the merchant may use the debit card for making specific purchases. In other examples, the "installment" associated with the loan product is credited directly via the payment instrument. The payment instrument is thus customized to the loan and/or the parties associated with the loan.

The service provider can provide web-development services, which enable users 1014 who are unfamiliar with HTML, XML, Javascript, CSS, or other web design tools to create and maintain professional and aesthetically pleasing websites. Some of these web page editing applications allow users to build a web page and/or modify a web page (e.g., change, add, or remove content associated with a web page). Further, in addition to websites, the web-development services can create and maintain other online omni-channel presences, such as social media posts for example. In some examples, the resulting web page(s) and/or other content items can be used for offering item(s) for sale via an online/e-commerce platform. That is, the resulting web page(s) and/or other content items can be associated with an online store or offering by the one or more of the merchants 1016. In at least one example, the service provider can recommend and/or generate content items to supplement omni-channel presences of the merchants 1016. That is, if a merchant of the merchants 1016 has a web page, the service provider-via the web-development or other services-can recommend and/or generate additional content items to be presented via other channel(s), such as social media, email, media content streaming, etc.

Furthermore, the service provider can provide payroll services to enable employers to pay employees for work performed on behalf of employers. In at least one example, the service provider can receive data that includes time worked by an employee (e.g., through imported timecards and/or POS interactions), sales made by the employee, gratuities received by the employee, and so forth. Based on such data, the service provider can make payroll payments to employee(s) on behalf of an employer via the payroll service. For instance, the service provider can facilitate the transfer of a total amount to be paid out for the payroll of an employee from the bank of the employer to the bank of the service provider to be used to make payroll payments. In at least one example, when the funds have been received at the bank of the service provider, the service provider can pay the employee, such as by check or direct deposit, often a day, a week, or more after when the work was actually performed by the employee. In additional or alternative examples, the service provider can enable employee(s) to receive payments via same-day or instant deposit based at least in part on risk and/or reliability analyses performed by the service provider.

Moreover, in at least one example, the service provider can provide employee management services for managing schedules of employees. Further, the service provider can provide appointment services for enabling users 1014 to set schedules for scheduling appointments and/or users 1014 to schedule appointments.

In some examples, the service provider can provide restaurant management services to enable users 1014 to make and/or manage reservations, to monitor front-of-house and/or back-of-house operations, and so on. In such examples, the merchant device(s) 1008 and/or server(s) 1002 can be configured to communicate with one or more other computing devices, which can be located in the front-of-house (e.g., POS device(s)) and/or back-of-house (e.g., kitchen display system(s) (KDS)). In at least one example, the service provider can provide order management services and/or fulfillment services to enable restaurants to manage open tickets, split tickets, and so on and/or manage fulfillment services. In some examples, such services can be associated with restaurant merchants, as described above. In additional or alternative examples, such services can be any type of merchant.

In at least one example, the service provider can provide fulfilment services, which can use couriers for delivery, wherein couriers can travel between multiple locations to provide delivery services, photography services, etc. Couriers can be users 1014 who can travel between locations to perform services for a requesting user 1014 (e.g., deliver items, capture images, etc.). In some examples, the courier can receive compensation from the service provider. The courier can employ one or more vehicles, such as automobiles, bicycles, scooters, motorcycles, buses, airplanes, helicopters, boats, skateboards, etc. Although, in other instances the courier can travel by foot or otherwise without a vehicle. Some examples discussed herein enable people to participate as couriers in a type of crowdsourced service economy. Here, essentially any person with a mobile device is able to immediately become a courier, or cease to be a courier, in a courier network that provides services as described herein. In at least one example, the couriers can be unmanned aerial vehicles (e.g., drones), autonomous vehicles, or any other type of vehicle capable of receiving instructions for traveling between locations. In some examples, the service provider can receive requests for courier services, automatically assign the requests to active couriers, and communicate dispatch instructions to couriers via user interface (e.g., application, web browser, or other access point) presented via respective devices 1006.

In some examples, the service provider can provide omni-channel fulfillment services. For instance, if a customer places an order with a merchant and the merchant cannot fulfill the order because one or more items are out of stock or otherwise unavailable, the service provider can leverage other merchants and/or sales channels that are part of the platform of the service provider to fulfill the customer's order. That is, another merchant can provide the one or more items to fulfill the order of the customer. Furthermore, in some examples, another sales channel (e.g., online, brick-and-mortar, etc.) can be used to fulfill the order of the customer.

In some examples, the service provider can enable conversational commerce via conversational commerce services, which can use one or more machine learning mechanisms to analyze messages exchanged between two or more users 1014, voice inputs into a virtual assistant or the like, to determine intents of user(s) 1014. In some examples, the service provider can utilize determined intents to automate customer service, offer promotions, provide recommendations, or otherwise interact with customers in real-time. In at least one example, the service provider can integrate products and services, and payment mechanisms into a communication platform (e.g., messaging, etc.) to enable customers to make purchases, or otherwise transact, without having to call, email, or visit a web page or other channel of a merchant. That is, conversational commerce alleviates the need for customers to toggle back and forth between conversations and web pages to gather information and make purchases.

In at least one example, a user 1014 may be new to the service provider such that the user 1014 that has not registered (e.g., subscribed to receive access to one or more services offered by the service provider) with the service provider. The service provider can offer onboarding services for registering a potential user 1014 with the service provider. In some examples, onboarding can involve presenting various questions, prompts, and the like to a potential user 1014 to obtain information that can be used to generate a profile for the potential user 1014. In at least one example, the service provider can provide limited or short-term access to its services prior to, or during, onboarding (e.g., a user of a peer-to-peer payment service can transfer and/or receive funds prior to being fully onboarded, a merchant can process payments prior to being fully onboarded, a user of a music streaming service can listen to music having advertisement breaks prior to being fully onboarded, etc.). In at least one example, responsive to the potential user 1014 providing information requested as part of onboarding, the potential user 1014 can be onboarded to the service provider. In such an example, any limited or short-term access to services of the service provider can be transitioned to more permissive (e.g., less limited) or longer-term access to such services.

The service provider can be associated with IDV services, which can be used by the service provider for compliance purposes and/or can be offered as a service, for instance to third-party service providers (e.g., associated with the server(s) 1010). That is, the service provider can offer IDV services to verify the identity of users 1014 seeking to use or using their services. Identity verification requires a customer (or potential customer) to provide information that is used by compliance departments to prove that the information is associated with an identity of a real person or entity (e.g., an artist). In at least one example, the service provider can perform services for determining whether identifying information provided by a user 1014 accurately identifies the customer (or potential customer) (i.e., Is the customer who they say they are?).

The service provider is capable of providing additional or alternative services and the services described above are offered as a sampling of services. In at least one example, the service provider can exchange data with the server(s) 1010 associated with third-party service providers. Such third-party service providers can provide information that enables the service provider to provide services, such as those described above. In additional or alternative examples, such third-party service providers can access services of the service provider. That is, in some examples, the third-party service providers can be subscribers, or otherwise access, services of the service provider.

Techniques described herein can be configured to operate in both real-time/online and offline modes. "Online" modes refer to modes when devices are capable of communicating with the service provider (e.g., the server(s) 1002) and/or the server(s) 1010 via the network(s) 1004. In some examples, the merchant device(s) 1008 are not capable of connecting with the service provider (e.g., the server(s) 1002) and/or the server(s) 1010, due to a network connectivity issue, for example. In additional or alternative examples, the server(s) 1002 are not capable of communicating with the server(s) 1010 due to network connectivity issue, for example. In such examples, devices may operate in "offline" mode where at least some payment data is stored (e.g., on the merchant device(s) 1008) and/or the server(s) 1002 until connectivity is restored and the payment data can be transmitted to the server(s) 1002 and/or the server(s) 1010 for processing.

In at least one example, the service provider can be associated with a hub, such as an order hub, an inventory hub, a fulfillment hub, content delivery network management hub and so on, which can enable integration with one or more additional service providers (e.g., associated with the additional server(s) 1010). In some examples, such additional service providers can offer additional or alternative services and the service provider can provide an interface or other computer-readable instructions to integrate functionality of the service provider into the one or more additional service providers.

Techniques described herein are directed to services provided via a distributed system of user devices 1006 that are in communication with server(s) 1002 of the service provider. That is, techniques described herein are directed to a specific implementation—or, a practical application-of utilizing a distributed system of user devices 1006 that are in communication with server(s) 1002 of the service provider to perform a variety of services, as described above. The unconventional configuration of the distributed system described herein enables the server(s) 1002 that are remotely-located from end-users (e.g., users 1014) to intelligently offer services based on aggregated data associated with the end-users, such as the users 1014 (e.g., data associated with multiple, different merchants and/or multiple, different buyers, audience members and so forth), in some examples, in near-real time. Accordingly, techniques described herein are directed to a particular arrangement of elements that offer technical improvements over conventional techniques for performing payment processing services, media content purchase or subscription services, and the like. For small business owners in particular, the business environment is typically fragmented and relies on unrelated tools and programs, making it difficult for an owner to manually consolidate and view such data. The techniques described herein constantly or periodically monitor disparate and distinct merchant accounts, e.g., accounts within the control of the service provider, and those outside of the control of the service provider, to track the business standing (payables, receivables, payroll, invoices, appointments, capital, etc.) of the merchants. The techniques herein provide a consolidated view of a merchant's cash flow, predict needs, preemptively offer recommendations or services, such as capital, coupons, etc., and/or enable money movement between disparate accounts (merchant's, another merchant's, or even payment service's) in a frictionless and transparent manner.

As described herein, artificial intelligence, machine learning, and the like can be used to dynamically make determinations, recommendations, and the like, thereby adding intelligence and context-awareness to an otherwise one-size-fits-all scheme for providing payment processing services and/or additional or alternative services described herein. In some implementations, the distributed system is capable of applying the intelligence derived from an existing user base to a new user, thereby making the onboarding experience for the new user personalized and frictionless when compared to traditional onboarding methods. Further, models or algorithms that are used to implement techniques described herein may be retrained over time to improve outcomes for subsequent scenarios based on outcomes of previous scenarios. Thus, techniques described herein improve existing technological processes.

As described above, various graphical user interfaces (GUIs) can be presented to facilitate techniques described herein. Some of the techniques described herein are directed to user interface features presented via GUIs to improve interaction between users 1014 and user devices 1006. Furthermore, such features are changed dynamically based on the profiles of the users involved interacting with the GUIs. As such, techniques described herein are directed to improvements to computing systems.

Figure 11:
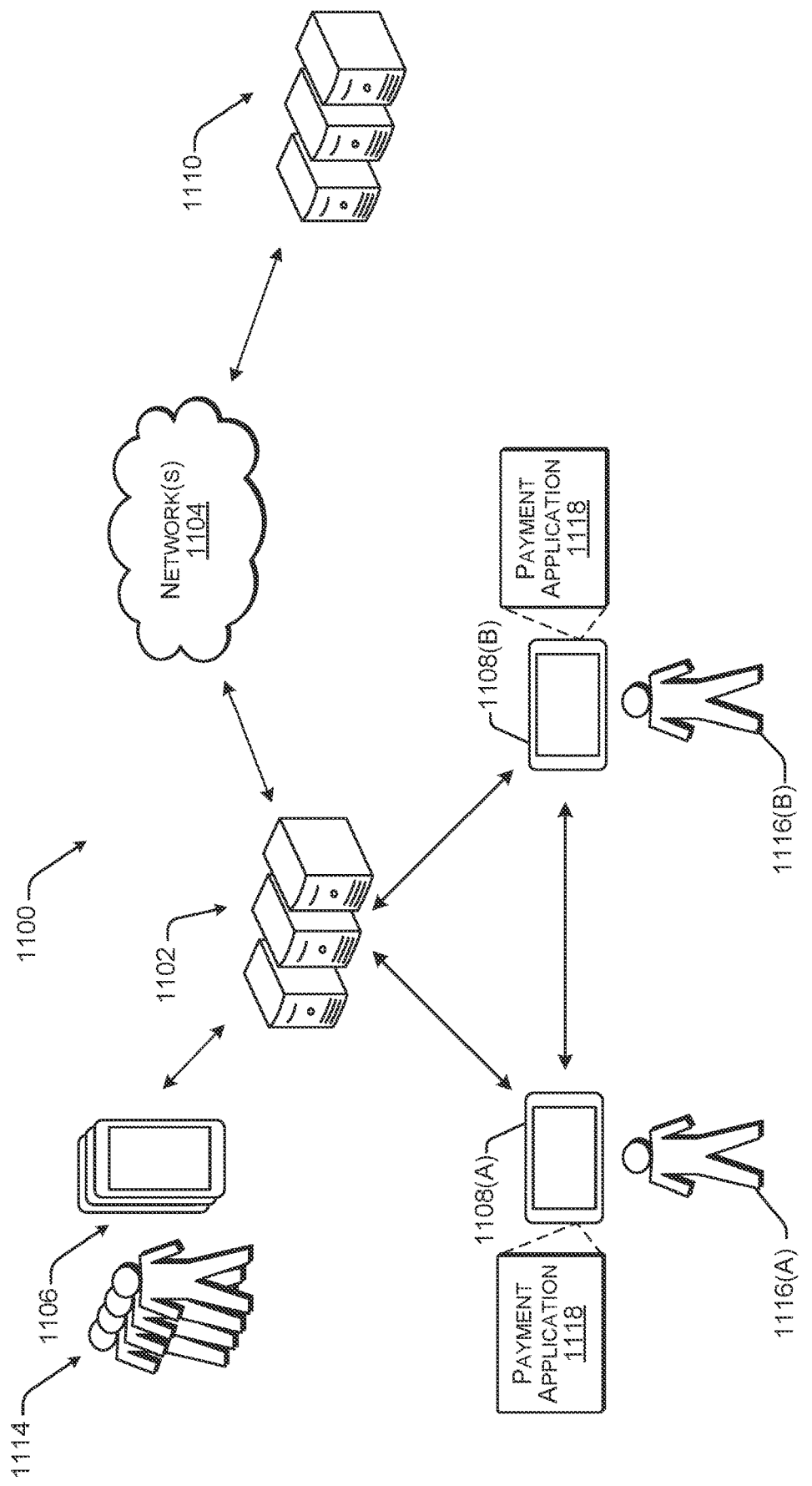
FIG. 11 shows an example environment in which a payment application for direct transfer of cash between users can be used (e.g., in conjunction with a platform for selection of media content versions), according to an implementation of the present subject matter.

FIG. 11 illustrates an example environment 1100. The environment 1100 includes server(s) 1102 that can communicate over a network 1104 with user devices 1106 (which, in some examples can be user devices 1108 (individually, 1108(A), 1108(B)) and/or server(s) 1110 associated with third-party service provider(s). The server(s) 1102 can be associated with a service provider that can provide one or more services for the benefit of users 1114, as described below. Actions attributed to the service provider can be performed by the server(s) 1102. In some examples, the service provider referenced in FIG. 10 can be the same or different than the service provider referenced in FIG. 11.

In some embodiments, the server(s) 1102 can host or be communicatively coupled to the multimedia platform controller(s) 130 of FIG. 1, and the user devices 1108 can include one or more of an audience device 110 and a media stream controller device 120.

The environment 1100 can include a plurality of user devices 1106, as described above. Each one of the plurality of user devices 1106 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 1114. The users 1114 can be referred to as customers, buyers, merchants, sellers, borrowers, employees, employers, payors, payees, couriers, artists, musicians, listeners, supervisors, hosts, audience members, subscribers, and so on. The users 1114 can interact with the user devices 1106 via user interfaces presented via the user devices 1106. In at least one example, a user interface can be presented via a web browser, or the like. In other examples, a user interface can be presented via an application (e.g., a listener application, a media content consumer application, a media stream control application), such as a mobile application or desktop application, which can be provided by the service provider or which can be an otherwise dedicated application. In some examples, individual of the user devices 1106 can have an instance or versioned instance of an application, which can be downloaded from an application store, for example, which can present the user interface(s) described herein. In at least one example, a user 1114 can interact with the user interface via touch input, spoken input, or any other type of input.

In at least one example, the service provider can provide a peer-to-peer payment service that enables peer-to-peer payments between two or more users 1114. Two users, user 1116(A) and user 1116(B) are illustrated in FIG. 11 as "peers" in a peer-to-peer payment. In at least one example, the service provider can communicate with instances of a payment application 1118 (or other access point, such as a listener application, a media content consumer application, a media stream control application, which can include or be communicatively coupled to the payment application 1118) installed on devices 1106 configured for operation by users 1114. In an example, an instance of the payment application 1118 executing on a first device 1108(A) operated by a payor (e.g., user 1116(A)) can send a request to the service provider to transfer an asset (e.g., fiat currency, non-fiat currency, digital assets such as non-fungible tokens (NFTs), cryptocurrency, securities, gift cards, and/or related assets) from the payor to a payee (e.g., user 1116(B)) via a peer-to-peer payment. In some examples, assets associated with an account of the payor are transferred to an account of the payee. In some examples, assets can be held at least temporarily in an account of the service provider prior to transferring the assets to the account of the payee. In some examples, the transferred asset(s) are a form of payment, from the account of the payor (e.g., consumer) to the account of the payee (e.g., artist, distributor), for digital media subscription services, digital media lending services, digital media streaming services, digital media access services, and/or digital media purchase services. Accordingly, the payor can receive access rights, streaming rights, ownership rights, and the like with respect to the digital media item on completion of the payment.

Figure 12:
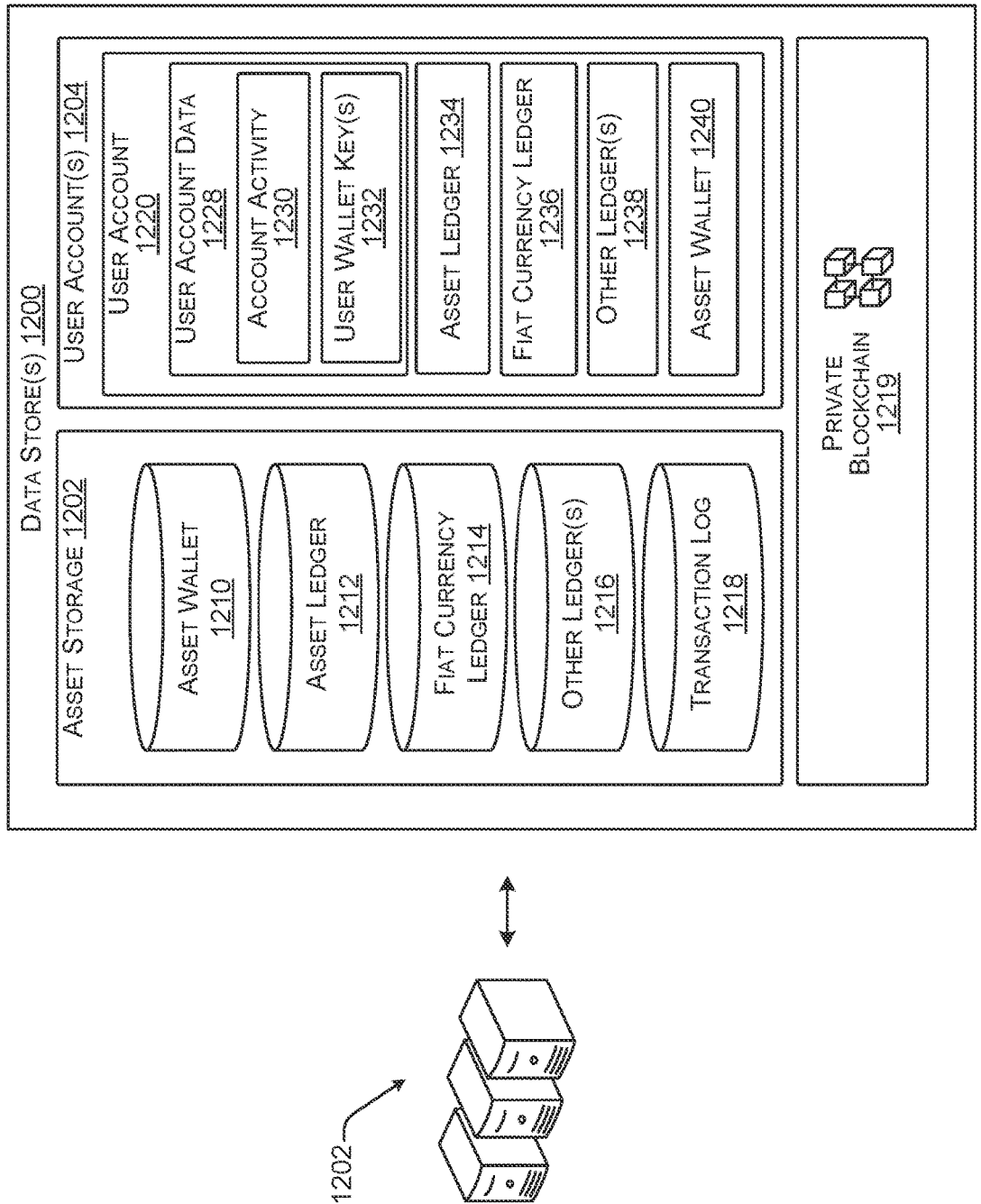
FIG. 12 illustrates an example of one or more data stores that can be associated with one or more servers, to enable blockchain based tracking of assets (e.g., in conjunction with a platform for selection of media content versions), according to an implementation of the present subject matter.

In some examples, the service provider can utilize a ledger system to track transfers of assets between users 1114. FIG. 12, below, provides additional details associated with such a ledger system. The ledger system can enable users 1114 to own fractional shares of assets that are not conventionally available. For instance, a user can own a fraction of a Bitcoin, an NFT, or a stock. Additional details are described herein in relation to FIG. 12.

In at least one example, the service provider can facilitate transfers and can send notifications related thereto to instances of the payment application 1118 executing on user device(s) of payee(s). As an example, the service provider can transfer assets from an account of user 1116(A) to an account of the user 1116(B) and can send a notification to the user device 1108(B) of the user 516(B) for presentation via a user interface. The notification can indicate that a transfer is in process, a transfer is complete, or the like. In some examples, the service provider can send additional or alternative information to the instances of the payment application 1118 (e.g., low balance to the payor, current balance to the payor or the payee, etc.). In some examples, the payor and/or payee can be identified automatically, e.g., based on context, proximity, prior transaction history, and so on. In other examples, the payee can send a request for funds to the payor prior to the payor initiating the transfer of funds. In some embodiments, the service provider funds the request to payee on behalf of the payor, to speed up the transfer process and compensate for lags that may be attributed to the payor's financial network.

In some examples, the service provider can trigger the peer-to-peer payment process through identification of a "payment proxy" having a particular syntax. For example, the syntax can include a monetary currency indicator prefixing one or more alphanumeric characters (e.g., $Cash). The currency indicator operates as the tagging mechanism that indicates to the server(s) 1102 to treat the inputs as a request from the payor to transfer assets, where detection of the syntax triggers a transfer of assets. The currency indicator can correspond to various currencies including but not limited to, dollar ($), euro (€), pound (£), rupee ((₹), ), yuan ((¥), ), etc. Although use of the dollar currency indicator ($) is used herein, it is to be understood that any currency symbol could equally be used. In some examples, additional or alternative identifiers can be used to trigger the peer-to-peer payment process. For instance, email, telephone number, social media handles, artist or band names, user log-in account identifiers, and/or the like can be used to trigger and/or identify users of a peer-to-peer payment process. For example, a creator associated with a particular digital media item can have, or receive a prompt to create when a fund transfer is attempted to a user, an associated account for sending and receiving funds using the techniques described herein.

In some examples, the peer-to-peer payment process can be initiated through instances of the payment application 1118 executing on the user devices. In at least some embodiments, the peer-to-peer process can be implemented within a landing page associated with a user and/or an identifier of a user. The term "landing page," as used here, refers to a virtual location identified by a personalized location address that is dedicated to collect payments on behalf of a recipient associated with the personalized location address. The personalized location address that identifies the landing page can include a payment proxy discussed above. The service provider can generate the landing page to enable the recipient to conveniently receive one or more payments from one or more senders. In some examples, the personalized location address identifying the landing page can be a uniform resource locator (URL) that incorporates the payment proxy. In such examples, the landing page can be a web page, e.g., www.cash.me/$Cash. In some examples, landing pages can be associated with digital media item creators, distributors, digital storefronts, DJ user accounts, media stream control user accounts, and the like to enable these entities to conveniently receive payments.

In some examples, the peer-to-peer payment process can be implemented within a forum. The term "forum," as used here, refers to a content provider's media channel (e.g., a social networking platform, a microblog, a blog, video sharing platform, a music sharing platform, etc.) that enables user interaction and engagement through streaming of content, comments, posts, messages on electronic bulletin boards, messages on a social networking platform, and/or any other types of messages. In some examples, the content provider can be the service provider as described with reference to FIG. 10 or a third-party service provider associated with the server(s) 1110. In examples where the content provider is a third-party service provider, the server(s) 1110 can be accessible via one or more APIs or other integrations. The forum can be employed by a content provider to enable users of the forum to interact with one another (e.g., through creating messages, posting comments, streaming media content, etc.). In some examples, "forum" may also refer to an application or webpage of an e-commerce or retail organization that offers products and/or services. Such websites can provide an online "form" to complete before or after the products or services are added to a virtual cart. The online form may include one or more fields to receive user interaction and engagement. Examples include name and other identification of the user, shipping address of the user, etc. Some of these fields may be configured to receive payment information, such as a payment proxy, in lieu of other kinds of payment mechanisms, such as credit cards, debit cards, prepaid cards, gift cards, virtual wallets, etc.

In some embodiments, the peer-to-peer process can be implemented within a communication application, such as a messaging application. The term "messaging application," as used here, refers to any messaging application that enables communication between users (e.g., sender and recipient of a message) over a wired or wireless communications network, through use of a communication message. The messaging application can be employed by the service provider. For instance, the service provider can offer messaging services that provide a communication service to users via a messaging application (e.g., chat or messaging capability). The messaging application can include, for example, a text messaging application for communication between phones (e.g., conventional mobile telephones or smartphones), or a cross-platform instant messaging application for smartphones and phones that use the Internet for communication. The messaging application can be executed on a user device 1106 (e.g., mobile device or conventional personal computer (PC)) based on instructions transmitted to and from the server(s) 1102 (which, in such an example can be called a "messaging server"). In some instances, the messaging application can include a payment application with messaging capability that enables users of the payment application to communicate with one another. In such instances, the payment application can be executed on a user device 1106 based on instructions transmitted to and from the server(s) 1102 (e.g., the payment service discussed in this description or another payment service that supports payment transactions). In some examples, the messaging application can be provided by a third-party service provider associated with the server(s) 1110. In examples where the messaging application is a third-party service provider, the server(s) 1110 can be accessible via one or more APIs or other integrations. In some instances, the messaging application can include, be included in, or be integrated (e.g., via an API) with a listener application, a media content consumer application, a media stream control application, and the like.

As described above, the service provider can facilitate peer-to-peer transactions, which can enable users 1114 to transfer fiat currency, non-fiat currency, cryptocurrency, securities, or other assets, or portions thereof, to other users 1114. In at least one example, individual users can be associated with user accounts. Additional details associated with user accounts and the transfer of assets between users 1114 are described below with reference to FIG. 13.

Furthermore, the service provider of FIG. 11 can enable users 1114 to perform banking transactions via instances of the payment application 1118. For example, users can configure direct deposits or other deposits for adding assets to their various ledgers/balances. Further, users 1114 can configure bill pay, recurring payments, and/or the like using assets associated with their accounts. In addition to sending and/or receiving assets via peer-to-peer transactions, users 1114 buy and/or sell assets via asset networks such as cryptocurrency networks, securities networks, and/or the like.

FIG. 12 illustrates example data store(s) 1200 that can be associated with the server(s) 1102.

In at least one example, the data store(s) 1200 can store assets in an asset storage 1202, as well as data in user account(s) 1204. In some examples, user account(s) 1204 can include merchant account(s) 1206, and/or customer account(s) 1208. In at least one example, the asset storage 1202 can be used to store assets managed by the service provider of FIG. 11. In at least one example, the asset storage 1202 can be used to record whether individual ones of the assets are registered to users. For example, the asset storage 1202 can include an asset wallet 1210 for storing records of assets owned by the service provider of FIG. 11, such as cryptocurrency, securities, NFTs, or the like, and communicating with one or more asset networks, such as cryptocurrency networks, NFT networks, securities networks, or the like. In some examples, the asset network can be a first-party network or a third-party network, such as a cryptocurrency exchange or the stock market. In examples where the asset network is a third-party network, the server(s) 1110 can be associated therewith. In some examples, the asset wallet 1210 can communicate with the asset network via one or more components associated with the server(s) 1102.

The asset wallet 1210 can be associated with one or more addresses and can vary addresses used to acquire assets (e.g., from the asset network(s)) so that its holdings are represented under a variety of addresses on the asset network. In examples where the service provider of FIG. 11 has its own holdings of cryptocurrency (e.g., in the asset wallet 1210), a user can acquire cryptocurrency directly from the service provider of FIG. 11. In some examples, the service provider of FIG. 11 can include logic for buying and selling cryptocurrency to maintain a desired level of cryptocurrency. In some examples, the desired level can be based on a volume of transactions over a period of time, balances of collective cryptocurrency ledgers, exchange rates, or trends in changing of exchange rates such that the cryptocurrency is trending towards gaining or losing value with respect to the fiat currency. In all of these scenarios, the buying and selling of cryptocurrency, and therefore the associated updating of the public ledger of an asset network can be separate from a customer-merchant transaction or a peer-to-peer transaction, and therefore not necessarily time-sensitive. This can enable batching transactions to reduce computational resources and/or costs. The service provider can provide the same or similar functionality for securities or other assets.

The asset storage 1202 may contain ledgers that store records of assignments of assets to users 1114. Specifically, the asset storage 1202 may include asset ledger 1210, fiat currency ledger 1214, and other ledger(s) 1216, which can be used to record transfers of assets between users of the service provider and/or one or more third-parties (e.g., merchant network(s), payment card network(s), ACH network(s), equities network(s), the asset network, securities networks, etc.). In doing so, the asset storage 1202 can maintain a running balance of assets managed by the service provider of FIG. 11. The ledger(s) of the asset storage 1202 can further indicate some of the running balance for each of the ledger(s) stored in the asset storage 1202 is assigned or registered to one or more user account(s) 1204.

In at least one example, the asset storage 1202 can include transaction logs 1218, which can include records of past transactions involving the service provider of FIG. 11. In at least one example, transaction data, as described herein, can be stored in association with the transaction logs 1218.

In some examples, the data store(s) 1200 can store a private blockchain 1219. A private blockchain 1219 can function to record sender addresses, recipient addresses, public keys, values of cryptocurrency transferred, and/or can be used to verify ownership of cryptocurrency tokens to be transferred. In some examples, the service provider of FIG. 11 can record transactions taking place within the service provider of FIG. 11 involving cryptocurrency until the number of transactions has exceeded a determined limit (e.g., number of transactions, storage space allocation, etc.). Based at least in part on determining that the limit has been reached, the service provider of FIG. 11 can publish the transactions in the private blockchain 1219 to a public blockchain (e.g., associated with the asset network), where miners can verify the transactions and record the transactions to blocks on the public blockchain. In at least one example, the service provider of FIG. 11 can participate as miner(s) at least for its transactions to be posted to the public blockchain.

In at least one example, the data store(s) 1200 can store and/or manage accounts, such as user account(s) 1204, merchant account(s) 1206, and/or customer account(s) 1208. In at least one example, the user account(s) 1204 may store records of user accounts associated with the users 1114. In at least one example, the user account(s) 1204 can include a user account 1220, which can be associated with a user (of the users 1114). Other user accounts of the user account(s) 1204 can be similarly structured to the user account 1220, according to some examples. In other examples, other user accounts may include more or less data and/or account information than that provided by the user account 1220. In at least one example, the user account 1220 can include user account data 1228, which can include, but is not limited to, data associated with user identifying information (e.g., name, phone number, address, artist or band name, verified credentials, etc.), user identifier(s) (e.g., alphanumeric identifiers, etc.), user preferences (e.g., learned or user-specified), purchase history data (e.g., identifying one or more items purchased (and respective item information), subscription tier information, etc.), linked payment sources (e.g., bank account(s), stored balance(s), etc.), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, user service data, loyalty data (e.g., loyalty account numbers, rewards redeemed, rewards available, etc.), risk indicator(s) (e.g., level(s) of risk), etc.

In at least one example, the user account data 1228 can include account activity 1230 and user wallet key(s) 1232. The account activity 1230 may include a transaction log for recording transactions associated with the user account 1220. In some examples, the user wallet key(s) 1232 can include a public-private key-pair and a respective address associated with the asset network or other asset networks. In some examples, the user wallet key(s) 1232 may include one or more key pairs, which can be unique to the asset network or other asset networks.

In addition to the user account data 1228, the user account 1220 can include ledger(s) for account(s) managed by the service provider of FIG. 11, for the user. For example, the user account 1220 may include an asset ledger 1234, a fiat currency ledger 1236, and/or one or more other ledgers 1238. The ledger(s) can indicate that a corresponding user utilizes the service provider of FIG. 11 to manage corresponding accounts (e.g., a cryptocurrency account, a securities account, a fiat currency account, etc.). It should be noted that in some examples, the ledger(s) can be logical ledger(s) and the data can be represented in a single database. In some examples, individual ones of the ledger(s), or portions thereof, can be maintained by the service provider of FIG. 11.

In some examples, the asset ledger 1234 can store a balance for each of one or more cryptocurrencies (e.g., Bitcoin, Ethereum, Litecoin, etc.) registered to the user account 1220. In at least one example, the asset ledger 1234 can further record transactions of cryptocurrency assets associated with the user account 1220. For example, the user account 1220 can receive cryptocurrency from the asset network using the user wallet key(s) 1232. In some examples, the user wallet key(s) 1232 may be generated for the user upon request. User wallet key(s) 1232 can be requested by the user in order to send, exchange, or otherwise control the balance of cryptocurrency held by the service provider of FIG. 11 (e.g., in the asset wallet 1210) and registered to the user. In some examples, the user wallet key(s) 1232 may not be generated until a user account requires such. This on-the-fly wallet key generation provides enhanced security features for users, reducing the number of access points to a user account's balance and, therefore, limiting exposure to external threats.

Each account ledger can reflect a positive balance when funds are added to the corresponding account. An account can be funded by transferring currency in the form associated with the account from an external account (e.g., transferring a value of cryptocurrency to the service provider of FIG. 11 and the value is credited as a balance in asset ledger 1234), by purchasing currency in the form associated with the account using currency in a different form (e.g., buying a value of cryptocurrency from the service provider of FIG. 11 using a value of fiat currency reflected in fiat currency ledger 1236, and crediting the value of cryptocurrency in asset ledger 1234), or by conducting a transaction with another user (customer or merchant) of the service provider of FIG. 11 wherein the account receives incoming currency (which can be in the form associated with the account or a different form, in which the incoming currency may be converted to the form associated with the account). In some examples, the user account data 1228 can include preferences for maintaining balances of individual ones of the ledgers. For example, the service provider of FIG. 11 can automatically debit the fiat currency ledger 1236 to increase the asset ledger 1234, or another account associated with the user whenever the cryptocurrency balance (e.g., of the asset ledger 1234) falls below a stated level (e.g., a threshold). Conversely, in some embodiments, the service provider of FIG. 11 can automatically credit the fiat currency ledger 1236 to decrease the asset ledger 1234 whenever cryptocurrency balance rises above a stated level (e.g., a threshold). In some examples, automatic transactions can be further defined by an exchange rate between the cryptocurrency and the fiat currency such that transactions to buy or sell cryptocurrency can occur when exchange rates are favorable.

With specific reference to funding a cryptocurrency account, a user may have a balance of cryptocurrency stored in another cryptocurrency wallet. In some examples, the other cryptocurrency wallet can be associated with a third-party unrelated to the service provider of FIG. 11 (i.e., an external account). In at least one example, the user can transfer all or a portion of a balance of the cryptocurrency stored in the third-party cryptocurrency wallet to the service provider of FIG. 11. Such a transaction can request that the user to transfer an amount of the cryptocurrency in a message signed by user's private key to an address provided by the service provider of FIG. 11. In at least one example, the transaction can be sent to miners to bundle the transaction into a block of transactions and to verify the authenticity of the transactions in the block. Once a miner has verified the block, the block is written to a public, distributed blockchain where the service provider of FIG. 11 can then verify that the transaction has been confirmed and can credit the user's asset ledger 1234 with the transferred amount. When an account is funded by transferring cryptocurrency from a third-party cryptocurrency wallet, an update can be made to the public blockchain. Importantly, this update of the public blockchain need not take place at a time critical moment, such as when a transaction is being processed by a merchant in store or online.

In some examples, a user can purchase cryptocurrency to fund their cryptocurrency account. In some examples, the user can purchase cryptocurrency through services offered by the service provider of FIG. 11. As described above, in some examples, the service provider of FIG. 1 can acquire cryptocurrency from a third-party source. In such examples, the asset wallet 1210 can be associated with different addresses and can vary addresses used to acquire cryptocurrency so that its holdings are represented under a variety of addresses on a blockchain. When the service provider of FIG. 11 has their own holdings of cryptocurrency, users can acquire cryptocurrency directly from the service provider of FIG. 11. In some examples, the service provider of FIG. 11 can include logic for buying and selling cryptocurrency in order to maintain a desired level of cryptocurrency. The desired level can be based on a volume of transactions over a period, balances of collective user profiles' cryptocurrency ledgers, exchange rates, or trends in changing of exchange rates such that the cryptocurrency is trending towards gaining or losing value with respect to the fiat currency. In all of these examples, the buying and selling of cryptocurrency, and therefore the associated updating of the public ledger can be separate from customer-merchant transactions, and therefore not necessarily time-sensitive.

In examples where the service provider of FIG. 11 has its own cryptocurrency assets, cryptocurrency transferred in a transaction (e.g., data with address provided for receipt of transaction and a balance of cryptocurrency transferred in the transaction) can be stored in the asset wallet 1210. In at least one example, the service provider of FIG. 11 can credit the asset ledger 1234 of the user. Additionally, while the service provider of FIG. 11 recognizes that the user retains the value of the transferred cryptocurrency through crediting the asset ledger 1234, any person that inspects the blockchain will see the cryptocurrency as having been transferred to the service provider of FIG. 11. In some examples, the asset wallet 1210 can be associated with many different addresses. In such examples, any person that inspects the blockchain may not easily associate all cryptocurrency stored in asset wallet 1210 as belonging to the same entity. It is this presence of a private ledger that is used for real-time transactions and maintained by the service provider of FIG. 11, combined with updates to the public ledger at other times, that allows for extremely fast transactions using cryptocurrency to be achieved. In some examples, the "private ledger" can refer to the asset ledger 1210, which in some examples, can utilize the private blockchain 1219, as described herein. The "public ledger" can correspond to a public blockchain associated with the asset network.

In at least one example, a user's asset ledger 1234, fiat currency ledger 1236, or the like can be credited when conducting a transaction with another user (customer or merchant) wherein the user receives incoming currency. In some examples, a user can receive cryptocurrency in the form of payment for a transaction with another user. In at least one example, such cryptocurrency can be used to fund the asset ledger 1234. In some examples, a user can receive fiat currency or another currency in the form of payment for a transaction with another user. In at least one example, at least a portion of such funds can be converted into cryptocurrency by the service provider of FIG. 11 and used to fund the asset ledger & 12 of the user.

As addressed above, in some examples, users can also have other accounts maintained by the service provider of FIG. 11. For example, a user can also have an account in U.S. dollars, which can be tracked, for example, via the fiat currency ledger 1236. Such an account can be funded by transferring money from a bank account at a third-party bank to an account maintained by the service provider of FIG. 11 as is conventionally known. In some examples, a user can receive fiat currency in the form of payment for a transaction with another user. In such examples, at least a portion of such funds can be used to fund the fiat currency ledger 1236.

In some examples, a user can have one or more internal payment cards registered with the service provider of FIG. 11. Internal payment cards can be linked to one or more of the accounts associated with the user account 1220. In some embodiments, options with respect to internal payment cards can be adjusted and managed using an application (e.g., the payment application 1118).

In at least one example, as described above, each ledger can correspond to an account of the user that is managed by the service provider of FIG. 11. In at least one example, individual ones of the accounts can be associated with a wallet or a stored balance for use in payment transactions, peer-to-peer transactions, payroll payments, etc.

In at least one example, the user account 1220 can be associated with an asset wallet 1240. The asset wallet 1240 of the user can be associated with account information that can be stored in the user account data 1228 and, in some examples, can be associated with the user wallet key(s) 1232. In at least one example, the asset wallet 1240 can store data indicating an address provided for receipt of a cryptocurrency transaction. In at least one example, the balance of the asset wallet 1240 can be based at least in part on a balance of the asset ledger 1234. In at least one example, funds availed via the asset wallet 1240 can be stored in the asset wallet 1240 or the asset wallet 1210. Funds availed via the asset wallet 1210 can be tracked via the asset ledger 1234. The asset wallet 1240, however, can be associated with additional cryptocurrency funds.

In at least one example, when the service provider of FIG. 11 includes a private blockchain 1219 for recording and validating cryptocurrency transactions, the asset wallet 1240 can be used instead of, or in addition to, the asset ledger 1234. For example, at least one example, a merchant can provide the address of the asset wallet 1240 for receiving payments. In an example where a customer is paying in cryptocurrency and the customer has their own cryptocurrency wallet account associated with the service provider of FIG. 11, the customer can send a message signed by its private key including its wallet address (i.e., of the customer) and identifying the cryptocurrency and value to be transferred to the merchant's asset wallet 1240. The service provider of FIG. 11 can complete the transaction by reducing the cryptocurrency balance in the customer's cryptocurrency wallet and increasing the cryptocurrency balance in the merchant's asset wallet 1240. In addition to recording the transaction in the respective cryptocurrency wallets, the transaction can be recorded in the private blockchain 1219 and the transaction can be confirmed. A user can perform a similar transaction with cryptocurrency in a peer-to-peer transaction as described above. In at least one example, the cryptocurrency wallet account 1230 can be funded by a balance transfer from a third-party cryptocurrency wallet, as described above. Such a transaction can include requesting a user to transfer an amount of cryptocurrency in a message signed by the user's private key to an address of the cryptocurrency wallet account 1230. The transferred amount of cryptocurrency can then be within the cryptocurrency wallet account 1230 for use in later transactions.

While the asset ledger 1234 and/or asset wallet 1240 are each described above with reference to cryptocurrency, the asset ledger 1234 and/or asset wallet 1240 can alternatively be used in association with securities. In some examples, different ledgers and/or wallets can be used for different types of assets. That is, in some examples, a user can have multiple asset ledgers and/or asset wallets for tracking cryptocurrency, securities, or the like.

It should be noted that user(s) having accounts managed by the service provider of FIG. 11 is an aspect of the technology disclosed that enables technical advantages of increased processing speed and improved security.

Figure 13:
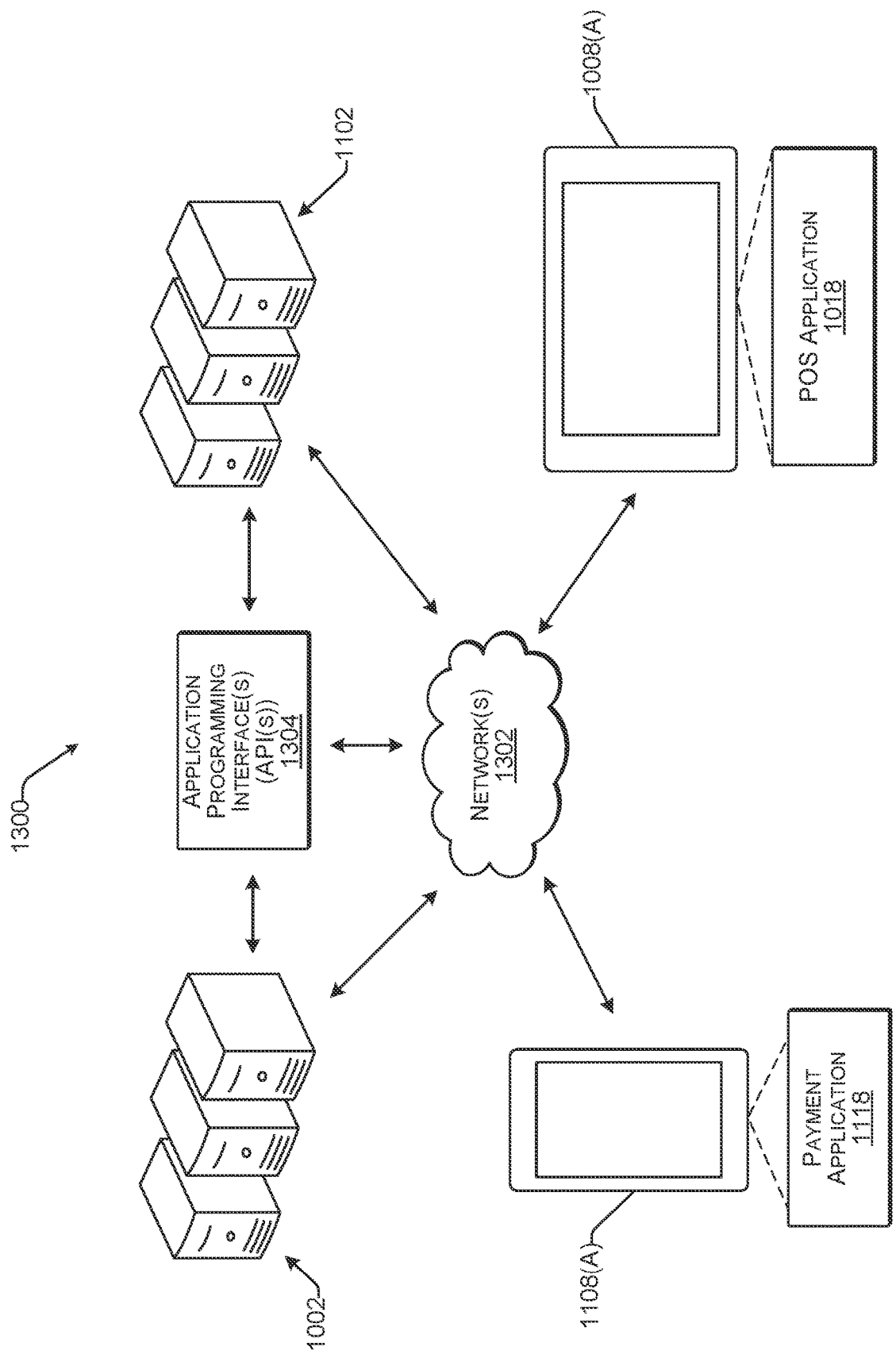
FIG. 13 shows an example of an environment to enable payments at a POS using assets associated with user accounts in a peer-to-peer environment (e.g., in conjunction with a platform for selection of media content versions), according to an implementation of the present subject matter.

FIG. 13 illustrates an example environment 1300 wherein the environment 1000 and the environment 1100 can be integrated to enable payments at the point-of-sale using assets associated with user accounts in the peer-to-peer environment of FIG. 11. As illustrated, each of the components can communicate with one another via one or more networks 1302. In some examples, one or more APIs 1304 or other functional components can be used to facilitate such communication.

In at least one example, the example environment 1300 can enable contactless payments, via integration of peer-to-peer payment, or other payment making, platform(s) and payment processing platform(s), are described herein. For the purpose of FIG. 13, the environment 1000 can refer to a payment processing platform and the environment 1100 can refer to a peer-to-peer payment, or payment making, platform. In an example, such an integration can enable a customer to participate in a transaction via their own computing device instead of interacting with a merchant device of a merchant, such as the merchant device 1008(A). In such an example, the POS application 1018, associated with a payment processing platform and executable by the merchant device 1008(A) of the merchant, can present a Quick Response (QR) code, or other code that can be used to identify a transaction (e.g., a transaction code), in association with a transaction between the customer and the merchant. The QR code, or other transaction code, can be provided to the POS application 1018 via an API associated with the peer-to-peer payment platform. In an example, the customer can utilize their own computing device, such as the user device 1108(A), to capture the QR code, or the other transaction code, and to provide an indication of the captured QR code, or other transaction code, to server(s) 1002 and/or server(s) 1102.

Based at least in part on the integration of the peer-to-peer payment platform and the payment processing platform (e.g., via the API), the server(s) 1002 and/or 1102 associated with each can exchange communications with each other—and with a payment application 1118 associated with the peer-to-peer payment platform and/or the POS application 1018—to process payment for the transaction using a peer-to-peer payment where the customer is a first "peer" and the merchant is a second "peer." In at least one example, the peer-to-peer payment platform can transfer funds from an account of the customer, maintained by the peer-to-peer payment platform, to an account of the merchant, maintained by the payment processing platform, thereby facilitating a contactless (peer-to-peer) payment for the transaction. That is, based at least in part on receiving an indication of which payment method a user (e.g., customer or merchant) intends to use for a transaction, techniques described herein utilize an integration between a peer-to-peer payment platform and payment processing platform (which can be a first- or third-party integration) such that a QR code, or other transaction code, specific to the transaction can be used for providing transaction details, location details, customer details, or the like to a computing device of the customer, such as the user device 1108(A), to enable a contactless (peer-to-peer) payment for the transaction.

In at least one example, techniques described herein can offer improvements to conventional payment technologies at both brick-and-mortar points of sale and online points of sale. For example, at brick-and-mortar points of sale, techniques described herein can enable customers to "scan to pay," by using their computing devices to scan QR codes, or other transaction codes, encoded with data as described herein, to remit payments for transactions. In such a "scan to pay" example, a customer computing device, such as the user device 1108(A), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc. In another example, merchants can "scan for payment" such that a customer can present a QR code, or other transaction code, that can be linked to a payment instrument or stored balance. Funds associated with the payment instrument or stored balance can be used for payment of a transaction.

As described above, techniques described herein can offer improvements to conventional payment technologies at online points of sale, as well as brick-and-mortar points of sale. For example, multiple applications can be used in combination during checkout. That is, the POS application 1018 and the payment application 1118, as described herein, can process a payment transaction by routing information input via the merchant application to the payment application for completing a "frictionless" payment. This can be referred to as "in-application payment." In another example of "in-application payment," the payment application described herein can be created or modified via a software developer kit (SDK) to enable in-application payment.

Returning to the "scan to pay" examples described herein, QR codes, or other transaction codes, can be presented in association with a merchant web page or ecommerce web page. In at least one example, techniques described herein can enable customers to "scan to pay," by using their computing devices to scan or otherwise capture QR codes, or other transaction codes, encoded with data, as described herein, to remit payments for online/ecommerce transactions. In such a "scan to pay" example, a customer computing device, such as the user device 1108(A), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc.

In an example, a customer can desire to purchase items from a merchant. When the customer approaches the merchant to check out, the merchant (e.g., a worker associated therewith) can add indications of the items to a virtual cart via the POS application 1018, associated with a payment processing platform, on the merchant device 1008(A). In an example, the merchant can use the payment processing platform to process payments, and the payment processing platform can process payments for the merchant, as well as other merchants. That is, the payment processing platform can be an aggregator. After adding the first item, or otherwise providing an indication to start a transaction, a display of the merchant device 1008(A) can present a QR code, or other transaction code, that can be associated with a peer-to-peer payment platform. The customer can use a camera associated with the user device 1108(A) to scan, or otherwise capture, the QR code. If the customer is already associated with the peer-to-peer payment platform (e.g., has an existing account, previously onboarded, etc.), the peer-to-peer platform can provide an indication of the scanned QR code to the payment processing platform. This interaction-between the customer computing device and the QR code-can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. Such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

As an additional or alternative example, a customer can desire to purchase items from a merchant. When the customer approaches the merchant to check out, the merchant (e.g., a worker associated therewith) can add indications of the items to a virtual cart via the POS application 1018, associated with a payment processing platform, on the merchant device 1008(A). In an example, the merchant can use the payment processing platform to process payments, and the payment processing platform can process payments for the merchant, as well as other merchants. That is, the payment processing platform can be an aggregator. After adding the first item, or otherwise providing an indication to start a transaction, the POS application 1018 can cause a text message with a resource locator (e.g., uniform resource locator (URL)) that can be associated with a peer-to-peer payment platform to be sent to the user device 1108(A). The customer can interact with the resource locator and, if the customer is already associated with the peer-to-peer payment platform (e.g., has an existing account, previously onboarded, etc.), the peer-to-peer payment platform can provide an indication of the interaction with the resource locator to the payment processing platform. This interaction-between the customer and the resource locator presented via the customer computing device-can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. As described above, such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

In at least one example use case, the merchant device 1008(A) can be a networked computing device, such as a jukebox capable of streaming digital media. The device can be disposed at a merchant location or service location, such as a store, a restaurant, and the like. The QR code can be scannable by a user device 1108(A). The QR code can identify a transaction counterparty, such as a digital media item owner, digital media item creator, an artist associated with a digital media item, and the like. The payment application 1118 can decode the QR code to determine (e.g., based on a user identifier or another suitable identifier) the counterparty (e.g., payee) information and facilitate transactions, such as item purchases, item subscriptions, item lending, payment to creator, payment to artist, payment to media stream control user (e.g., DJ), payment to media stream creator, and so forth.

The same or similar techniques can be applicable in online and/or ecommerce selling channels as well. In such an example, a QR code, or other transaction code, can be presented via an online store, ecommerce web page, and/or a digital media service page of a merchant. The customer can use a camera associated with a customer computing device, such as the user device 1108(A), to scan, or otherwise capture, the QR code. If the customer is already associated with the peer-to-peer payment platform (e.g., has an existing account, previously onboarded, etc.), the peer-to-peer platform can provide an indication of the scanned QR code to the payment processing platform. This interaction-between the customer computing device and the QR code-can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. Such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

As described above, techniques described herein offer improvements to conventional payment technologies. In an example, techniques described herein can enable transaction data to be sent from a POS application 1018 of a merchant device 1008(A) at a brick-and-mortar store of a merchant to a payment application 1118 of a user device 1108(A) of a customer to enable the customer to participate in a transaction via their own computing device. For instance, in a "scan to pay" example as described above, based at least in part on capturing the QR code, or other transaction code, via the user device 1108(A), the payment processing platform can provide transaction data to the peer-to-peer payment platform for presentation via the payment application 1118 on the user device 1108(A). In some examples, the customer can watch items being added to their cart (e.g., via a user Interface presented via the payment application). As an item is added to a virtual cart by the merchant—via the POS application 1018 on the merchant device 1008(A) of the merchant—the customer can see the item in their virtual cart on their own computing device in near-real time. In another example, the peer-to-peer payment platform can analyze transaction data as the transaction data is received to determine whether an incentive (e.g., a discount, a loyalty reward, prioritized access or booking, etc.) is applicable to the transaction and can automatically apply the incentive or send a recommendation to the payment application 1118 for presentation via a user interface associated therewith. In addition to enabling a customer to participate in a transaction during cart building, techniques described herein can enable a customer to complete a transaction, and in some examples, provide gratuity (i.e., a tip), feedback, loyalty information, or the like, via the user device 1108(A) during or after payment of the transaction.

In some examples, based at least in part on capturing the QR code, or other transaction code, the payment processing platform can provide transaction data to the peer-to-peer payment platform for presentation via the payment application 1118 on the computing device of the customer, such as the user device 1108(A), to enable the customer to complete the transaction via their own computing device. In some examples, in response to receiving an indication that the QR code, or other transaction code, has been captured or otherwise interacted with via the customer computing device, the peer-to-peer payment platform can determine that the customer authorizes payment of the transaction using funds associated with a stored balance of the customer that is managed and/or maintained by the peer-to-peer payment platform. Such authorization can be implicit such that the interaction with the transaction code can imply authorization of the customer. In some examples, in response to receiving an indication that the QR code, or other transaction code, has been captured or otherwise interacted with via the customer computing device, the peer-to-peer payment platform can request authorization to process payment for the transaction using the funds associated with the stored balance and the customer can interact with the payment application to authorize the settlement of the transaction. A response to such a request can provide an express authorization of the customer. In some examples, such an authorization (implicit or express) can be provided prior to a transaction being complete and/or initialization of a conventional payment flow. That is, in some examples, such an authorization can be provided during cart building (e.g., adding item(s) to a virtual cart) and/or prior to payment selection. In some examples, such an authorization can be provided after payment is complete (e.g., via another payment instrument). Based at least in part on receiving an authorization to use funds associated with the stored balance (e.g., implicitly or explicitly) of the customer, the peer-to-peer payment platform can transfer funds from the stored balance of the customer to the payment processing platform. In at least one example, the payment processing platform can deposit the funds, or a portion thereof, into a stored balance of the merchant that is managed and/or maintained by the payment processing platform. That is, techniques described herein enable the peer-to-peer payment platform to transfer funds to the payment processing platform to settle payment of the transaction. In such an example, the payment processing platform can be a "peer" to the customer in a peer-to-peer transaction.

In some examples, techniques described herein can enable the customer to interact with the transaction after payment for the transaction has been settled. For example, in at least one example, the payment processing platform can cause a total amount of a transaction to be presented via a user interface associated with the payment application 1118 such that the customer can provide gratuity, feedback, loyalty information, or the like, via an interaction with the user interface. In another example, the payment processing platform can adjust a total amount of a transaction based on events during a shopping experience, such as adding or removing a charge to the total amount based on whether a media content item requested by the customer to be played during a shopping experience was in fact played. In some examples, because the customer has already authorized payment via the peer-to-peer payment platform, if the customer inputs a tip and/or an event affecting the total amount of the transaction is triggered, the peer-to-peer payment platform can transfer additional funds, associated with the tip or event, to the payment processing platform. This pre-authorization (or maintained authorization) of sorts can enable faster, more efficient payment processing when the tip is received and/or the event initiates the trigger. Further, the customer can provide feedback and/or loyalty information via the user interface presented by the payment application, which can be associated with the transaction.

As described above—and also below-techniques described herein enable contactless payments. That is, by integrating the payment processing platform with the peer-to-peer payment platform, merchants and customers can participate in transactions via their own computing devices without needing to touch, or otherwise be in contact, with one another. By moving aspects of a transaction that are traditionally performed on a computing device of a merchant to a computing device of a customer, customers can have more control over the transaction and can have more privacy. That is, customers can monitor items that are added to their cart to ensure accuracy. Further, customers can authorize payments, use rewards, claim incentives, add gratuity, play media content, or the like without being watched by the merchant or other customers.

In some examples, such as when the QR code, or other transaction code, is captured by the computing device of the customer prior to a payment selection user interface being presented via the POS application 1018, payment for the transaction can be pre-authorized such that when the time comes to complete the transaction, neither the payment processing platform nor the peer-to-peer payment platform need to re-authorize payment at that time. That is, techniques described herein can enable faster, more efficient transactions. Further, in some examples, when a customer adds a tip after payment for a transaction has been settled, in some examples, because the peer-to-peer payment platform has already been authorized, the peer-to-peer payment platform and the payment processing platform may not need to obtain another authorization to settle funds associated with the tip. That is, in such examples, fewer data transmissions are required and thus, techniques described herein can conserve bandwidth and reduce network congestion. Moreover, as described above, funds associated with tips can be received faster and more efficiently than with conventional payment technologies.

In addition to the improvements described above, techniques described herein can provide enhanced security in payment processing. In some examples, if a camera, or other sensor, used to capture a QR code, or other transaction code, is integrated into a payment application 1118 (e.g., instead of a native camera, or other sensor), techniques described herein can utilize an indication of the QR code, or other transaction code, received from the payment application for two-factor authentication to enable more secure payments.

It should be noted that, while techniques described herein are directed to contactless payments using QR codes or other transaction codes, in additional or alternative examples, techniques described herein can be applicable for contact payments. That is, in some examples, instead of scanning, capturing, or otherwise interacting with a QR code or transaction code, a customer can swipe a payment instrument (e.g., a credit card, a debit card, or the like) via a reader device associated with a merchant device, dip a payment instrument into a reader device associated with a merchant computing device, tap a payment instrument with a reader device associated with a merchant computing device, or the like, to initiate the provisioning of transaction data to the customer computing device. For example, based at least in part on detecting a dip, tap, swipe, or the like, the payment processing platform can associate a customer with a transaction and provide at least a portion of transaction data associated with the transaction to a customer computing device associated therewith. In some examples, the payment instrument can be associated with the peer-to-peer payment platform as described herein (e.g., a debit card linked to a stored balance of a customer) such that when the payment instrument is caused to interact with a payment reader, the payment processing platform can exchange communications with the peer-to-peer payment platform to authorize payment for a transaction and/or provision associated transaction data to a computing device of the customer associated with the transaction.

Figure 14:
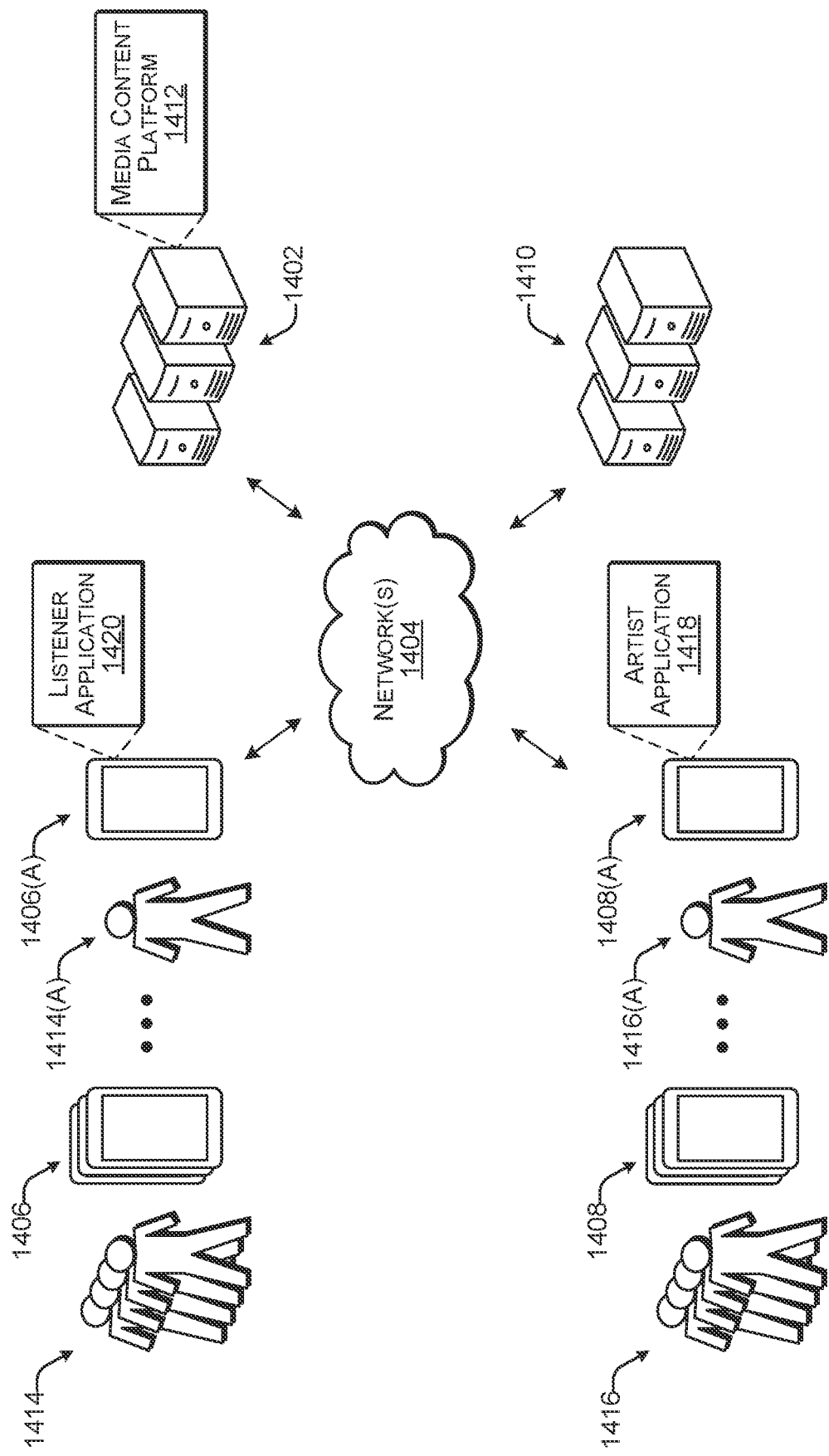
FIG. 14 shows an example of an environment to enable content item delivery (e.g., as part of or in conjunction with a platform for selection of media content versions), according to an implementation of the present subject matter.

FIG. 14 illustrates an example environment 1400. The environment 1400 includes server(s) 1402 that can communicate over a network 1404 with user devices 1406 (an individual instance of which is shown as user device 1406(A)), as well as user devices 1408 (an individual instance of which is shown as user device 1408(A)) and/or server(s) 1410 associated with third-party service provider(s). The server(s) 1402 can be associated with a service provider that can provide one or more services for the benefit of users 1414 and/or users 1416, as described below. Actions attributed to the service provider can be performed by the server(s) 1402. In some examples, the service provider referenced in FIGS. 10 and 11 can be the same or different than the service provider referenced in FIG. 14. For instance, where so indicated by context, the term "service provider" can refer to a music streaming service, video streaming service, digital media subscription service, digital content delivery service, and/or another similar entity in a digital media distribution environment.

In some embodiments, the server(s) 1402 can host or be communicatively coupled to the multimedia platform controller(s) 130 and/or the CDN 140 of FIG. 1, and the user devices 1408 can include one or more of an audience device 110 and a media stream controller device 120.

The environment 1400 can include a plurality of user devices 1406 and/or user devices 1408, as described above. Each one of the plurality of user devices 1406 and/or 1408 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, an audio output device (e.g., a speaker), etc. In some examples, individual ones of the user devices can be operable by users 1414 and/or the users 1416. The users 1414 and/or the users 1416 can be referred to as customers, buyers, merchants, sellers, borrowers, employees, employers, payors, payees, couriers, artists, musicians, listeners, supervisors, hosts, audience members, subscribers, and so on. The users 1414 can interact with the user devices 1406 via user interfaces presented via the user devices 1406. Similarly, the users 1416 can interact with the user devices 1408 via user interfaces presented via the user devices 1408. In at least one example, a user interface can be presented via a web browser, or the like. In other examples, a user interface can be presented via an application, such as a mobile application or desktop application, which can be provided by the service provider or which can be an otherwise dedicated application. In some examples, individual of the user devices 1406 can have an instance or versioned instance of an application, which can be downloaded from an application store, for example, which can present the user interface(s) described herein. In at least one example, a user 1414(A) and/or a user 1416(A) can interact with the user interface via touch input, spoken input, or any other type of input.

In at least one example, the service provider can play digital media where playback may occur using "streaming" where the media is transmitted over the network to the media player or a media application executing on a device (e.g., speaker), which decodes and plays the media while data is being received. The media may be played using characteristics, e.g., of the network, indicated via bit rate to account for variable latency and bandwidth within the communications network. In some cases, a buffer queues some of the audio/video data ahead of the media actually being played. During moments of network congestion, which leads to lower available bandwidth, less audio/video data is added to the buffer, which drains down as media is being de-queued during streaming playback. However, during moments of high network bandwidth, the buffer is replenished, adding data to the buffer.

In at least one example, the service provider can provide a digital media streaming service (e.g., subscription-based, non-subscription-based) that enables the user devices 1406 to stream and/or download digital media via a listener application 1420 installed on the individual user devices 1406. For instance, the digital media streaming service may be a digital audio streaming service (e.g., for music, podcasts, audiobooks, etc.), a digital video streaming service, and/or a streaming service that provides streaming of various different types of digital media or multimedia. In examples, the digital media streaming service may enable the users 1414 to stream digital media items (e.g., songs, podcasts, videos, audiobooks, etc.) on-demand from a centralized library provided by the digital media streaming service via the listener application 1420 on the user devices 1406, and/or from a variety of different decentralized sources. Alternatively or additionally, the digital media streaming service may provide functionality to the users 1414 to download digital media items (e.g., songs, podcasts, videos, audiobooks, etc.) from the centralized library or decentralized sources to be stored locally on the user devices 1406 and subsequently accessed using the listener application 1420. In such cases where digital media items are downloaded and stored locally on the user devices 1406, the listener application 1420 may verify access rights to the digital media items at time intervals, for instance intermittently (e.g., when the user device 1406 has a network connection with the media content platform 1412 via the network(s) 1404), and/or at regular intervals (e.g., daily, weekly, monthly, etc.). In examples, access rights to the digital media items may be provided when a subscription to the digital media streaming service is active, while access rights to the digital media items may be withheld when the subscription to the digital media streaming service is terminated. Enabling storage on the user devices 1406 and subsequent access to digital media items via the listener application 1420 provides the users 1406 with the ability to access the digital media items "offline" such as when a connection to the digital media streaming service via the network(s) 1404 is unavailable or unreliable.

In some examples, the service provider may additionally or alternatively provide an artist management service that enables the users 1416 to manage aspects of artist business via an artist application 1418 installed on the user devices 1408, such as data analytics and management (e.g., listener data, consumer data, etc.), marketing, regulatory obligations, cash flow management, publishing, customer relationship management (CRM), social media, event coordination, industry communications, digital media content ingestion and storage, and so forth. In some examples, the users 1416 can access all of the services of the artist management service. In other examples, the users 1416 can have graduated access to the services, which can be based on a user type (e.g., artist, group member, personal manager, business manager, attorney, agent, etc.), risk tolerance, artist verification status, listener and/or viewer analytics (e.g., number of streams in a month), and so on. In some cases, multiple users 1416 may have access to a single user account via respective user devices 1406, with the various users 1416 having different access privileges to services provided by the artist management service. In a non-limiting example, an artist may have access to all of the service of the artist management service; a personal manager may have access to marketing, cash flow management, publishing, CRM, social media, event coordination, and industry communications; a business manager may have access to regulatory obligations and cash flow management; and an attorney may have access to regulatory obligations, cash flow management, publishing, event coordination, and industry communications. Accordingly, an artist can designate functions provided by the artist management service to different members of the team associated with the artist, thus granting the respective team members access to services suited to the skills of the individual team members.

In some cases, the artist application 1418 and the listener application 1420 may be distinct applications having differing user experiences and verification processes for access, such as illustrated in the environment 1400. For instance, the service provider may request additional verification, such as a link to an artist website, a sample of an artist's work, a verified credential supplied by a third party, etc. to grant access to the artist application 1418 in addition to information requested to access the listener application 1420. Further, the artist application 1418 may provide the artist management services described herein, without the subscription-based digital media streaming services described herein, and vice versa. However, examples are also considered in which functionality provided by the artist application 1418 and the listener application 1420 partially or fully overlap, and/or where verification processes for access are substantially similar.

In at least some examples, the service provider enables interaction between the users 1414 utilizing the listener application 1420 installed on the user devices 1406, and the users 1416 utilizing the artist application 1418 installed on the user devices 1408. For example, the service provider may provide the subscription-based digital media streaming service features described above, the artist management service features described above, as well as interconnectivity between the subscription-based digital media streaming service and the artist management service. Functionality provided by the service provider in such instances may include a communication channel between one or more of the users 1414 (e.g., a listener, fan, music supervisor, publisher, etc.) utilizing the listener application 1420 and a particular user 1416(A) (e.g., an artist) utilizing the artist application 1418. Examples are also considered in which the service provider provides a communication channel between one or more of the users 1416 (e.g., an artist) utilizing the artist application 1418 and a particular user 1414(A) (e.g., a listener, fan, music supervisor, publisher, etc.) utilizing the listener application 1420. The communication channel may include, for instance, a messaging platform (also referred to as a "messaging application" herein), a live streaming platform, a videoconferencing or teleconferencing platform, or a combination of these.

Additionally, in some cases, the service provider may facilitate a resource transfer between the listener application 1420 and the artist application 1418. In an example, the service provider may direct a resource, such as a portion of a subscription fee paid by the user 1414(A), to one or more of the users 1416 based on a number of instances that the user 1414(A) consumed (e.g., streamed, downloaded, etc.) content created by respective ones of the users 1416. Alternatively or additionally, the service provider may direct a resource, such as funds, from an account associated with the user 1414(A) to an account associated with the user 1416(A) (or vice versa), in accordance with transfers between accounts as described herein. The service provider may facilitate resource transfers in examples such as merchandise purchases, event ticket purchases, "tipping" an artist, payments for royalties or other fees, and so forth.

In some examples, the service provider enables interaction between individual ones of the users 1414 with one another via the listener application 1420 installed on the user devices 1406. Similar to the discussion above, the service provider may provide a communication channel between individual ones of the users 1414 via respective listener applications 1420 installed on the user devices 1406. The communication channel may include, for instance, a messaging platform (also referred to as a "messaging application" herein), a live streaming platform, a videoconferencing or teleconferencing platform, or a combination of these. In an example, the listener application 1420 may provide functionality via a communication channel for a user 1414 (A) to stream an individual digital media item, a playlist, or the like to an audience comprising other ones of the user devices 1406. Alternatively or additionally, the communication channel may facilitate sharing of individual digital media items, playlists, user and/or artist profiles, and the like between the users 1414 via messages, uniform resource locators (URLs), quick response (QR) codes, and so forth.

In some cases, the service provider enables interaction between individual ones of the users 1416 with one another via the artist application 1418 installed on the user devices 1408. In examples, the service provider may provide a communication channel between individual ones of the users 1416 via respective artist applications 1418 installed on the user devices 1408. In some instances, the service provider may provide recommendations for a particular user 1416(A) indicating which of the other users 1416 to communicate with. Such a recommendation may be based on a similarity (or dissimilarity) of content created by two or more of the users 1416, an overlap (or lack thereof) of audience members of the users 1416, a geographic location of the users 1416, a coinciding event location of the users 1416, and so forth. In some examples, the user 1416(A) may input parameters for a desired connection via the artist application 1418, and the service provider may filter which of the users 1416 to surface for recommendations to the user 1416(A) based on the input parameters. Alternatively or additionally, the service provider may implement one or more machine learning models to filter which of the users 1416 to surface for recommendations to the user 1416(A). The recommendations provided by the service provider may be data driven and thus increase relevance of communications presented to the users 1416 and reduce unsolicited communications that may be received by the users 1416.

Whether or not a user 1416(A) utilizes a recommendation provided by the service provider to conduct communication via the communication channel with other ones of the users 1416, the communication channel may include various functionality for individual ones of the users 1416 to communicate with one another. For example, the communication channel may include a messaging platform (also referred to as a "messaging application" herein), a live streaming platform, a videoconferencing or teleconferencing platform, or a combination of these. In an example, the artist application 1418 may provide functionality via a communication channel for a user 1416(A) to stream an individual digital media item, a playlist, or the like to an audience comprising the user devices 1406 having a listener application 1420 installed thereon. Alternatively or additionally, the communication channel may facilitate sharing of individual digital media items, playlists, an artist profile associated with the user 1416(A) (or a different one of the users 1416), and the like with the users 1414 via messages, uniform resource locators (URLs), quick response (QR) codes, and so forth.

The media content platform 1412 may interact with the server(s) 1410 associated with the third-party service providers to, for instance, ingest digital media items, report digital media consumption data, pay royalties, and the like. In some examples, the server(s) 1410 may be accessible by the service provider via one or more APIs or other integrations. In some cases, the third-party service provider may be a digital media content provider (e.g., a record label, a performance rights organization (PRO), an independent artist, etc.). In such cases, the service provider may receive digital media items from the server(s) 1410, along with metadata associated with the digital media items. The metadata, in some instances, may indicate individual contributors to a digital media item such as an artist or artists, a songwriter (e.g., a composer, lyricist, author, etc.), a producer (which may further include a co-producer, a mastering engineer, a mixing engineer, a recording engineer, an arranger, a programmer, etc.), a musician (e.g., instrumentalist, vocalist, etc.), a visual artist, and so forth, with an indication of the role of the individual contributor. Alternatively or additionally, the metadata may indicate information such as release date, track title, track duration, clean or explicit version, jurisdiction information, and the like. The service provider may use the metadata to associate the digital media item as being created by a particular user 1416(A), to provide search results to the users 1414, to generate playlists, and so forth. Further, the service provider may provide payments (e.g., royalties) to the third-party service provider based on a number of streams and/or downloads of individual digital media items to the users 1414 via the listener application 1420.

Figure 15:
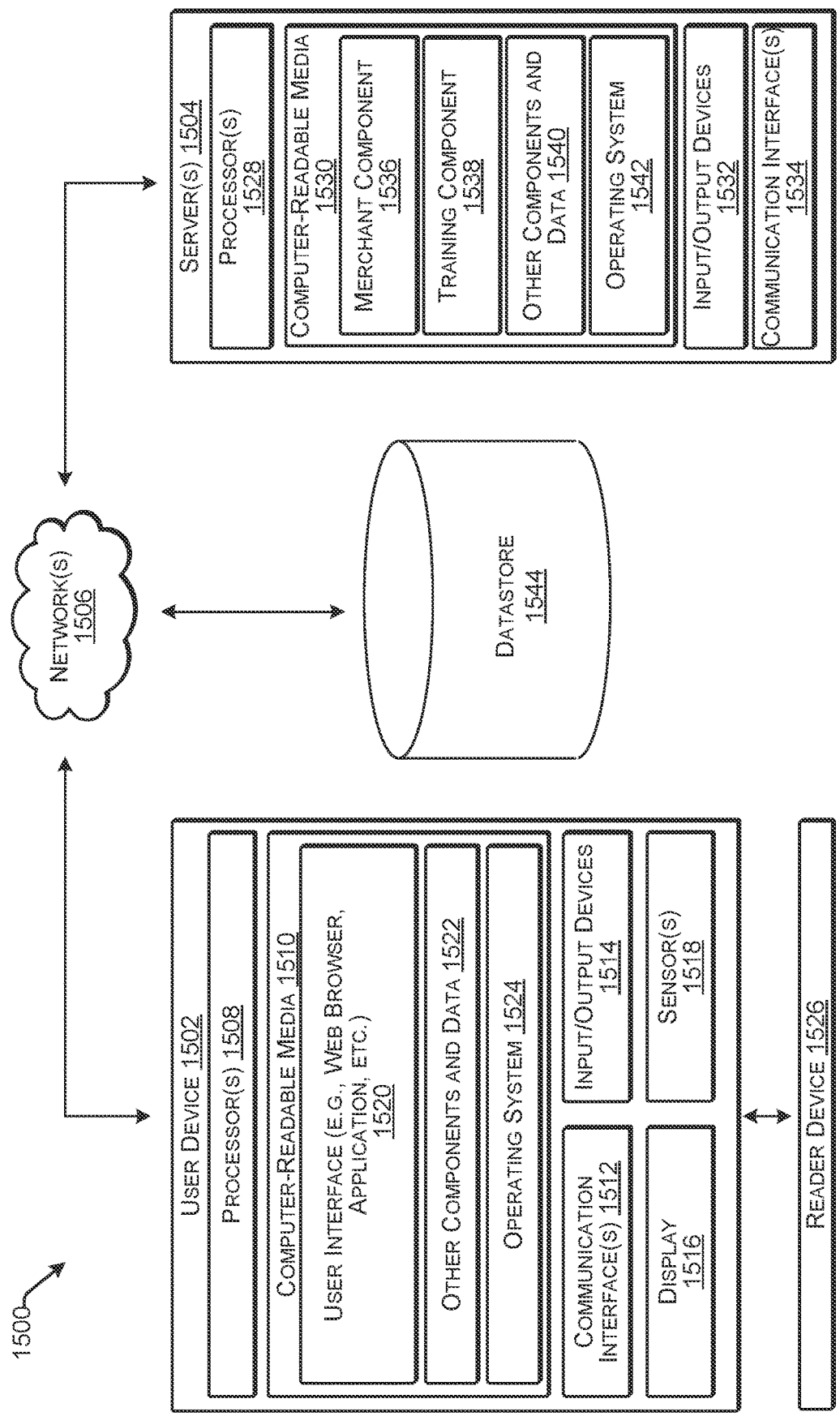
FIG. 15 is a block diagram of an example of a processing system that can be used to implement the techniques described herein, according to an implementation of the present subject matter.

FIG. 15 depicts an illustrative block diagram illustrating a system 1500 for performing techniques described herein. The system 1500 includes a user device 1502, that communicates with server computing device(s) (e.g., server(s) 1504) via network(s) 1506 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user device 1502 is illustrated, in additional or alternate examples, the system 1500 can have multiple user devices, as described above with reference to FIG. 6.

In some embodiments, the server(s) 1504 can host or be communicatively coupled to the multimedia platform controller(s) 130 of FIG. 1, and the user device 1502 can include one or more of an audience device 110 and a media stream controller device 120.

In at least one example, the user device 1502 can be any suitable type of computing device, e.g., portable, semi-portable, semi-stationary, or stationary. Some examples of the user device 1502 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, a speaker device, an automobile or other vehicle type, an Internet of Things (IoT) device, etc. That is, the user device 1502 can be any computing device capable of sending communications and performing the functions according to the techniques described herein. The user device 1502 can include devices, e.g., payment card readers, or components capable of accepting payments, as described below.

In the illustrated example, the user device 1502 includes one or more processors 1508, one or more computer-readable media 1510, one or more communication interface(s) 1512, one or more input/output (I/O) devices 1514, a display 1516, sensor(s) 1218, one or more encoders 1546, and one or more decoders 1548.

In at least one example, each processor 1508 can itself comprise one or more processors or processing cores. For example, the processor(s) 1508 can be implemented as one or more microprocessors, microcomputers, microcontrollers, digital signal processors, central processing units, state machines, logic circuitries, and/or any devices that manipulate signals based on operational instructions. In some examples, the processor(s) 1508 can be one or more hardware processors and/or logic circuits of any suitable type specifically programmed or configured to execute the algorithms and processes described herein. The processor(s) 1508 can be configured to fetch and execute computer-readable processor-executable instructions stored in the computer-readable media 1510.

Depending on the configuration of the user device 1502, the computer-readable media 1510 can be an example of tangible non-transitory computer storage media and can include volatile and nonvolatile memory and/or removable and non-removable media implemented in any type of technology for storage of information such as computer-readable processor-executable instructions, data structures, program components or other data. The computer-readable media 1510 can include, but is not limited to, RAM, ROM, EEPROM, flash memory, solid-state storage, magnetic disk storage, optical storage, and/or other computer-readable media technology. Further, in some examples, the user device 1502 can access external storage, such as RAID storage systems, storage arrays, network attached storage, storage area networks, cloud storage, or any other medium that can be used to store information and that can be accessed by the processor(s) 1508 directly or through another computing device or network. Accordingly, the computer-readable media 1510 can be computer storage media able to store instructions, components or components that can be executed by the processor(s) 1508. Further, when mentioned, non-transitory computer-readable media exclude media such as energy, carrier signals, electromagnetic waves, and signals per se.

The computer-readable media 1510 can be used to store and maintain any number of functional components that are executable by the processor(s) 1508. In some implementations, these functional components comprise instructions or programs that are executable by the processor(s) 1508 and that, when executed, implement operational logic for performing the actions and services attributed above to the user device 1502. Functional components stored in the computer-readable media 1510 can include a user interface 1520 to enable users to interact with the user device 1502, and thus the server(s) 1504 and/or other networked devices. In at least one example, the user interface 1520 can be presented via a web browser, or the like. In other examples, the user interface 1520 can be presented via an application, such as a mobile application or desktop application, which can be provided by a service provider associated with the server(s) 1504, or which can be an otherwise dedicated application. In some examples, the user interface 1520 can be used to generate and display the user interfaces described herein. In at least one example, a user can interact with the user interface via touch input, spoken input, gesture, or any other type of input. The word "input" is also used to describe "contextual" input that may not be directly provided by the user via the user interface 1520. For example, user's interactions with the user interface 1520 are analyzed using, e.g., natural language processing techniques, user movement tracking techniques, eye tracking techniques, etc. to determine context or intent of the user, which may be treated in a manner similar to "direct" user input.

Depending on the type of the user device 1502, the computer-readable media 1510 can also optionally include other functional components and data, such as other components and data 1522, which can include programs, drivers, etc., and the data used or generated by the functional components. In addition, the computer-readable media 1510 can also store data, data structures and the like, that are used by the functional components. Further, the user device 1502 can include many other logical, programmatic and physical components, of which those described are merely examples that are related to the discussion herein.

In at least one example, the computer-readable media 1510 can include additional functional components, such as an operating system 1524 for controlling and managing various functions of the user device 1502 and for enabling basic user interactions.

The communication interface(s) 1512 can include one or more interfaces and hardware components for enabling communication with various other devices, such as over the network(s) 1506 or directly. For example, communication interface(s) 1512 can enable communication through one or more network(s) 1506, which can include, but are not limited any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 1506 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 1502 can further include one or more input/output (I/O) devices 1514. The I/O devices 1514 can include speakers, a microphone, a camera, and various user controls (e.g., buttons, a joystick, a keyboard, a keypad, etc.), a haptic output device, and so forth. The I/O devices 1514 can also include attachments that leverage the accessories (audio-jack, USB-C, Bluetooth, etc.) to connect with the user device 1502.

In at least one example, user device 1502 can include a display 1516. Depending on the type of computing device(s) used as the user device 1502, the display 1516 can employ any suitable display technology. For example, the display 1516 can be a liquid crystal display, a plasma display, a light emitting diode display, an OLED (organic light-emitting diode) display, an electronic paper display, or any other suitable type of display able to present digital content thereon. In at least one example, the display 1516 can be an augmented reality display, a virtual reality display, or any other display able to present and/or project digital content. In some examples, the display 1516 can have a touch sensor associated with the display 1516 to provide a touchscreen display configured to receive touch inputs for enabling interaction with a graphic interface presented on the display 1516. Accordingly, implementations herein are not limited to any particular display technology. Alternatively, in some examples, the user device 1502 may not include the display 1516, and information can be presented by other means, such as aurally, haptically, etc.

In addition, the user device 1502 can include sensor(s) 1518. The sensor(s) 1518 can include a GPS device able to indicate location information. Further, the sensor(s) 1518 can include, but are not limited to, an accelerometer, gyroscope, compass, proximity sensor, camera, microphone, and/or a switch.

In some examples, the GPS device can be used to identify a location of a user. In at least one example, the location of the user can be used by the service provider, described above, to provide one or more services. That is, in some examples, the service provider can implement geofencing to provide particular services to users. As an example, with a lending service, location can be used to confirm that a stated purpose of a loan corresponds to evidence of use (e.g., Is the user using the loan consistent with what he or she said he or she was going to use the loan for?). Furthermore, in some examples, location can be used for payroll purposes. As an example, if a contractor completes a project, the contractor can provide a geo-tagged image (e.g., tagged based on location information availed by the GPS device). In some examples, location can be used for facilitating peer-to-peer payments between nearby users and/or for sending users notifications regarding available appointments with merchant(s) located proximate to the users. In at least one example, location can be used for taking payments from nearby customers when they leave a geofence, or location can be used to initiate an action responsive to users entering a brick-and-mortar store of a merchant. In some cases, location may be used to control media content playback, such as by "handing off" playback of a particular media content item from one device to another responsive to a user crossing a geofence or other location threshold. Location can be used in additional or alternative ways as well.

In examples, the user device 1502 includes a codec system, which may comprise an encoder 1546 and/or a decoder 1548. The encoder 1546 is configured to encode a data stream or signal from an analog signal (e.g., an analog audio signal, an analog video signal, etc.) to a digital signal for transmission or storage. The decoder 1548 is configured to convert the digital signal back to an analog signal, such as for playback or editing. In some cases, the encoder 1546 may be configured to encode the data stream or analog signal in an encrypted format, and the decoder 1548 may accordingly be configured to decrypt the digital signal as part of the decoding process (e.g., using a cryptographic key). Additionally, in some examples, the encoder 1546 may compress data to reduce transmission bandwidth and/or storage space for the digital signal. One example of a compression codec system is a lossless codec, in which the digital data stream is a compressed format of the original data stream, but retains all of the information present in the original data stream. Another example of a compression codec system is a lossy codec which reduces the quality of the digital data stream but can increase the compression of the data stream relative to lossless codec systems. The codec system comprising the encoder 1546 and/or the decoder 1548 may be specialized to accomplish various different objectives, such as to preserve motion, preserve color, minimize latency, maintain fidelity, minimize bit-rate, optimize for different output device types, maintain synchronization of audio and video (e.g., using a metadata synchronization data stream), and so on. Although not explicitly illustrated in the example system 1500, the server 1504 may include an encoder 1546 and/or a decoder 1548 as well.

Additionally, the user device 1502 can include various other components that are not shown, examples of which include removable storage, a power source, such as a battery and power control unit, a barcode scanner, a printer, a cash drawer, and so forth.

In addition, in some examples, the user device 1502 can include, be connectable to, or otherwise be coupled to a reader device 1526, for reading payment instruments and/or identifiers associated with payment objects. In some examples, as described above, the reader device 1526 can plug in to a port in the user device 1502, such as a microphone port, a headphone port, an audio-jack, a data port, or other suitable port. In additional or alternative examples, the reader device 1526 can be coupled to the user device 1502 via another wired or wireless connection, such as via a Bluetooth®, BLE, and so on. The reader device 1526 can include a read head for reading a magnetic strip of a payment card, and further can include encryption technology for encrypting the information read from the magnetic strip. Additionally or alternatively, the reader device 1526 can be an EMV payment reader, which in some examples, can be embedded in the user device 1502. Moreover, numerous other types of readers can be employed with the user device 1502 herein, depending on the type and configuration of the user device 1502.

The reader device 1526 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data off any payment instrument. Accordingly, the reader device 1526 may include hardware implementation, such as slots, magnetic tracks, and rails with one or more sensors or electrical contacts to facilitate detection and acceptance of a payment instrument. That is, the reader device 1526 may include hardware implementations to enable the reader device 1526 to interact with a payment instrument via a swipe (i.e., a card-present transaction where a customer slides a card having a magnetic strip through a payment reader that captures payment data contained in the magnetic strip), a dip (i.e., a card-present transaction where a customer inserts a card having an embedded microchip (i.e., chip) into a payment reader first until the payment reader prompts the customer to remove the card), or a tap (i.e., a card-present transaction where a customer may tap or hover his or her electronic device such as a smart phone running a payment application over a payment reader to complete a transaction via short-range communication) to obtain payment data associated with a customer. Additionally or optionally, the reader device 1526 may also include a biometric sensor to receive and process biometric characteristics and process the biometric characteristics as payment instruments, given that such biometric characteristics are registered with the payment service and connected to a financial account with a bank server.

The reader device 1526 may include processing unit(s), computer-readable media, a reader chip, a transaction chip, a timer, a clock, a network interface, a power supply, and so on. The processing unit(s) of the reader device 1526 may execute one or more components and/or processes to cause the reader device 1526 to perform a variety of functions, as set forth above and explained in further detail in the following disclosure. In some examples, the processing unit(s) may include a central processing unit (CPU), a graphics processing unit (GPU), a CPU and a GPU, or processing units or components known in the art. Additionally, each of the processing unit(s) may possess its own local memory, which also may store program components, program data, and/or one or more operating systems. Depending on the exact configuration and type of the reader device 1526, the computer-readable media may include volatile memory (such as RAM), non-volatile memory (such as ROM, flash memory, miniature hard drive, memory card, or the like), or some combination thereof. In at least one example, the computer-readable media of the reader device 1526 may include at least one component for performing various functions as described herein.

The reader chip may perform functionalities to control the operations and processing of the reader device 1526. That is, the reader chip may perform functionalities to control payment interfaces (e.g., a contactless interface, a contact interface, etc.), a wireless communication interface, a wired interface, a user interface (e.g., a signal condition device (FPGA)), etc. Additionally, the reader chip may perform functionality to control the timer, which may provide a timer signal indicating an amount of time that has lapsed following a particular event (e.g., an interaction, a power-down event, etc.). Moreover, the reader chip may perform functionality to control the clock, which may provide a clock signal indicating a time. Furthermore, the reader chip may perform functionality to control the network interface, which may interface with the network(s) 1506, as described below.

Additionally, the reader chip may perform functionality to control the power supply. The power supply may include one or more power supplies such as a physical connection to AC power or a battery. Power supply may include power conversion circuitry for converting AC power and generating a plurality of DC voltages for use by components of reader device 1526. When power supply includes a battery, the battery may be charged via a physical power connection, via inductive charging, or via any other suitable method.

The transaction chip may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the customer, an address of the customer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the customer (which may or may not match the number associated with the payment instrument), restrictions on what types of charges/debts may be made, etc. Additionally, the transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While the user device 1502, which can be a POS terminal, and the reader device 1526 are shown as separate devices, in additional or alternative examples, the user device 1502 and the reader device 1526 can be part of a single device, which may be a battery-operated device. In such an example, components of both the user device 1502 and the reader device 1526 may be associated with the single device. In some examples, the reader device 1526 can have a display integrated therewith, which can be in addition to (or as an alternative of) the display 1516 associated with the user device 1502.

The server(s) 1504 can include one or more servers or other types of computing devices that can be embodied in any number of ways. For example, in the example of a server, the components, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 1504 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 1504 can be located together or separately, and organized, for example, as virtual servers, server banks and/or server farms. The described functionality can be provided by the servers of a single merchant or enterprise, or can be provided by the servers and/or services of multiple different customers or enterprises.

In the illustrated example, the server(s) 1504 can include one or more processors 1528, one or more computer-readable media 1530, one or more I/O devices 1532, and one or more communication interfaces 1534. Each processor 1528 can be a single processing unit or a number of processing units, and can include single or multiple computing units or multiple processing cores. The processor(s) 1528 can be implemented as one or more microprocessors, microcomputers, microcontrollers, digital signal processors, central processing units, state machines, logic circuitries, and/or any devices that manipulate signals based on operational instructions. For example, the processor(s) 1528 can be one or more hardware processors and/or logic circuits of any suitable type specifically programmed or configured to execute the algorithms and processes described herein. The processor(s) 1528 can be configured to fetch and execute computer-readable instructions stored in the computer-readable media 1530, which can program the processor(s) 1528 to perform the functions described herein.

The computer-readable media 1530 can include volatile and nonvolatile memory and/or removable and non-removable media implemented in any type of technology for storage of information, such as computer-readable instructions, data structures, program components, or other data. Such computer-readable media 1530 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 1504, the computer-readable media 1530 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 1530 can be used to store any number of functional components that are executable by the processor(s) 1528. In many implementations, these functional components comprise instructions or programs that are executable by the processors 1528 and that, when executed, specifically configure the one or more processors 1528 to perform the actions attributed above to the service provider and/or payment processing service. Functional components stored in the computer-readable media 1530 can optionally include a merchant component 1536, a training component 1538, and one or more other components and data 1540.

The merchant component 1536 can be configured to receive transaction data from POS systems. The merchant component 1536 can transmit requests (e.g., authorization, capture, settlement, etc.) to payment service server computing device(s) to facilitate POS transactions between merchants and customers. The merchant component 1536 can communicate the successes or failures of the POS transactions to the POS systems.

The training component 1538 can be configured to train models using machine-learning mechanisms, as well as retrain the models to improve outputs provided by the models based on feedback received over time. For example, a machine-learning mechanism can analyze training data to train a data model that generates an output, which can be a recommendation, a score, and/or another indication. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine-trained data models can be stored in a datastore associated with the user device(s) 1502 and/or the server(s) 1504 for use at a time after the data models have been trained (e.g., at runtime).

The one or more other components and data 1540 can include any of the items in FIG. 1, the functionality of which is described, at least partially, above. Further, the one or more other components and data 1540 can include programs, drivers, etc., and the data used or generated by the functional components. Further, the server(s) 1504 can include many other logical, programmatic and physical components, of which those described above are merely examples that are related to the discussion herein.

The one or more "components" referenced herein may be implemented as more components or as fewer components, and functions described for the components may be redistributed depending on the details of the implementation. The term "component," as used herein, refers broadly to software stored on non-transitory storage medium (e.g., volatile or non-volatile memory for a computing device), hardware, or firmware (or any combination thereof) components. Modules are typically functional such that they may generate useful data or other output using specified input(s). A component may or may not be self-contained. An application program (also called an "application") may include one or more components, or a component may include one or more application programs that can be accessed over a network or downloaded as software onto a device (e.g., executable code causing the device to perform an action). An application program (also called an "application") may include one or more components, or a component may include one or more application programs. In additional and/or alternative examples, the component(s) may be implemented as computer-readable instructions, various data structures, and so forth via at least one processing unit to configure the computing device(s) described herein to execute instructions and to perform operations as described herein.

In some examples, a component may include one or more application programming interfaces (APIs) to perform some or all of its functionality (e.g., operations). In at least one example, a software developer kit (SDK) can be provided by the service provider to allow third-party developers to include service provider functionality and/or avail service provider services in association with their own third-party applications. Additionally or alternatively, in some examples, the service provider can utilize a SDK to integrate third-party service provider functionality into its applications. That is, API(s) and/or SDK(s) can enable third-party developers to customize how their respective third-party applications interact with the service provider or vice versa.

The computer-readable media 1530 can additionally include an operating system 1542 for controlling and managing various functions of the server(s) 1504.

The communication interface(s) 1534 can include one or more interfaces and hardware components for enabling communication with various other devices, such as over the network(s) 1506 or directly. For example, communication interface(s) 1534 can enable communication through one or more network(s) 1506, which can include, but are not limited any type of network known in the art, such as a local area network or a wide area network, such as the Internet, and can include a wireless network, such as a cellular network, a local wireless network, such as Wi-Fi and/or close-range wireless communications, such as Bluetooth®, BLE, NFC, RFID, a wired network, or any other such network, or any combination thereof. Accordingly, network(s) 1506 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

The server(s) 1504 can further be equipped with various I/O devices 1532. Such I/O devices 1532 can include a display, various user interface controls (e.g., buttons, joystick, keyboard, mouse, touch screen, biometric or sensory input devices, etc.), audio speakers, connection ports and so forth.

In at least one example, the system 1500 can include a datastore 1544 that can be configured to store data that is accessible, manageable, and updatable. In some examples, the datastore 1544 can be integrated with the user device 1502 and/or the server(s) 1504. In other examples, as shown in FIG. 15, the datastore 1544 can be located remotely from the server(s) 1504 and can be accessible to the server(s) 1504. The datastore 1544 can comprise multiple databases and/or servers connected locally and/or remotely via the network(s) 1506.

In at least one example, the datastore 1544 can store user profiles, which can include merchant profiles, customer profiles, artist profiles, and so on.

Merchant profiles can store, or otherwise be associated with, data associated with merchants. For instance, a merchant profile can store, or otherwise be associated with, information about a merchant (e.g., name of the merchant, geographic location of the merchant, operating hours of the merchant, employee information, etc.), a merchant category classification (MCC), item(s) offered for sale by the merchant, hardware (e.g., device type) used by the merchant, transaction data associated with the merchant (e.g., transactions conducted by the merchant, payment data associated with the transactions, items associated with the transactions, descriptions of items associated with the transactions, itemized and/or total spends of each of the transactions, parties to the transactions, dates, times, and/or locations associated with the transactions, etc.), loan information associated with the merchant (e.g., previous loans made to the merchant, previous defaults on said loans, etc.), risk information associated with the merchant (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations data (e.g., previous reservations, upcoming (scheduled) reservations, interactions associated with such reservations, etc.), inventory data, customer service data, etc. The merchant profile can securely store bank account information as provided by the merchant. Further, the merchant profile can store payment information associated with a payment instrument linked to a stored balance of the merchant, such as a stored balance maintained in a ledger by the service provider.

Customer profiles can store customer data including, but not limited to, customer information (e.g., name, phone number, address, banking information, etc.), customer preferences (e.g., learned or customer-specified), purchase history data (e.g., identifying one or more items purchased (and respective item information), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, customer service data, media content consumption data (e.g., number of streams of media content and by which artists, direct artist payouts, playlists generated or "favorited," durations of listening and/or watching individual media content items, actions performed while consuming media content (e.g., skips, repeats, volume changes, etc.), locations at which media content is consumed, devices used to consume media content, activities during which media content is consumed, etc.), etc.

Artist profiles can store data including, but not limited to, artist information (e.g., artist's performance or stage name, band name, artist's legal name, record label, phone number, address, social media handles, website address, banking information, etc.), artist preferences (e.g., learned or artist-specified), media content (and/or associated data) at least partially attributed to the artist (e.g., songs, videos, artists in a same genre or having shared listeners, etc.), event data (e.g., tour dates, appearance dates, appointments, etc.), financial data (e.g., advance data, recoupment data, royalty data, payouts data, etc.), payroll data (e.g., employees, contractors, venues, payroll frequency, etc.), listening data (e.g., number of streams on media content platform(s), listening trends, etc.), fan data (number of followers on media content platform(s), number of followers on social media platform(s), etc.), reservations data (e.g., venue reservations, studio recording reservations, previous reservations, upcoming (scheduled) reservations, reservation duration, interactions associated with such reservations, etc.), inventory data (e.g., merchandise inventory), customer service data, and so forth.

Furthermore, in at least one example, the datastore 1544 can store inventory database(s) and/or catalog database(s). As described above, an inventory can store data associated with a quantity of each item that a merchant has available to the merchant. Furthermore, a catalog can store data associated with items that a merchant has available for acquisition. The datastore 1544 can store additional or alternative types of data as described herein.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flowcharts showing example methods involving techniques as described herein. The methods illustrated are described with reference to components described in the figures for convenience and ease of understanding. However, the methods illustrated are not limited to being performed using components described the figures and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods can be combined in whole or in part with each other or with other methods.

What is claimed is:

1. A computer-implemented method comprising:
receiving, at a multimedia platform, from a first user device, a first request to access a media content stream managed by a control user device remote from the first user device, the first request including a first request attribute; receiving, at the multimedia platform, from a second user device, a second request to access the media content stream, the second request including a second request attribute different from the first request attribute, the second user device being remote from the control user device and the first user device; determining, at the multimedia platform, a current content item in the media content stream; determining, at the multimedia platform, a first content delivery source available to serve a particular version of the current content item to the first user device based on the first request attribute; determining, at the multimedia platform, a second content delivery source available to serve a different version of the current content item to the second user device based on the second request attribute, wherein the first content delivery source is different from the second content delivery source; and causing, at the multimedia platform, the first content delivery source to provide the particular version of the current content item to the first user device and the second content delivery source to provide the different version of the current content item to the second user device, wherein the particular version and the different version are played back at respective user devices concurrently and correspond to a common playback position within the media content stream.

2. The computer-implemented method of claim 1, wherein at least one of the first request attribute or the second request attribute is indicative of an audio output hardware, an application instance, a user account status, or a user subscription level, and wherein one or more of the first content delivery source or the second content delivery source are available to serve a plurality of versions of the current content item.

3. The computer-implemented method of claim 2, further comprising:
based on the first request attribute, determining a bit rate for the current content item; and
selecting the particular version of the current content item based on the bit rate.

4. At least one non-transitory computer-readable medium having stored thereon computer executable instructions, execution of which by one or more processors in a processing system causes the processing system to perform operations comprising:

receiving, at a multimedia platform via a communication channel between the multimedia platform and a user device, from the user device, a first request to access a media content stream that is concurrently accessible to a plurality of subscriber devices, the first request including a first request attribute;
determining, at the multimedia platform, a current content item in the media content stream;
causing, at the multimedia platform, a first content delivery source to serve a first version of the current content item to the user device based on the first request attribute;
receiving, at the multimedia platform from the user device, a second request to access the current content item, the second request including an updated request attribute; and
causing, at the multimedia platform, a second content delivery source to serve a second version of the current content item to the user device based on the updated request attribute, wherein the first content delivery source is different from the second content delivery source, and wherein the second version replaces the first version for playback at a playback position corresponding to a same position within the media content stream to enable concurrent playback of the second version at the user device and the first version at one or more other user devices.

5. The at least one non-transitory computer-readable medium of claim 4, wherein the first request attribute or the updated request attribute are indicative of an audio output hardware, an application instance, a user account status, or a user subscription level, and wherein one or more of the first content delivery source or the second content delivery source are available to serve a plurality of versions of the current content item.

6. The at least one non-transitory computer-readable medium of claim 5, the operations further comprising:
based on the updated request attribute, determining a bit rate for the current content item; and
selecting the second version of the current content item based on the bit rate.

7. The at least one non-transitory computer-readable medium of claim 4, the operations further comprising:
determining, based on the first request attribute or the updated request attribute, a restriction related to serving content in response to the first request by:
determining, based on the first request attribute or the updated request attribute, that a particular subscriber account indicated by the first request attribute or the updated request attribute has an access privilege associated with a particular content type; and
determining that the first version or the second version of the current content item is of the particular content type;
wherein causing the first version or the second version of the current content item to be provided to the user device is based on determining that the first version or the second version of the current content item is of the particular content type.

8. The at least one non-transitory computer-readable medium of claim 7, wherein the restriction relates to at least one of a user characteristic of a user associated with the particular subscriber account, an account characteristic of the particular subscriber account, or a geographical location.

9. The at least one non-transitory computer-readable medium of claim 4, the operations further comprising:

selecting a third version of the current content item to be provided to a second user device from the plurality of subscriber devices based on a second request attribute received from the second user device.

10. The at least one non-transitory computer-readable medium of claim 9, the operations further comprising:
determining, at the multimedia platform, a next content item in the media content stream;
determining, at the multimedia platform, that the first request attribute and the second request attribute are indicative of a particular version of the next content item; and
causing, at the multimedia platform, the particular version of the next content item to be provided to the user device and the second user device.

11. The at least one non-transitory computer-readable medium of claim 9, the operations further comprising:
determining, at the multimedia platform, a next content item in the media content stream;
determining, at the multimedia platform, that the first request attribute is indicative of a first particular version of the next content item and the second request attribute is indicative of a second particular version of the next content item, wherein the first particular version is different from the second particular version;
causing, at the multimedia platform, the first particular version of the next content item to be provided to the user device; and
causing, at the multimedia platform, the second particular version of the next content item to be provided to the second user device.

12. The at least one non-transitory computer-readable medium of claim 4, the operations further comprising:
generating, at the multimedia platform, a first electronic message comprising an identifier associated with the first version of the current content item; and
transmitting, at the multimedia platform, the first electronic message to the user device, wherein the first version of the current content item is retrievable from a content provider based on the identifier.

13. The at least one non-transitory computer-readable medium of claim 12, the operations further comprising:
receiving, at the multimedia platform from a control device, a second electronic message comprising an indication of the current content item, wherein the indication relates to a content item skip instruction, content item switch instruction, or content item replay instruction in the media content stream; and
determining, at the multimedia platform, the identifier based on the indication of the current content item,
wherein determining the identifier based on the indication of the current content item comprises determining the content provider based on the first request attribute or the updated request attribute.

14. The at least one non-transitory computer-readable medium of claim 4, the operations further comprising:
determining, at the multimedia platform, a first stream count associated with the first version of the current content item based on providing the first version of the current content item to the user device for a first amount of time; and
determining, at the multimedia platform, a second stream count associated with the second version of the current content item based on providing the second version of the current content item to the user device for a second amount of time that is different than the first amount of time.

15. The at least one non-transitory computer-readable medium of claim 4, the operations further comprising:
determining, at the multimedia platform, an attribute associated with a control user device; and
based on the attribute, determining, at the multimedia platform, a version of the current content item to serve to the control user device.

16. The at least one non-transitory computer-readable medium of claim 4, the operations further comprising:
transmitting, by the multimedia platform, a socket message to a content provider, the socket message comprising a unique identifier associated with the media content stream.

17. The at least one non-transitory computer-readable medium of claim 4, the operations further comprising:
causing, by the multimedia platform, a publication of a unique identifier associated with the media content stream.

18. A computer system having at least one memory, at least one processor, and at least one non-transitory computer-readable medium having computer-executable instructions stored thereon, the computer-executable instructions, when executed by the at least one processor, structured to cause the at least one processor to perform operations comprising:
receiving, at a multimedia platform via a communication channel between the multimedia platform and a user device, from the user device, a first request to access a media content stream that is concurrently accessible to a plurality of subscriber devices, the first request including a first request attribute;
determining, at the multimedia platform, a current content item in the media content stream;
causing, at the multimedia platform, a first content delivery source to serve a particular version of the current content item to the user device based on the first request attribute;
receiving, at the multimedia platform from the user device, a second request to access the current content item, the second request including an updated request attribute; and
causing, at the multimedia platform, a second content delivery source to serve a different version of the current content item to the user device based on the updated request attribute, wherein the first content delivery source is different from the second content delivery source, and wherein the different version of the current content item replaces the current content item for playback at a playback position corresponding to a same position within the media content stream to enable concurrent playback of the second version at the user device and the first version at one or more other user devices.

19. The computer system of claim 18, wherein the first request attribute or the updated request attribute are indicative of an audio output hardware, an application instance, a user account status, or a user subscription level, and wherein one or more of the first content delivery source or the second content delivery source are available to serve a plurality of versions of the current content item.

20. The computer-implemented method of claim 1, wherein the particular version and the different version are played back at respective user devices concurrently and correspond to a common playback position within the media content stream when the particular version and the different version are within a threshold temporal overlap relative to the common playback position.

* * * * *